US012529070B2

(12) United States Patent
Ozias-Akins et al.

(10) Patent No.: US 12,529,070 B2
(45) **Date of Patent: *Jan. 20, 2026**

(54) GENE FOR INDUCTION OF PARTHENOGENESIS, A COMPONENT OF APOMICTIC REPRODUCTION

(71) Applicant: UNIVERSITY OF GEORGIA RESEARCH FOUNDATION, INC., Athens, GA (US)

(72) Inventors: Peggy Ozias-Akins, Tifton, GA (US); Joann A. Conner, Tifton, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 516 days.

This patent is subject to a terminal disclaimer.

(21) Appl. No.: 17/812,022

(22) Filed: Jul. 12, 2022

(65) Prior Publication Data

US 2023/0089653 A1 Mar. 23, 2023

Related U.S. Application Data

(63) Continuation-in-part of application No. 16/821,755, filed on Mar. 17, 2020, now Pat. No. 11,788,100, which is a continuation of application No. 15/031,019, filed as application No. PCT/US2014/061630 on Oct. 21, 2014, now Pat. No. 10,633,672.

(60) Provisional application No. 63/221,312, filed on Jul. 13, 2021, provisional application No. 62/059,842, filed on Oct. 3, 2014, provisional application No. 61/893,741, filed on Oct. 21, 2013.

(51) Int. Cl.
*C12N 15/82* (2006.01)

(52) U.S. Cl.
CPC ................................ *C12N 15/8287* (2013.01)

(58) Field of Classification Search
None
See application file for complete search history.

(56) References Cited

U.S. PATENT DOCUMENTS

| | | | | |
|---|---|---|---|---|
| 5,811,636 | A | 9/1998 | Hanna et al. | |
| 6,028,185 | A | 2/2000 | Ozias-Akins et al. | |
| 8,420,893 | B2 | 4/2013 | Gordan-Kamm et al. | |
| 10,633,672 | B2 * | 4/2020 | Ozias-Akins | A01H 6/346 |
| 11,788,100 | B2 * | 10/2023 | Ozias-Akins | C12N 15/8287 800/278 |

FOREIGN PATENT DOCUMENTS

WO 2005/075655 A2 8/2005

OTHER PUBLICATIONS

Ozias-Akins P. et al., Funct. Integr. Genomics 3:94-104; 2003. (Year: 2003).*
Ozias-Akins, P. et al. Funct Integr Genomis (2003) 3:94-104. (Year: 2003).*
Kano-Murakami et al (1993, “A Rice Homeotic Gene, OSH1, Causes Unusual Phenotypes in Transgenic Tobacco”. FEBS 334:365-368).
McConnel et al, (2001, “Role of PHABULSA and PHAVOUTA In Determining Radial Patterning in Shoots”.Nature 411 (6838):809-713.
Bowie et al, (1990, Decipering the Message in Protein Sequences: Tolerance to Amino Acid Substitutions. Science 247:1306-1310).
Koltunow and Grossniklaus—“Apoximis: A Developmental Perspective”, Annu ev. Plant Biol. 2003, 54:547-74.
Kempel, et al. “Understanding and Engineering Parthenogenesis”, The 9th Gatersleben Research Conference, 3rd International Apoximis Conference, Wernigerode, Germany, Jun. 27-Jul. 1, 2007, Scientific Programme and abstracts 8.1-oral.
Database uniProt [Online] Oct. 16, 2013 (Oct. 16, 2013), “SubName: Full=ASGR-BBM=like 2 [ECO:0000313IEMBL:ACD80124. 2};”,XP002766753, retrieved from EBI accession No. UNIPROT:B3U4X0 Database accession No. B3U4X0.
J A Conner et al: “Plant Contribute Papers”, In Vitro Cellular & Developmental Biology. Animal., vol. 47, No. S1, Apr. 1, 2011 (Apr. 21, 2011), pp. 34-40, XP055341947. New York. ISSN: 1071-2690, DOI: 10.1007/s11626-011-9415-6.
European Extended Search Report for European Patent Application No.; 14856528.6-1410 dated Feb. 16, 2017.
Horstman, V. Willemsen, K. Boutilier, R. Heidstra, Trends in Plant Science 19.146-167.
Akiyama Y. et al., J. Hered. 97.521-524 (2006).
Boutilier K. et al., Plant Cell 14.1737-1749 (2002).
Conner et al., Planta 238.51-63 (2013).
Conner J. et al., Plant Physiol. 147.1396-1411 (2008).
Crismani W. et al., J. Exp. Bot. 64.55-65 (2013).
D.Roche et al. Theor Appl Genet., 104.804-812 (2002).
E. Albertini et al., Plant Molecular Biology 56.879-894 (2004).
Eamens A. et al., Plant Physiology 147.456-568 (2008).
Elliott R. et al., PLant Cell 8.155-168 (1996).
G. Gualtieri et al., Plant Physiology 140.963-971 (2006).
G H. Fleming, O. Olivares-Fuster, S. Del-Bosco, J. W. Grosser, In Vitro Cell Dev Biol Plant 36.450-455 2000).
Goel S. et al., Genetics 163.1069-1082 (2003).
Goel S. et al., Genetics 173.389-400 (2006).
Grimanelli D., Curr. Opin. Plant Biol. 15.57-62 (2012).
H. Yang et al., Plant Cell Reports, 17.693-699 (1998).
Huo H. et al., Theor. Appl. Genet. 119.199-212 (2009).

(Continued)

*Primary Examiner* — Russell Kallis
(74) *Attorney, Agent, or Firm* — Hunt IP Law

(57) ABSTRACT

Methods and compositions disclosed herein relate to genes involved in plant production and methods of using the same.

19 Claims, 39 Drawing Sheets

Specification includes a Sequence Listing.

(56) References Cited

OTHER PUBLICATIONS

J.Goldman, W. W. Hanna, G. Fleming. P. Ozias-Akins, Plant Cell Rep., 21L999-1009 (2003).
Jofuku K. et al., Plant Cell 6.1211-1255 (1994).
Kim S. et al., Mol. Biol. Evol. 23.107-120 (2006).
Klucher K. et al., The Plant Cell 8.137-153 (1996).
M. Singh et al., Crop Science 50.892-902 (2010).
Malik M. eta 1., Plant Physiology 144.134-154 (2007).
N.Saitou, M. Nei, Molecular Biology and Evolution 4.406-425 (1987).
Ohme-Takagi M. and Shinshi H. Plant Cell 7.173-182 (1995).
Okamuro J. et al., Proceedings of the National Academy of Sciences 94.7076-7081 (1997).
Ossowski S. et al. Plant Journal 53.675-690 (2008).
Ozias-Akins P. et al., Proc. Natl. Acad. Sci. USA 95.5127-5132 (1998).
Passarinho P. et al., Plant Mol. Biol. 68.225-237 (2008).
Riechmann J. and Meyerowitz E., Biol. Chem. 379.633-646 (1998).
Roche D. et al., Plant J. 19.203-208 (1999).
Roche D. et al., Theor. Appl. Genet. 104.804-812 (2002).
S. El Ouakfaoui et al., Plant Mol Biol 74.313-326 (2010).
Weigel D. Plant Cell 7.388-389 (1995).
Y. Akiyama et al., BMC Evolutionary Biology, 11.289 (2011).
Zhang Z. et al., Plant Cell Reports 27.1851-1860 (2008).
Conner et al., ASGR-BABY Boom-like (AGR-BBML) from Apomictic Pennisetum squamulatum Confers Parthenogenesis to Transgenic Peai1 Millet, Plant and Animal Genome XXII Meeting, Jan. 14, 2014, abstract.

* cited by examiner

Zm = *Zea mays* (Maize)
Sb = *Sorghum bicolor* (Sorghum)
Si = *Setaria italica* (Foxtail Millet)
P = *Panicum virgatum* (Switchgrass)
Os = *Oryza sativa* (Rice)
B = *Brachypodium distachyon*

Fig. 9

```
ATGGGTTCCA CCAACAACTG GCTGCGCTTC GCCTCGTTCT CCGGCGGCGG CGGCGCCAAG     2134
|||||||||| |||||||||| |||||||||| |||||||||| |||||||||| ||||||||||
ATGGGTTCCA CCAACAACTG GCTGCGCTTC GCCTCGTTCT CCGGCGGCGG CGGCGCCAAG       60

GATGCCGCGG CCCTGCTCCC GCTGCCGCCC TCGCCCCGTG GCGATGTCGA CGAGGCCGGC     2194
|||||||||| |||||||||| |||||||||| |||||||||| |||||||||| ||||||||||
GATGCCGCGG CCCTGCTCCC GCTGCCGCCC TCGCCCCGTG GCGATGTCGA CGAGGCCGGC      120

GCAGAGCCGA AGCTCGAGGA CTTCCTCGGC CTGCAGGAGC CGAGCGCCGC CGCGGTGGGG     2254
|||||||||| |||||||||| |||||||||| |||||||||| |||||||||| ||||||||||
GCAGAGCCGA AGCTCGAGGA CTTCCTCGGC CTGCAGGAGC CGAGCGCCGC CGCGGTGGGG      180

GCTGGGCGGC CATTCGCGGT GGGTGGCGGT GCGAGCTCCA TCGGGCTGTC CATGATCAGG     2314
|||||||||| |||||||||| |||||||||| |||||||||| |||||||||| ||||||||||
GCTGGGCGGC CATTCGCGGT GGGTGGCGGT GCGAGCTCCA TCGGGCTGTC CATGATCAGG      240

AACTGGCTGC GCAGCCAGCC GGCGCCGGCC GGGCCTGCTG CGGGGGTCGA TTCGATGGTG     2374
|||||||||| |||||||||| |||||||||| |||||||||| |||||||||| ||||||||||
AACTGGCTGC GCAGCCAGCC GGCGCCGGCC GGGCCTGCTG CGGGGGTCGA TTCGATGGTG      300

CTGGCGGCTG CGGCGGCGTC GACGGAGGTG GCCGGCGATG GCGCGGAGGG CGGCGGCGCC     2434
|||||||||| |||||||||| |||||||||| |||||||||| |||||||||| ||||||||||
CTGGCGGCTG CGGCGGCGTC GACGGAGGTG GCCGGCGATG GCGCGGAGGG CGGCGGCGCC      360

GTGGCTGACG CGGTGCAGCA GAGGAAGGCG GCGGCGGTGG ACACTTTCGG GCAGCGGACC     2494
|||||||||| |||||||||| |||||||||| |||||||||| |||||||||| ||||||||||
GTGGCTGACG CGGTGCAGCA GAGGAAGGCG GCGGCGGTGG ACACTTTCGG GCAGCGGACC      420

TCCATATACC GCGGCGTCAC AAAGTAGGTT CTTGATTTTA TTTTGGTTTT GGAAAAATTC     2554
|||||||||| |||||||||| |||
TCCATATACC GCGGCGTCAC AAA....... .......... .......... ..........      443

TTCTTTGTTT TTTCTGTTTT CTTCCGACTG GTATATCTTG TGTTAAGAAC TTTTTCATTA     2614

.......... .......... .......... .......... .......... ..........      443

GATGCATGTC ATACTGTTGC TTTTTCTTGT TGCTTTGAAC CTTTTGGCGT TTGCAGCTTC     2674

.......... .......... .......... .......... .......... ..........      443

GTTTGGATAT ACAGAACCTA TATTATCCCC TTTAGTAACC AGTAGATTCT TTTTTTTTCT     2734

.......... .......... .......... .......... .......... ..........      443

TTTTTTTTTT TTGCTTTCGA TGTTGTTAGT GTTCTTGCAT CACGCATGTT TTTCCTCTGA     2794

.......... .......... .......... .......... .......... ..........      443
```

```
TATTTTAATG GACGATATCA TCTCTAGTTC AAGTTTTTGC TCTTGCTCTT GTTGTAGTGG    2854
.......... .......... .......... .......... .......... ..........     443

TGCTAAGATT TTTAAAAAAA AAAATTATGA GCAGTTCTTG TGCTGTTTGA AAATGTAAGC    2914
.......... .......... .......... .......... .......... ..........     443

ATCTCACAGT TCTAAAATAT ATATATATAT ATATATATAA GTCTCTCATG TTGATTTGTG    2974
.......... .......... .......... .......... .......... ..........     443

GATGTACTGA AGCCCCGCGC GCACACATGC ACACACCGCA CGCTCACACG CCCTAAATCC    3034
.......... .......... .......... .......... .......... ..........     443

CCGGTGCAAC ACCAGGGTTG TCCCCGATGG GGATCGAACC CTGGCGGGTG GCCTAACCAC    3094
.......... .......... .......... .......... .......... ..........     443

CGTCAGCTCC CACCACCGAG CTATCAGCTC GTTTGCCCAT ATTTCGTGTG GTACCTCGAT    3154
.......... .......... .......... .......... .......... ..........     443

ATTTTTATAT TTCTAGATTG CTGTATCTAT CTTCTAGACT TATATAAGTG TTGCGCCACT    3214
.......... .......... .......... .......... .......... ..........     443

CATACTTTTT ACCGCCTGTA ATCGAGTAGA ACTGCTTCCT CTTTTGATTA TATTGTATCA    3274
.......... .......... .......... .......... .......... ..........     443

GTTAAATGAT CTTGTTGTTG ATGTGTTTAC CACTTTACCA TCACCATTGC ATGAAATCAC    3334
.......... .......... .......... .......... .......... ..........     443

TTCAAGACAT GTATTCATGA TTTGGCTGGC TAAATTTGCT AGTGGCACAT ACATGTGGTA    3394
.......... .......... .......... .......... .......... ..........     443

AAAAAATATT TTTAGTTTGT GCTTGCTATT CTTTTCGGTC ATCCCTTCGT GCCTGTTTAT    3454
.......... .......... .......... .......... .......... ..........     443
```

Fig. 9 (continued)

```
CCAGAACACC CAATCTGCTT CACATAGTTT TTGAATGCTA TCATCATATT TCTTTTTTGG     3514

.......... .......... .......... .......... .......... ..........      443

AGATATTGTT ACTAAAAGTT TGGCTTTGTC CTCAATAGGC ATAGATGGAC AGGAAGGTAT     3574
                                         || |||||||||| ||||||||||
.......... .......... .......... ........GC ATAGATGGAC AGGAAGGTAT      465

GAAGCCCATC TTTGGGACAA TAGCTGCAGA AGAGAAGGTC AAACTCGGAA AGGTAGACAA     3634
|||||||||| |||||||||| |||||||||| |||||||||| |||||||||| ||||||||||
GAAGCCCATC TTTGGGACAA TAGCTGCAGA AGAGAAGGTC AAACTCGGAA AGGTAGACAA      525

GGTAATGATT ATAATATAGA TATTTAAATT TGTAATTATA AGCTGCATCA TATTATTATT     3694
|
G......... .......... .......... .......... .......... ..........      526

TATTAGATCG GCTTTAAAAT TTCACTAGCT AATTTAGTGT TTTTCTTTTC TTCATCGATA     3754

.......... .......... .......... .......... .......... ..........      526

CCTGCAATCG CTTCATTCCA TTGATTCAGT GTATCTTGGT AAGTAATACT TGTTTACAAT     3814
                                | ||||||||
.......... .......... .........T GTATCTTG.. .......... ..........      535

TGCAAAATGG TATATCTCTT GTTGTTTCTC ATGTCAAGTA TATTAAATAT GTGGTTGATG     3874

.......... .......... .......... .......... .......... ..........      535

CATTGAAGGT GGATATGATA AAGAAGAAAA AGCAGCTAGA GCTTATGATT TAGCTGCTCT     3934
        || |||||||||| |||||||||| |||||||||| |||||||||| ||||||||||
........GT GGATATGATA AAGAAGAAAA AGCAGCTAGA GCTTATGATT TAGCTGCTCT      587

CAAGTACCGG GGCACCACAA CTACTACAAA TTTTCCGGTA TTACTTATTG TTAATATGTT     3994
|||||||||| |||||||||| |||||||||| |||||||
CAAGTACCGG GGCACCACAA CTACTACAAA TTTTCCG... .......... ..........      624

GGTTCTCCAG AATTGATATT TTACTTCTAA TATATAACTG CGTATATGAA TGAATGTTGT     4054

.......... .......... .......... .......... .......... ..........      624

AAGATTTTGC ATTTTATGTT CAGATGAGCA ACTATGAAAA GGAGTTAGAA GAGATGAAGC     4114
                         ||||||| |||||||||| |||||||||| ||||||||||
.......... .......... ...ATGAGCA ACTATGAAAA GGAGTTAGAA GAGATGAAGC      661

ATATGTCACC ACAAGAATAT GTTGCATCCC TTAGAAGGTA CATGTGTTGT CAAAACTTTG     4174
|||||||||| |||||||||| |||||||||| |||||||
```

Fig. 9 (continued)

```
ATATGTCACG ACAAGAATAT GTTGCATCCC TTAGAAG... .......... ..........      698

TACCTTCATG GAAACTGAAC TTATATATTT CACAAATGGA TTGACATAGA ACATATATTT     4234

.......... .......... .......... .......... .......... ..........      698

GTGATACAGG AAAAGCAGTG GTTTTTCTCG TGGTGCATCA ATTTACCGAG GGGTTACCAG     4294
         | |||||||||| |||||||||| |||||||||| |||||||||| ||||||||||
.........G AAAAGCAGTG GTTTTTCTCG TGGTGCATCA ATTTACCGAG GGGTTACCAG      749

GTACAAAATA TTCCTTTTCC TTATTATCTC TGGTTTTAGT TAGCAAGTGC ATTGTTTCTA     4354

.......... .......... .......... .......... .......... ..........      749

TGGGAATTTG TGTTGCATGT AGATGGGAAT TTGTGTTGCA TGTAGATCAT AAATAGTTGC     4414

.......... .......... .......... .......... .......... ..........      749

AACTATTAAT CTCATGTTTC TATTGCTGAA TAGTTTTGTT ACTCCTTTAC CACAGTTGAC     4474

.......... .......... .......... .......... .......... ..........      749

TATGATATTC TATTATATTA TTTTTCTTGC AAAGTTGATA TTTAATTGCT TGTCTAGCTA     4534

.......... .......... .......... .......... .......... ..........      749

ACTTTCAAGC AATCATGTAA AACAGGCACC ATCAGCATGG AAGGTGGCAA GCAAGAATAG     4594
                           ||||| |||||||||| |||||||||| ||||||||||
.......... .......... .....GCACC ATCAGCATGG AAGGTGGCAA GCAAGAATAG      784

GAAGTGTGGC AGGAAACAAG GATCTTTATT TGGGCACATT CAGTAAGTCA CATTTTAATA     4654
|||||||||| |||||||||| |||||||||| |||||||||| ||
GAAGTGTGGC AGGAAACAAG GATCTTTATT TGGGCACATT CA........ ..........      826

TTTTTAATGA AGCACTGATT TTTTTTTGTC AAGCAAAATG GAAGCAAGAC AGAAAAACAT     4714

.......... .......... .......... .......... .......... ..........      826

AAACCTACTG GAGCACCTTT TTCATTATTT TGTCTCTTGA ATATAATAGT ATGTGGCTGA     4774

.......... .......... .......... .......... .......... ..........      826

CCTCTCCCTG TGTAGGTACC CAGGAGGAAG CTGCAGAGGC TTACGACATT GCTGCCATCA     4834
                ||||| |||||||||| |||||||||| |||||||||| ||||||||||
.......... .....GTACC CAGGAGGAAG CTGCAGAGGC TTACGACATT GCTGCCATCA      871
```

Fig. 9 (continued)

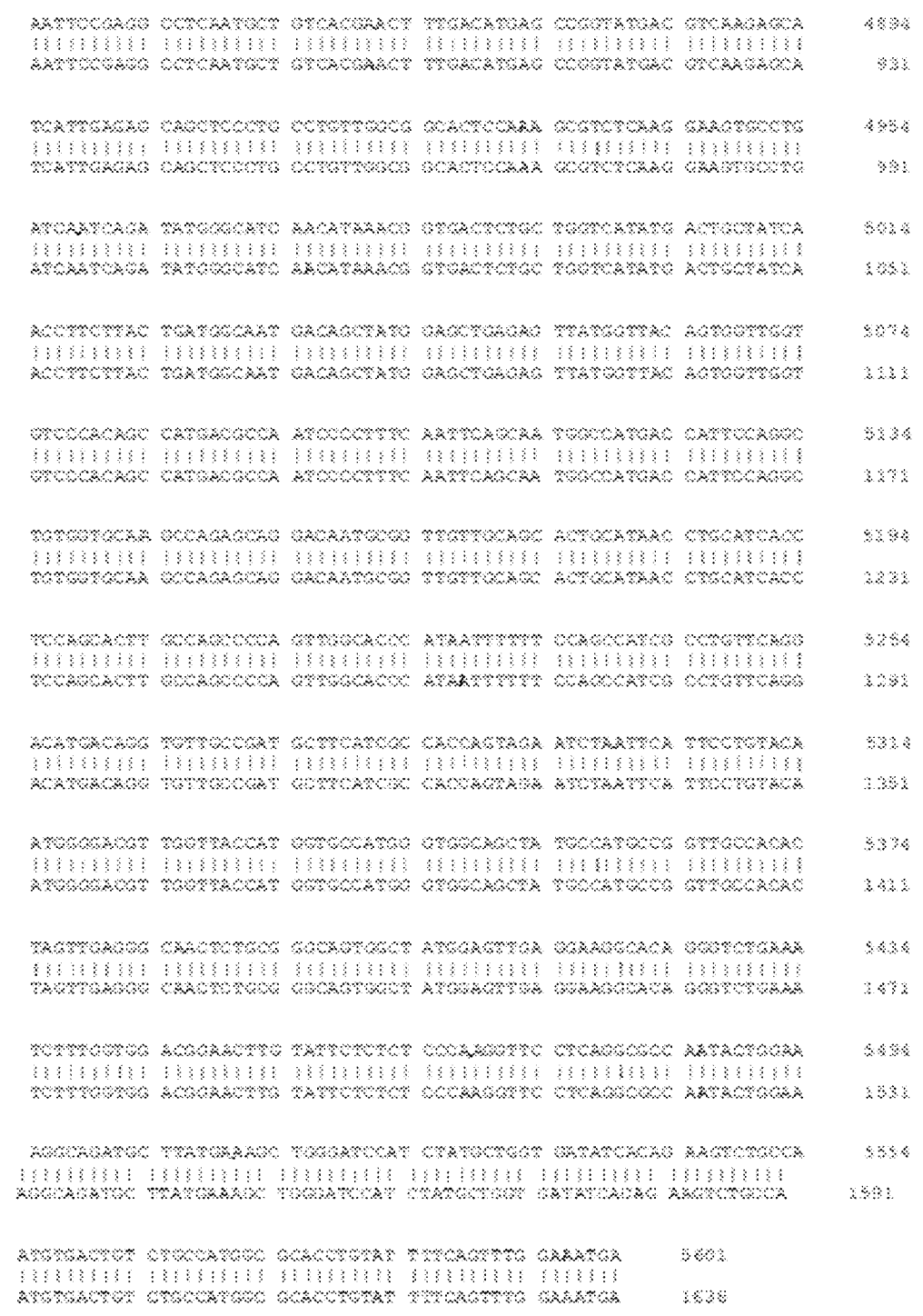

```
AATTCCGAGG CCTCAATGCT GTCACGAACT TTGACATGAG CCGGTATGAC GTCAAGAGCA     4894
|||||||||| |||||||||| |||||||||| |||||||||| |||||||||| ||||||||||
AATTCCGAGG CCTCAATGCT GTCACGAACT TTGACATGAG CCGGTATGAC GTCAAGAGCA      931

TCATTGAGAG CAGCTCCCTG CCTGTTGGCG GCACTCCAAA GCGTCTCAAG GAAGTGCCTG     4954
|||||||||| |||||||||| |||||||||| |||||||||| |||||||||| ||||||||||
TCATTGAGAG CAGCTCCCTG CCTGTTGGCG GCACTCCAAA GCGTCTCAAG GAAGTGCCTG      991

ATCAATCAGA TATGGGCATC AACATAAACG GTGACTCTGC TGGTCATATG ACTGCTATCA     5014
|||||||||| |||||||||| |||||||||| |||||||||| |||||||||| ||||||||||
ATCAATCAGA TATGGGCATC AACATAAACG GTGACTCTGC TGGTCATATG ACTGCTATCA     1051

ACCTTCTTAC TGATGGCAAT GACAGCTATG GAGCTGAGAG TTATGGTTAC AGTGGTTGGT     5074
|||||||||| |||||||||| |||||||||| |||||||||| |||||||||| ||||||||||
ACCTTCTTAC TGATGGCAAT GACAGCTATG GAGCTGAGAG TTATGGTTAC AGTGGTTGGT     1111

GTCCCACAGC CATGACGCCA ATCCCCTTTC AATTCAGCAA TGGCCATGAC CATTCCAGGC     5134
|||||||||| |||||||||| |||||||||| |||||||||| |||||||||| ||||||||||
GTCCCACAGC CATGACGCCA ATCCCCTTTC AATTCAGCAA TGGCCATGAC CATTCCAGGC     1171

TGTGGTGCAA GCCAGAGCAG GACAATGCGG TTGTTGCAGC ACTGCATAAC CTGCATCACC     5194
|||||||||| |||||||||| |||||||||| |||||||||| |||||||||| ||||||||||
TGTGGTGCAA GCCAGAGCAG GACAATGCGG TTGTTGCAGC ACTGCATAAC CTGCATCACC     1231

TCCAGCACTT GCCAGCCCCA GTTGGCACCC ATAATTTTTT CCAGCCATCG CCTGTTCAGG     5254
|||||||||| |||||||||| |||||||||| |||||||||| |||||||||| ||||||||||
TCCAGCACTT GCCAGCCCCA GTTGGCACCC ATAATTTTTT CCAGCCATCG CCTGTTCAGG     1291

ACATGACAGG TGTTGCCGAT GCTTCATCGC CACCAGTAGA ATCTAATTCA TTCCTGTACA     5314
|||||||||| |||||||||| |||||||||| |||||||||| |||||||||| ||||||||||
ACATGACAGG TGTTGCCGAT GCTTCATCGC CACCAGTAGA ATCTAATTCA TTCCTGTACA     1351

ATGGGGACGT TGGTTACCAT GGTGCCATGG GTGGCAGCTA TGCCATGCCG GTTGCCACAC     5374
|||||||||| |||||||||| |||||||||| |||||||||| |||||||||| ||||||||||
ATGGGGACGT TGGTTACCAT GGTGCCATGG GTGGCAGCTA TGCCATGCCG GTTGCCACAC     1411

TAGTTGAGGG CAACTCTGCG GGCAGTGGCT ATGGAGTTGA GGAAGGCACA GGGTCTGAAA     5434
|||||||||| |||||||||| |||||||||| |||||||||| |||||||||| ||||||||||
TAGTTGAGGG CAACTCTGCG GGCAGTGGCT ATGGAGTTGA GGAAGGCACA GGGTCTGAAA     1471

TCTTTGGTGG ACGGAACTTG TATTCTCTCT CCCAAGGTTC CTCAGGCGCC AATACTGGAA     5494
|||||||||| |||||||||| |||||||||| |||||||||| |||||||||| ||||||||||
TCTTTGGTGG ACGGAACTTG TATTCTCTCT CCCAAGGTTC CTCAGGCGCC AATACTGGAA     1531

AGGCAGATGC TTATGAAAGC TGGGATCCAT CTATGCTGGT GATATCACAG AAGTCTGCCA     5554
|||||||||| |||||||||| |||||||||| |||||||||| |||||||||| ||||||||||
AGGCAGATGC TTATGAAAGC TGGGATCCAT CTATGCTGGT GATATCACAG AAGTCTGCCA     1591

ATGTGACTGT CTGCCATGGC GCACCTGTAT TTTCAGTTTG GAAATGA     5601
|||||||||| |||||||||| |||||||||| |||||||||| |||||||
ATGTGACTGT CTGCCATGGC GCACCTGTAT TTTCAGTTTG GAAATGA     1638
```

GENE FOR INDUCTION OF PARTHENOGENESIS, A COMPONENT OF APOMICTIC REPRODUCTION

CLAIM OF PRIORITY UNDER 35 U.S.C. § 119

The present application is a continuation-in-part of U.S. Non-provisional patent application Ser. No. 16/821,755 filed on Mar. 17, 2020, which is a continuation of U.S. Non-Provisional patent application Ser. No. 15/031,019 filed on Apr. 21, 2016 (now U.S. Pat. No. 10,633,672), which is a U.S. National Stage entry under 35 U.S.C. § 371 of International Application No. PCT/US2014/061630, filed on Oct. 21, 2014, designating the United States of America and published in English on Apr. 30, 2015, which in turn claims the benefit of priority 35 U.S.C. § 119(e) to U.S. Provisional Application No. 61/893,741, filed on Oct. 21, 2013, and U.S. Provisional Application No. 62/059,842, filed on Oct. 3, 2014; each of which is hereby incorporated by reference in its entirety. The present application also claims priority to U.S. Provisional Application No. 63/221,312, filed on Jul. 13, 2021; which is hereby incorporated by reference in its entirety.

STATEMENT REGARDING FEDERALLY SPONSORED RESEARCH

This invention was made with government support under Grant No. 2010-65116-20449 awarded by the United States Department of Agriculture, National Institute of Food and Agriculture, Agriculture and Food Research Initiative (USDA-NIFA-AFRI), and Grant No. DBI-0115911 awarded by the National Science Foundation (NSF). In addition, this invention was made with government support under grant number 2017-06368 awarded by USDA NIFA. The government has certain rights in the invention.

REFERENCE TO AN ELECTRONIC SEQUENCE LISTING

The contents of the electronic sequence listing (2022-11-10-Sequence Listing ST26-UGRF-026US2.xml; Size: 115,032 bytes; and Date of Creation: Nov. 10, 2022) is herein incorporated by reference in its entirety.

BACKGROUND

Field

The invention disclosed herein generally relates to genes involved in plant reproduction and methods of using the same.

Background

Apomixis is a naturally occurring mode of asexual reproduction in flowering plants; this process results in seed formation without the involvement of meiosis or fertilization of the egg. Apomictic processes bypass meiosis and fertilization, leading directly to clonal embryo formation. Apomictic hybrids are true-breeding hybrids because seed-derived progeny of an apomictic plant are genetically identical to the maternal parent. In other words, apomictic hybrids are clonal in origin.

Apomixis is characterized by: 1) apomeiosis, which refers to the formation of unreduced embryo sacs derived from nucellar cells of the ovary, and 2) parthenogenesis, which refers to the development of the unreduced egg into an embryo. Many types of plant species feature apomictic reproduction and can be propagated asexually.

SUMMARY

Embodiments of the invention include a method of propagating one or more gametophytic or sporophytic cells in an ovule of a plant in the absence of egg cell fertilization. The method can include: transforming a plant with an BBML gene construct comprising a nucleic acid encoding a polypeptide having at least 40% sequence similarity to the polypeptide of SEQ ID NO: 4, wherein the nucleic acid is operably-linked to a promoter effective within an egg cell; and/or growing and selecting a progeny plant from the one or more gametophytic or sporophytic cells, wherein the progeny plant contains one or more sets of chromosomes from the transformed plant, wherein propagation of the plant occurs in the absence of egg cell fertilization.

In some embodiments, the BBML gene construct further can include one or more untranslated region (UTR).

In some embodiments, the BBML gene construct can further include one or more UTR has at least 70% sequence identity to SEQ ID NO: 1 or a fully complementary strand thereof.

In some embodiments, the promoter can include a nucleotide having at least 70% sequence identity to SEQ ID NO: 5 or a fully complementary strand thereof.

In some embodiments, the ASGR-BBML gene construct has at least 70% sequence identity to SEQ ID NO: 3 or a fully complementary strand thereof.

In some embodiments, the gene construct can encode a polypeptide having that has at least 40% sequence identity to Seita.8G107100.1.p (SiBBM1), Sieta.5G415800.1.p (SiBBM2) or Seita.1G232200.1.p (SiBBM3).

In some embodiments, an embryo can be formed from an unreduced egg.

In some embodiments, an embryo can be formed from a reduced egg.

In some embodiments, an embryo can be formed from a somatic cell.

In some embodiments, a polyploid plant can be transformed to produce a diploid or dihaploid progeny plant.

In some embodiments, a diploid plant can be transformed to produce a haploid progeny plant.

In some embodiments, the haploid progeny plant can be treated to achieve chromosome doubling and production of a homozygous plant.

In some embodiments, the progeny plant can be obtained via culturing.

In some embodiments, the plant can be a monocot.

In some embodiments, the plant can be a dicot.

In some embodiments, the plant can include a grass or a leguminous plant.

In some embodiments, the grass can be a species of millet, rice, maize, wheat, sorghum, switchgrass, and/or the like.

In some embodiments, the plant can be heterozygous and can be transformed to produce a clonal offspring.

In some embodiments, the plant can be heterozygous and can be transformed to produce a haploid offspring.

In some embodiments, the method can be used to propagate one or more heritable traits in the plant.

Some embodiments of the invention relate to a plant or plant part produced by any of the methods disclosed herein.

Some embodiments of the invention relate to a method of producing a plant capable of being reproduced in the absence of egg cell fertilization. The method can include:

transforming a plant with an BBML gene construct encoding a polypeptide having at least 40% sequence similarity to the polypeptide of SEQ ID NO: 4, thereby producing a plant capable of being reproduced in the absence of egg cell fertilization.

Embodiments of the invention encompass methods of achieving propagation from one or more gametophytic or sporophytic cells in an ovule of a flowering plant in the absence of egg cell fertilization, the methods including: transforming a flowering plant with an ASGR-BBML gene construct capable of encoding a polypeptide having at least 75% sequence identity to the polypeptide of SEQ ID NO: 4; obtaining one or more gametophytic or sporophytic cells from an ovule from the transformed plant in the absence of egg cell fertilization; and deriving a progeny plant from the one or more gametophytic or sporophytic cells, wherein the progeny plant contains one or more sets of chromosomes from the transformed plant, thereby achieving propagation of the flowering plant in the absence of egg cell fertilization.

In some embodiments, the ASGR-BBML gene construct further includes one or more untranslated region (UTR). In some embodiments, the ASGR-BBML gene construct further including one or more UTR can have at least 70% sequence identity to SEQ ID NO: 1 or a fully complementary strand thereof. In some embodiments, the ASGR-BBML gene construct further includes a promoter. In some embodiments, the promoter is capable of regulating the expression of a polypeptide having at least 75% sequence identity to the polypeptide of SEQ ID NO: 4. In some embodiments, the promoter includes a nucleotide having at least 70% sequence identity to SEQ ID NO: 5 or a fully complementary strand thereof. In some embodiments, the ASGR-BBML gene construct further including one or more UTR and a promoter can have at least 70% sequence identity to SEQ ID NO: 3 or a fully complementary strand thereof.

In some embodiments, the embryo can be formed from an unreduced egg. In some embodiments, the embryo can be formed from a reduced egg. In some embodiments, the embryo can be formed from a somatic cell.

In some embodiments, a polyploid plant can be transformed to produce a diploid or dihaploid progeny plant. In some embodiments, a diploid plant can be transformed to produce a haploid progeny plant. In some embodiments, the haploid progeny plant can be treated to achieve chromosome doubling and production of a homozygous plant. In some embodiments, the progeny plant can be obtained via culturing.

In some embodiments, the flowering plant can be a monocot. In some embodiments, the flowering plant can be a dicot.

In some embodiments, the flowering plant can be a grass or a leguminous plant. In some embodiments, the grass can be a species of millet, rice, maize, wheat, sorghum, or switchgrass.

In some embodiments, the flowering plant can be heterozygous and can be transformed to produce a clonal offspring. In some embodiments, the flowering plant can be heterozygous and can be transformed to produce a haploid offspring.

In some embodiments, the methods of the present invention can be used to propagate one or more heritable traits in the flowering plant.

The invention also encompasses plants or plant parts produced by methods of achieving propagation from one or more gametophytic or sporophytic cells in an ovule of a flowering plant in the absence of egg cell fertilization, the methods including: transforming a flowering plant with an ASGR-BBML gene construct capable of encoding a polypeptide having at least 75% sequence identity to the polypeptide of SEQ ID NO: 4; obtaining one or more gametophytic or sporophytic cells from an ovule from the transformed plant in the absence of egg cell fertilization; and deriving a progeny plant from the one or more gametophytic or sporophytic cells, wherein the progeny plant contains one or more sets of chromosomes from the transformed plant, thereby achieving propagation of the flowering plant in the absence of egg cell fertilization.

The invention also encompasses methods of obtaining a flowering plant capable of being reproduced in the absence of egg cell fertilization, the method including: transforming a flowering plant with an ASGR-BBML gene construct capable of encoding a polypeptide having at least 85% sequence identity to the polypeptide of SEQ ID NO: 4, thereby obtaining a flowering plant capable of being reproduced in the absence of egg cell fertilization.

The invention also encompasses plants or plant parts produced by methods of obtaining a flowering plant capable of being reproduced in the absence of egg cell fertilization, the method including: transforming a flowering plant with an ASGR-BBML gene construct capable of encoding a polypeptide having at least 85% sequence identity to the polypeptide of SEQ ID NO: 4, thereby obtaining a flowering plant capable of being reproduced in the absence of egg cell fertilization.

The invention also encompasses methods of producing seed of a flowering plant in the absence of egg cell fertilization, the method including: transforming a flowering plant with an ASGR-BBML gene construct; obtaining one or more embryos from the transformed plant in the absence of egg cell fertilization; and producing seed from the one or more embryos which contains one or more sets of chromosomes which are derived solely from the transformed mother plant, thereby obtaining seed propagation from the flowering plant in the absence of egg cell fertilization.

The invention also encompasses seeds produced by methods of producing seed of a flowering plant in the absence of egg cell fertilization, the method including: transforming a flowering plant with an ASGR-BBML gene construct; obtaining one or more gametophytic or sporophytic cells from an ovule from the transformed plant in the absence of egg cell fertilization; and deriving seed from the one or more gametophytic or sporophytic cells, wherein the seed contains one or more sets of chromosomes from the transformed plant, thereby producing seed of the flowering plant in the absence of egg cell fertilization.

The invention also encompasses ASGR-BBML gene constructs capable of encoding a polypeptide having at least 75% sequence identity to the polypeptide of SEQ ID NO: 4, wherein the polypeptide encoded by the ASGR-BBML gene construct, when expressed in one or more gametophytic or sporophytic cells in an ovule of a flowering plant, can allow propagation to be achieved in the absence of egg cell fertilization. In some embodiments, the ASGR-BBML gene constructs can further include one or more UTR and a promoter, wherein the ASGR-BBML gene construct has at least 70% sequence identity to SEQ ID NO: 3 or a fully complementary strand thereof.

BRIEF DESCRIPTION OF THE DRAWINGS

Those of skill in the art will understand that the drawings, described below, are for illustrative purposes only. The drawings are not intended to limit the scope of the present teachings in any way.

FIG. 1 depicts consensus sequence (SEQ ID NO. 69), Si000593m (SEQ ID NO. 41), P00023058m (SEQ ID NO. 42), Si016558m (SEQ ID NO. 43), P00062296m (SEQ ID NO. 44), B2g57747 (SEQ ID NO. 45), B5gl4960 (SEQ ID NO. 46), BnBBMl_AF317904 (SEQ ID NO. 47), CcASGR_BBM_likel (SEQ ID NO. 48), AtBBM_At5G17430 (SEQ ID NO. 49), Si028170m (SEQ ID NO. 50), MtBBMb_AES80430 (SEQ ID NO. 51), Sb03g042810 (SEQ ID NO. 52), BBMl_Osi 1g19060 (SEQ ID NO. 53), PsASGR_BBM_like (SEQ ID NO. 54), MtBBMa_AAW82334 (SEQ ID NO. 55), Bradi3g48697 (SEQ ID NO. 56), P00052881m (SEQ ID NO. 57), ZmBBM-l_ACG27850 (SEQ ID NO. 58), Sb04g025960 (SEQ ID NO. 59), Os02g40070 (SEQ ID NO. 60), GmBBMl_gi310892427 (SEQ ID NO. 61), Os01g67410 (SEQ ID NO. 62), Os04g42570_AK287726 (SEQ ID NO. 63), P00061382m (SEQ ID NO. 64), Zm-ODP2_GRMZM2G141638 (SEQ ID NO. 65), and BnBBM2_AF317905 (SEQ ID NO. 66).

FIGS. 5A, 5B, and 5C depict results from using an antisense probe; FIG. 5D depicts results from using a control probe.

FIG. 7A depicts an aposporous embryo sac with a two-celled embryo. FIG. 7B depicts two aposporous embryo sacs, the left with a multicellular embryo and the right at a single- or bi-cellular stage.

FIGS. 8A and 8B are different planes of focus of the same ovary to show both intact synergids (S) and polar nuclei (PN). GUS expression is detected in the egg cell (E) of unfertilized sexual embryo sacs on day of anthesis. A weaker GUS signal in synergid cells can sometimes be detected (FIG. 8C). No GUS signal is detected in the PN or antipodal cells (AN) of the mature sexual embryo sac. GUS staining is detected in cells of the developing embryo (EM) three days after fertilization but not in developing endosperm (EN) (FIG. 8D). No other staining in ovary tissue is identified.

FIG. 9 depicts the alignment of the cDNA to the genomic DNA. The aligned sequence is shown at the start of ATG. The upper lines contain the genomic DNA sequence (SEQ ID NO. 67), and the lower lines contain the cDNA sequence (SEQ ID NO. 68).

FIGS. 10A, 10B, and 10C depict embryo sac structures typical of sexual development, i.e., all have antipodal cells which are absent from aposporous embryo sacs that develop in *Pennisetum*. Each embryo sac contains a developing embryo and unfertilized central cell, as shown by the persistent polar nuclei. FIGS. 10A, 10B, and 10C depict the full embryo sac structure. FIGS. 10D, 10E, and 10F depict a magnification of the embryo (micropylar) end of the embryo sac.

FIG. 11A depicts a control ovary with a structurally mature embryo sac derived from an untransformed tissue culture line without fertilization. No embryo development is seen. Embryo development in unfertilized ovaries is clearly seen in sexual transgenic lines g11a (FIG. 11B) and g3f (FIG. 11C) based on the appearance of an embryo-like structure (EM) at the micropylar end of the embryo sac; polar nuclei (PN), and antipodal cells (A). FIG. 11D shows that endosperm formation (EN) at 2 days after anthesis can readily be detected when pollination is permitted as shown for line g11a.

FIG. 13A depicts peak analysis of sorghum and TO line g11a leaf tissue. FIG. 13B depicts peak analysis of sorghum and g3f offspring 108. FIG. 13C depicts peak analysis of sorghum and g3f offspring 101. FIG. 13D depicts peak analysis of g3f offspring 105 and 107. S2 and S4 designate sorghum 2X/2C and 2X/4C peaks, respectively. H2 and H4 designate T1 diploid/dihaploid offspring (FIG. 13C, 13D) with 2C and 4C peaks, respectively. T2 and T4 designate tetraploid TO pearl millet (FIG. 13A) or tetraploid T1 offspring (FIG. 13B, 13D) with 2C and 4C peaks, respectively.

FIG. 14A shows 5 seed from an untransformed tetraploid IA4X plant with genomic peaks Ma (4n/2c) and Mb (4n/4c) based on comparison with sorghum leaf genomic peaks Sa (2n/2c) and Sb (2n/4c) used for a standard. FIG. 14B shows 5 seed from g3f-offspring 104 which inherited the PsASGR-BBM transgene but remained a tetraploid plant. Seed show genomic millet peaks of Ma (4n/2c) and Mb (4n/4c) from fertilized embryos along with millet peaks from unfertilized reduced embryos Mc (2n/2c) and Md (2n/4c) based on comparison with sorghum leaf genomic peaks Sa (2n/2c) and Sb (2n/4c) used for a standard. FIG. 14C shows 5 seed from g3f-offspring 105 which inherited the PsASGR-BBM transgene and showed reduction of genome size to a diploid/dihaploid. Seed show genomic millet peaks of Mc (2n/2c) and Md (2n/4c) from unreduced embryos along with millet peaks from reduced embryos Me (In/le) and Mf (1n/2c) based on comparison with sorghum leaf genomic peaks Sa (2n/2c) and Sb (2n/4c) used for a standard.

FIG. 15A depicts a control ovary with a structurally mature embryo sac derived from an untransformed tissue culture line without fertilization. No embryo development is seen. Embryo development in unfertilized ovaries is clearly seen in sexual offspring 306 from transgenic line g52 (FIG. 15B) and offspring 105 from transgenic line g3f (FIG. 15C) based on the appearance of an embryo-like structure (EM) at the micropylar end of the embryo sac; polar nuclei (PN), and antipodal cells (AN).

FIG. 18A depicts a section and embryo cell count of control plant S7-6T10. Embryo development is marked with a bracket. This embryo contains greater than 16 cells. FIG. 18B depicts a section of RNAi line S5-5T-28. No embryo development is identified in this ovary (egg cell is marked with an arrow) containing 2 aposporous embryo sacs denoted by stars.

FIG. 19A shows leaf genomic peaks of untransformed rice Ra (2n/2c) and Rb (2n/4C) and sorghum Sa (2n/2c) and Sb (2n/4c). Rice peak Rb and sorghum peak Sa overlap due to similar genome sizes. FIG. 19B shows 5 dissected embryos from TO rice line 26 which contains a transcriptionally active PsASGR-BBM transgene. Rice line 26 embryos show genomic rice peaks of Ra (2n/2c) from fertilized embryos along with rice peaks from unfertilized reduced embryos Rc (In/le) based on comparison with sorghum leaf genomic peaks Sa (2n/2c) and Sb (2n/4C). FIG. 19C shows 5 dissected embryos from TO rice line 34 which contains a transcriptionally active PsASGR-BBM transgene. Rice line 34 embryos show genomic rice peaks of Ra (2n/2c) from fertilized embryos along with rice peaks from unfertilized reduced embryos Rc (in/le) based on comparison with sorghum leaf genomic peaks Sa (2n/2c) and Sb (2n/4C).

FIG. 23A shows SiBBM3-chr1_11A has short height and more tillers relative to the wild type plant; FIG. 23B and FIG. 23C show mature panicles of transgenic lines enclosed in the flag leaf (right side in images) whereas wild type (left) panicles are fully exserted from the flag leaf; FIG. 23D and FIG. 23E, Leaves in early stages of senescence of SiBBM3-chr1_11A and wild type before (FIG. 23D) and after crushing manually (FIG. 23E); FIG. 23F shows SiBBM3-chr1_6A florets with awns (right) and wild type florets (left) without awns.

FIG. 24A shows elongated ovary with post-pollination growth arrested at the earlier stage of embryo/seed development. FIG. 24B shows expanded ovaries filled with watery fluid. FIG. 23C shows expanded ovaries filled with callus like growth. FIG. 24D shows ovaries with callus at the micropylar end. FIG. 24 E shows ovaries with callus at the chalazal end. FIG. 24F shows ovaries matured into seeds.

DETAILED DESCRIPTION

Figure 1:
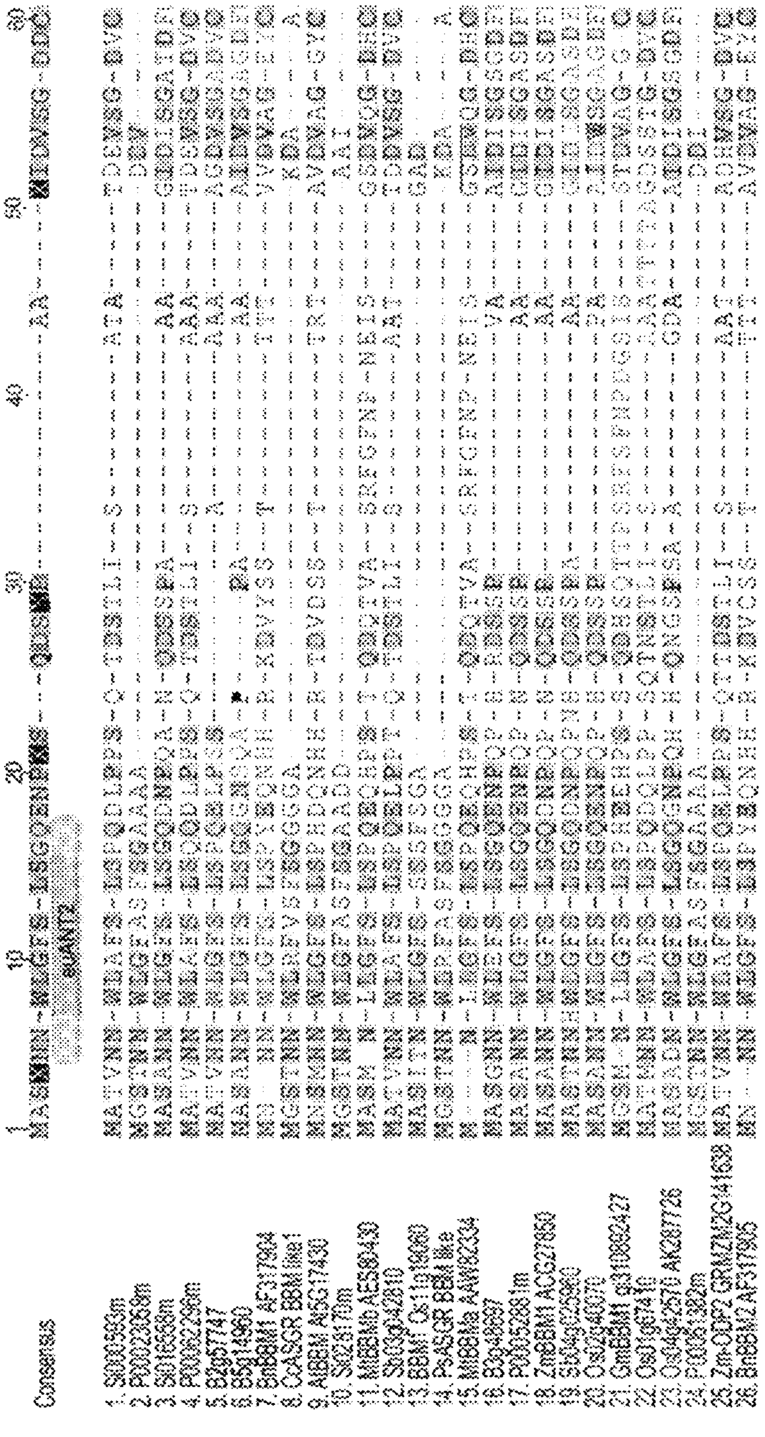
FIG. 1 depicts the T-Coffee alignment of a subset of BabyBoom (BBM), BabyBoom-Like (BBM-like), and apospory-specific genomic region (ASGR)-BBM-like proteins with labeled domains.
Figure 1:
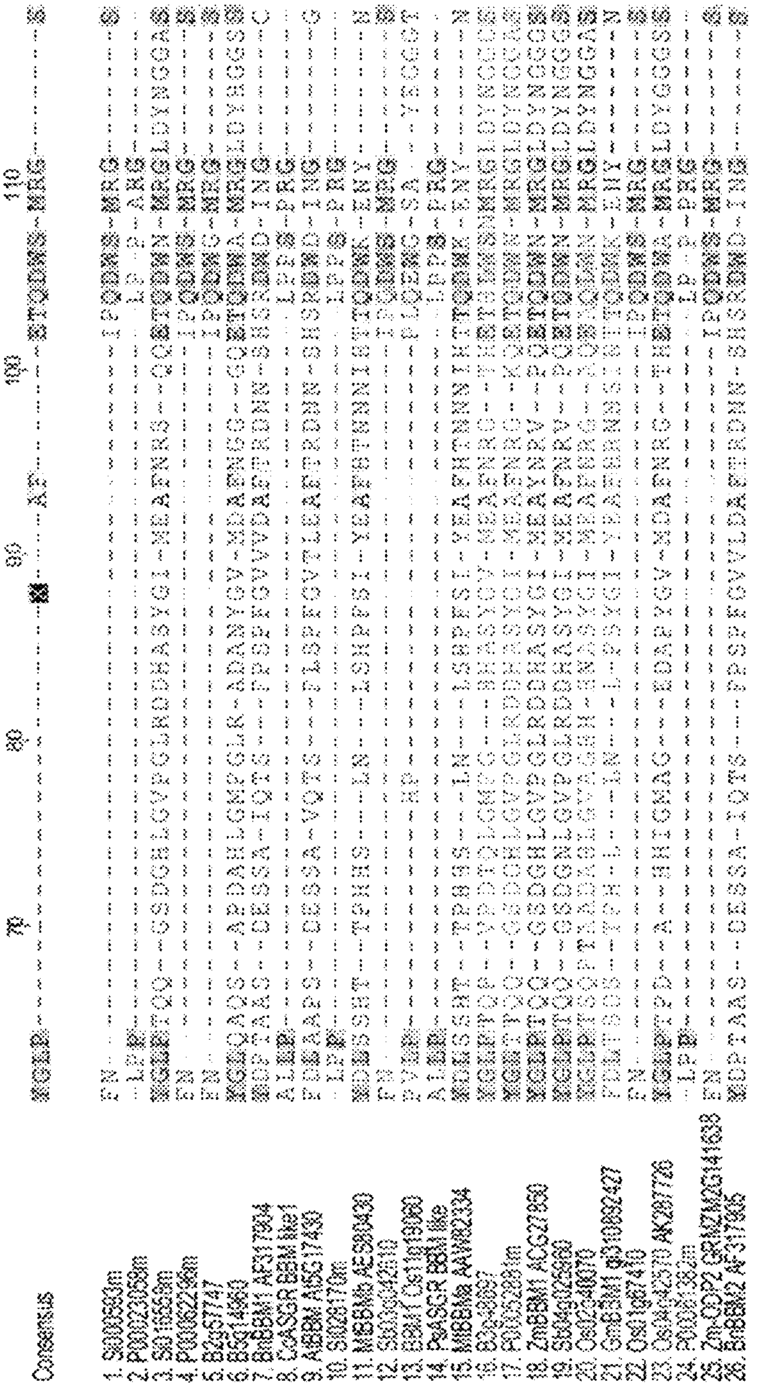
Figure 1:
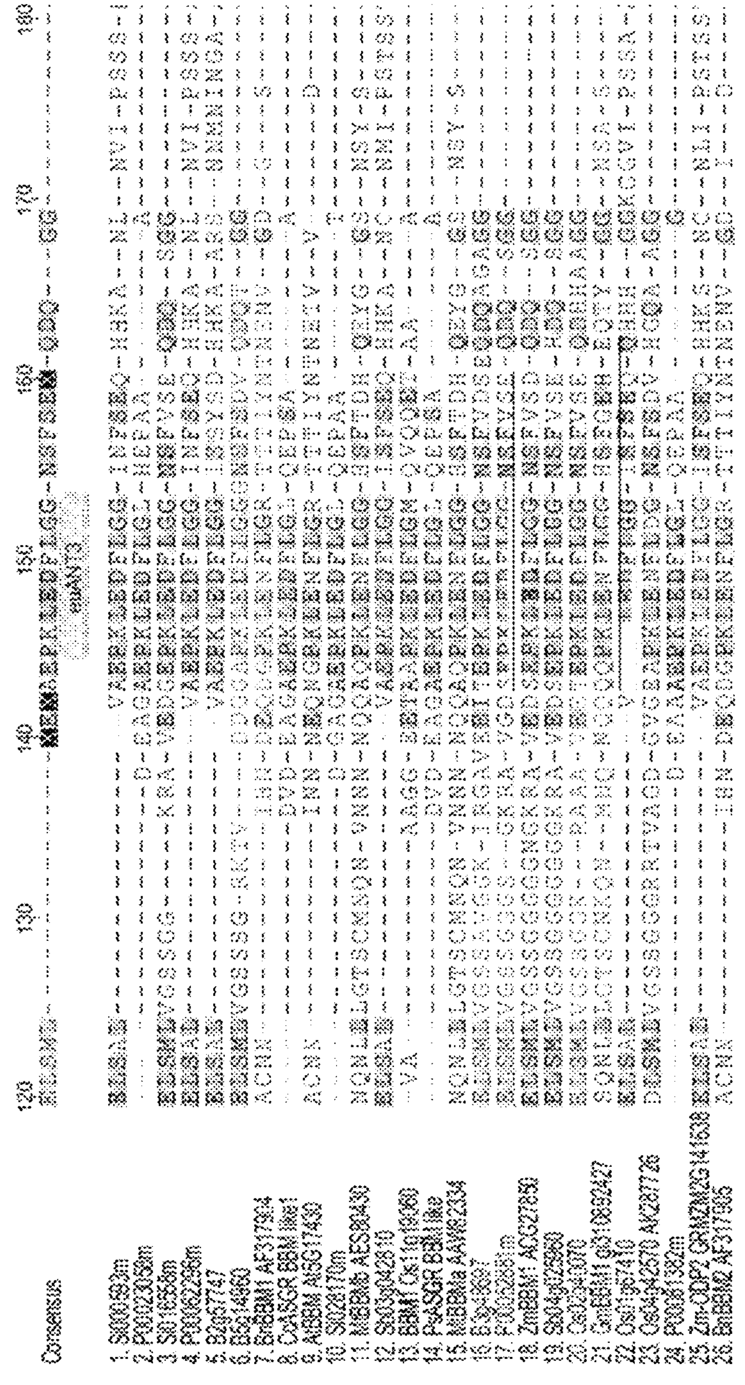
Figure 1:
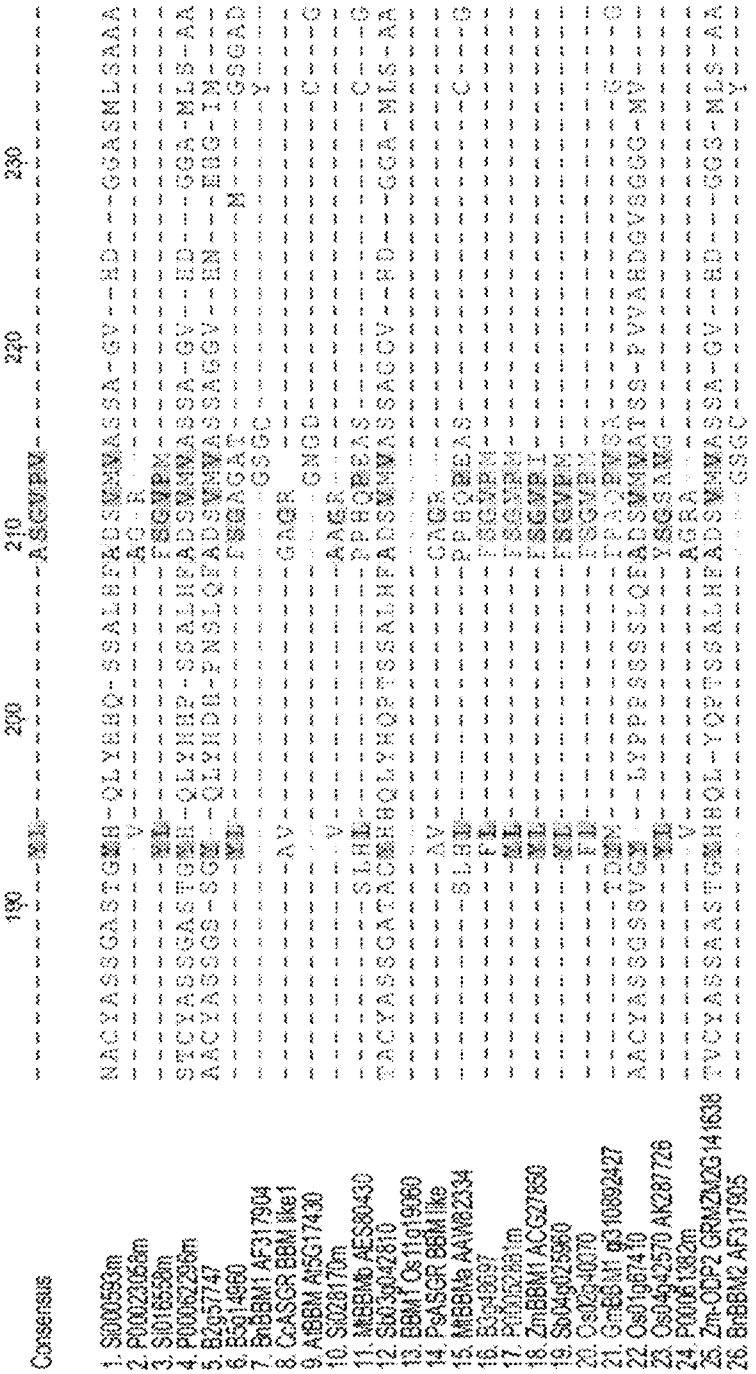
Figure 1:
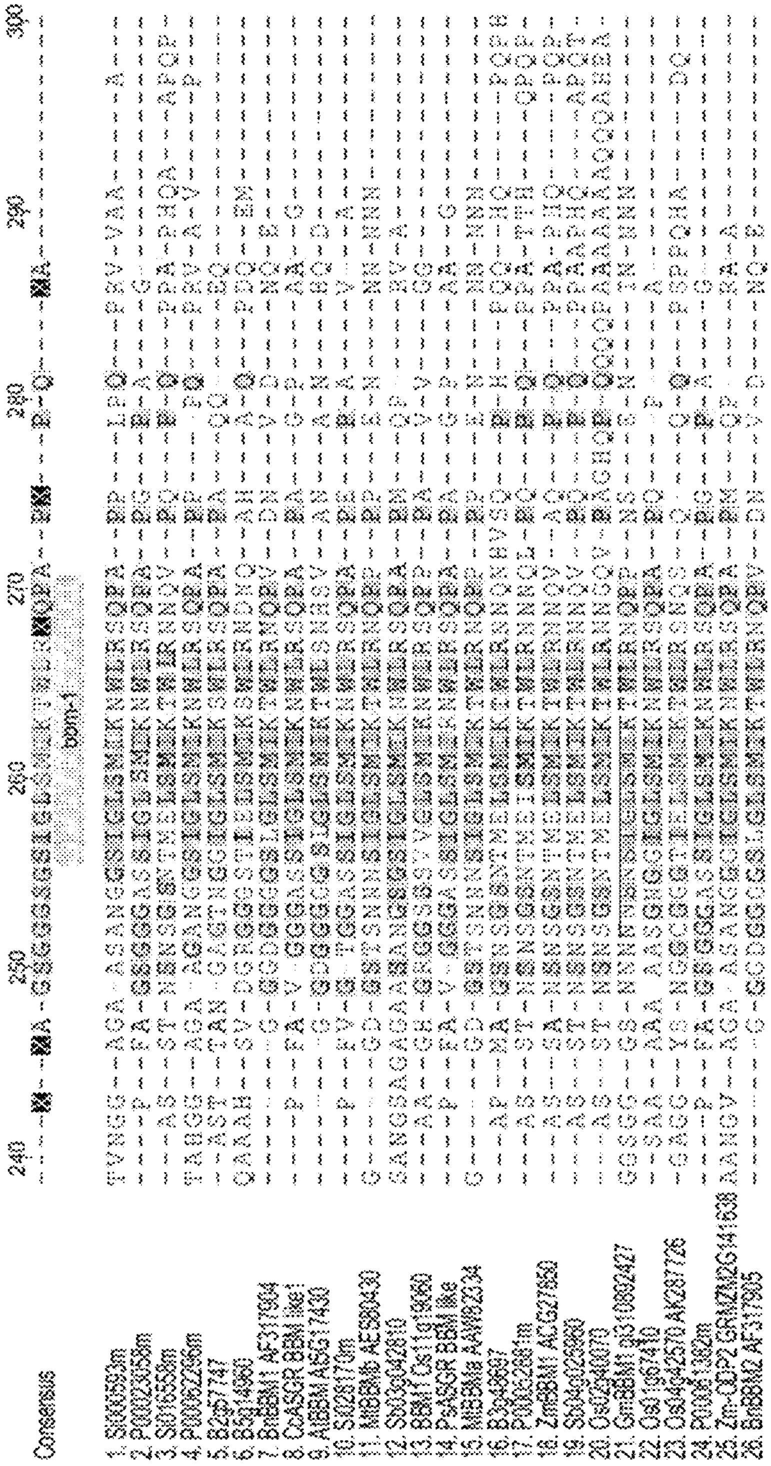
Figure 1:
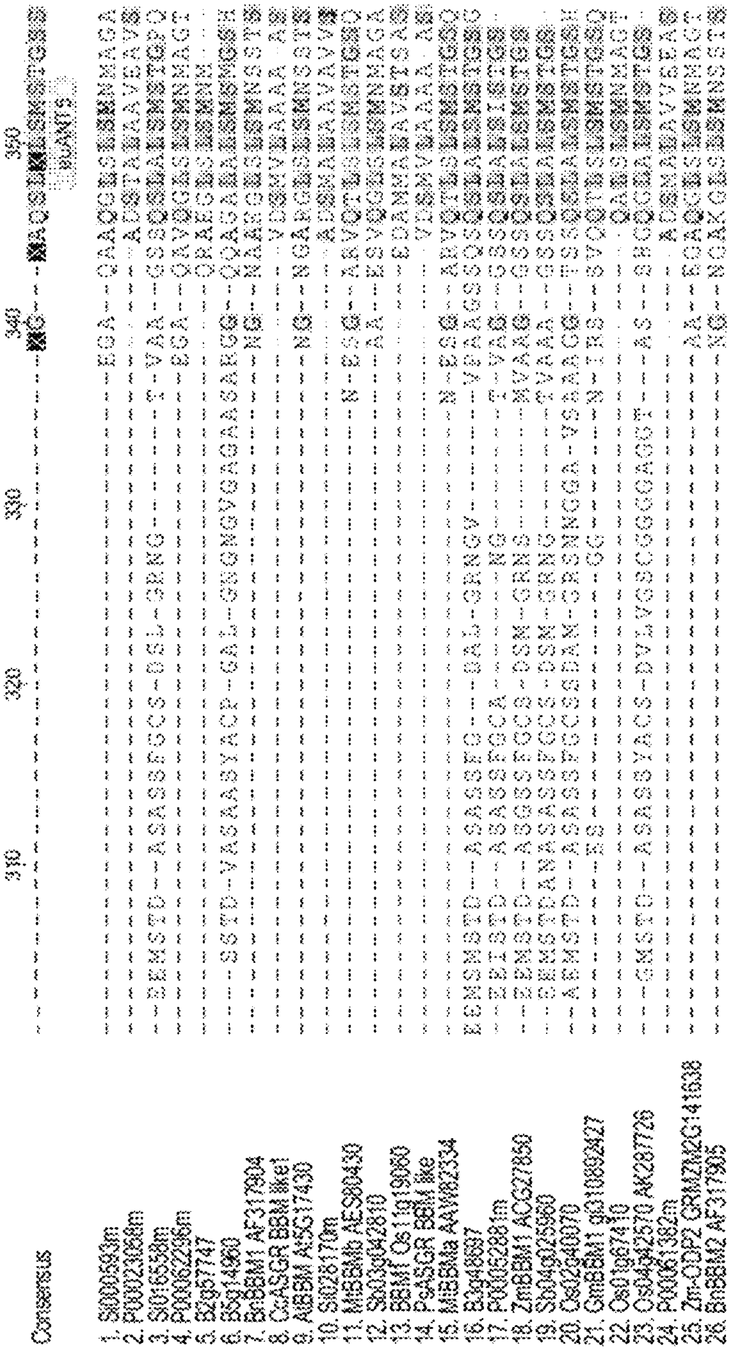
Figure 1:
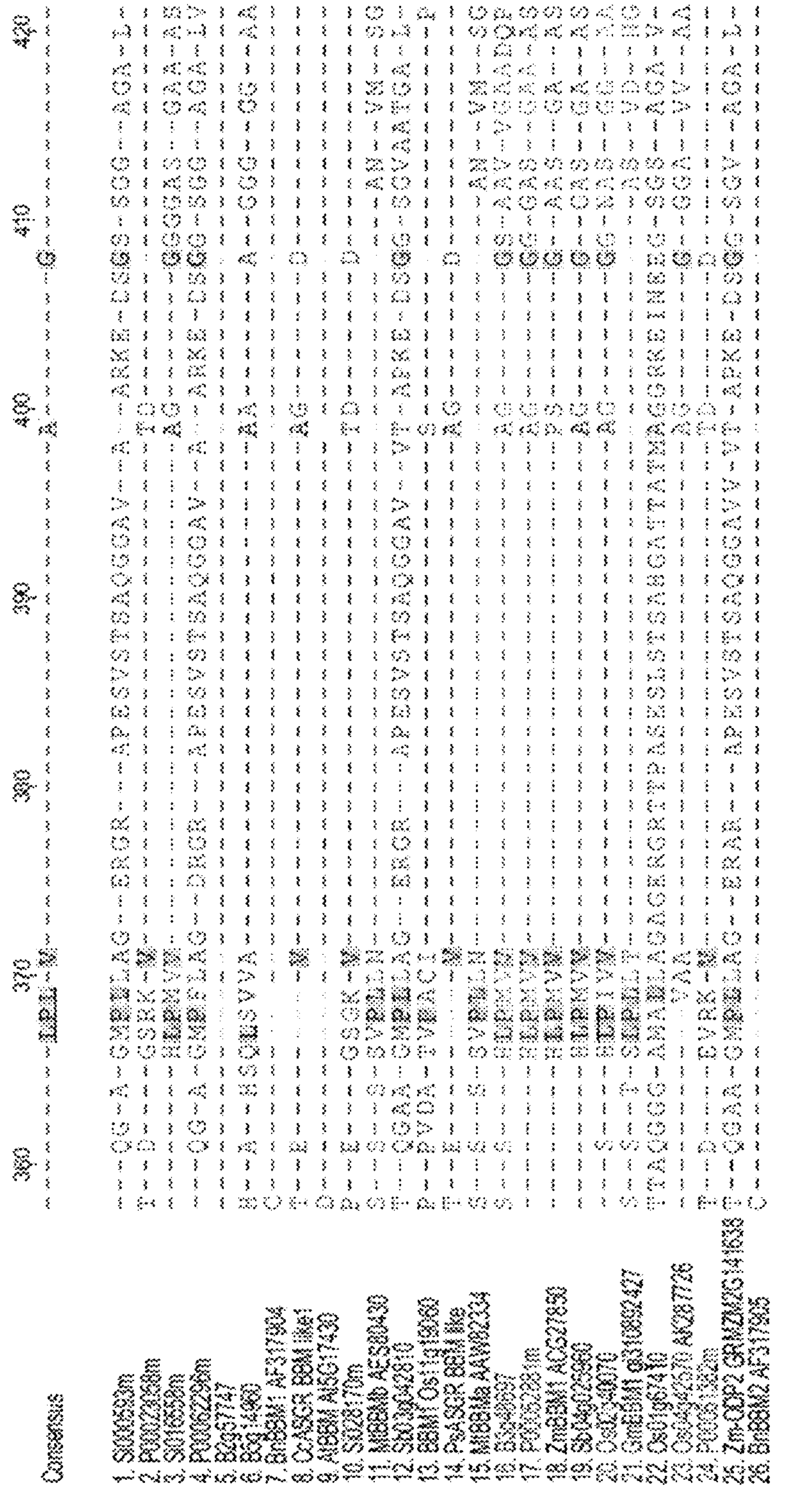
Figure 1:
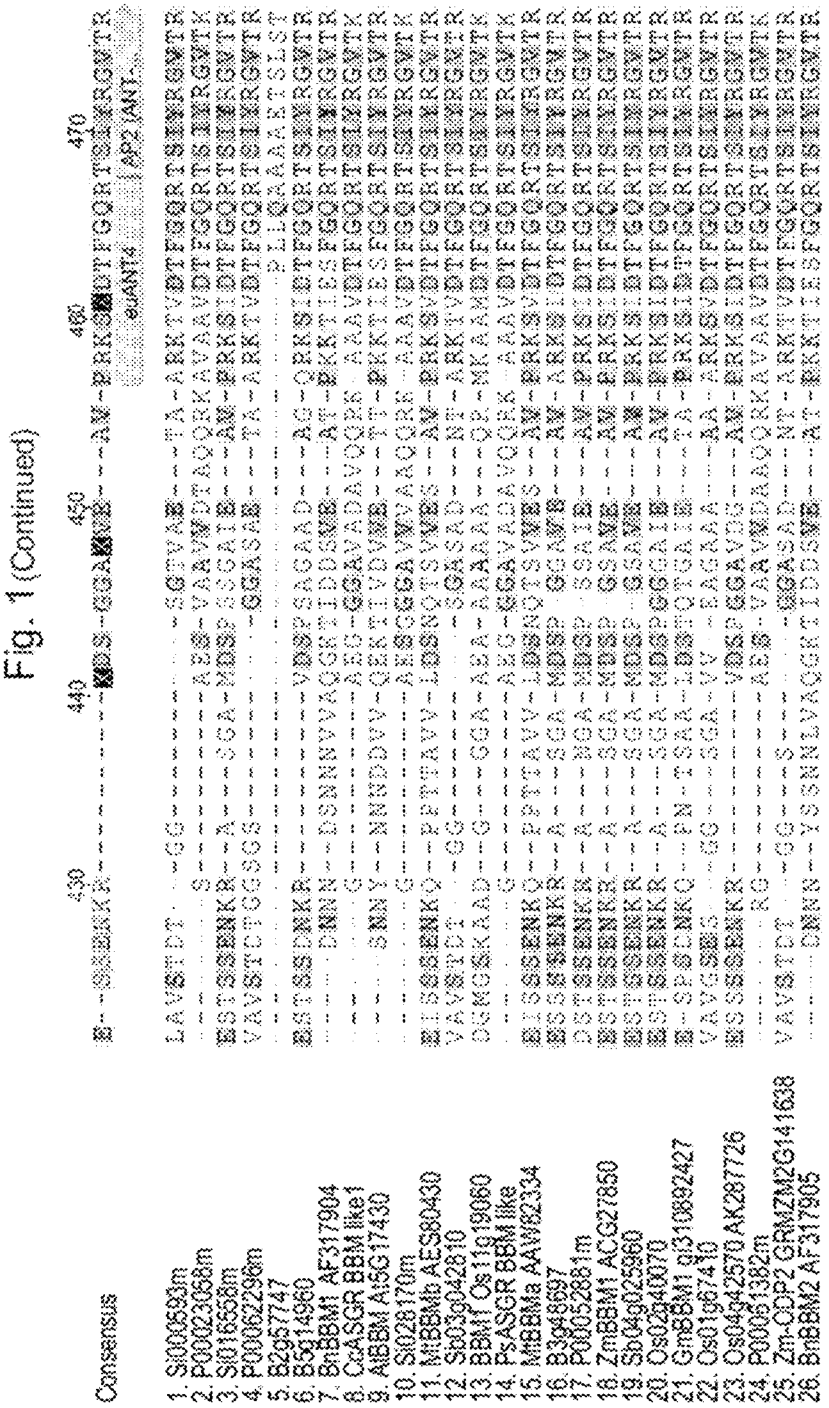
Figure 1:
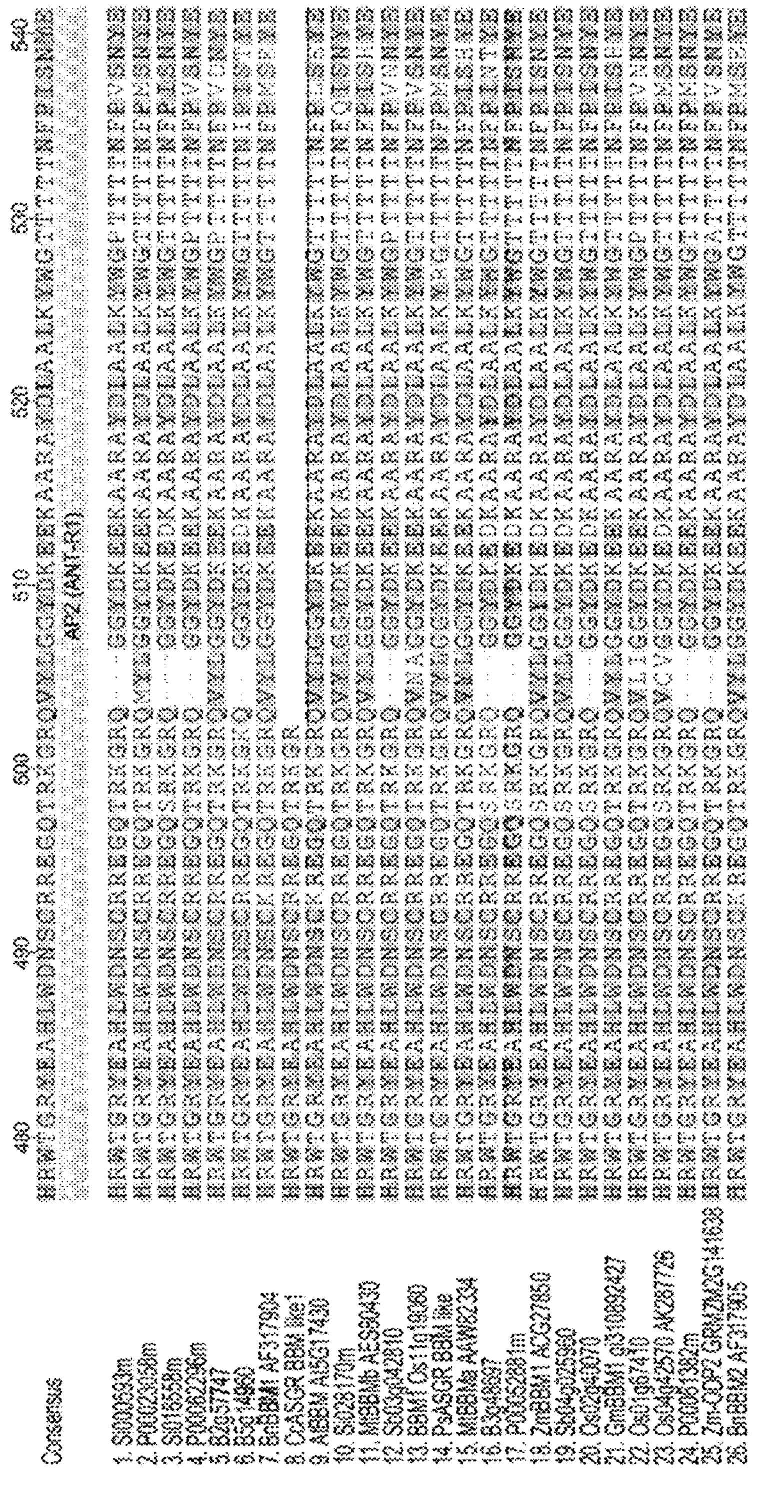
Figure 1:
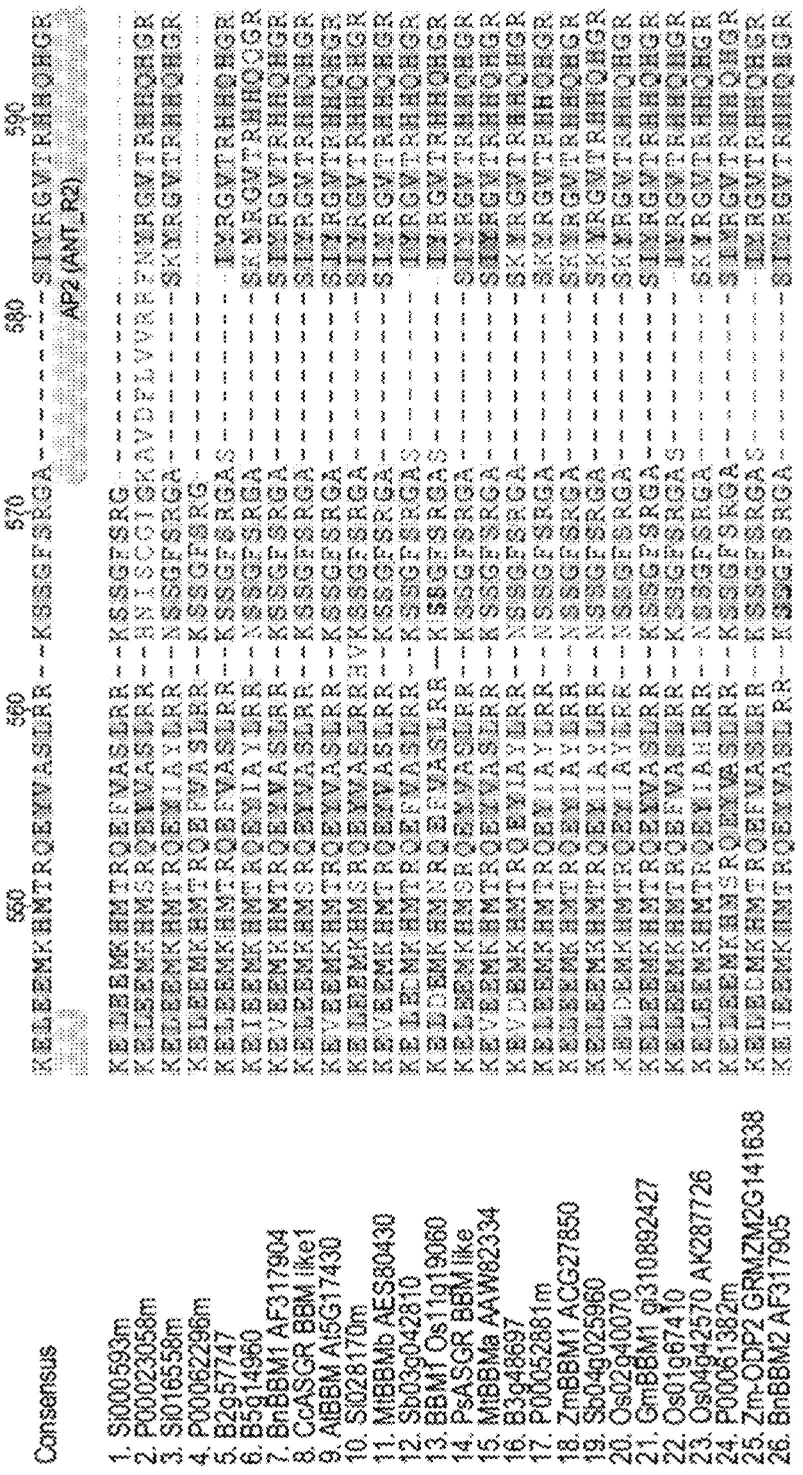
Figure 1:
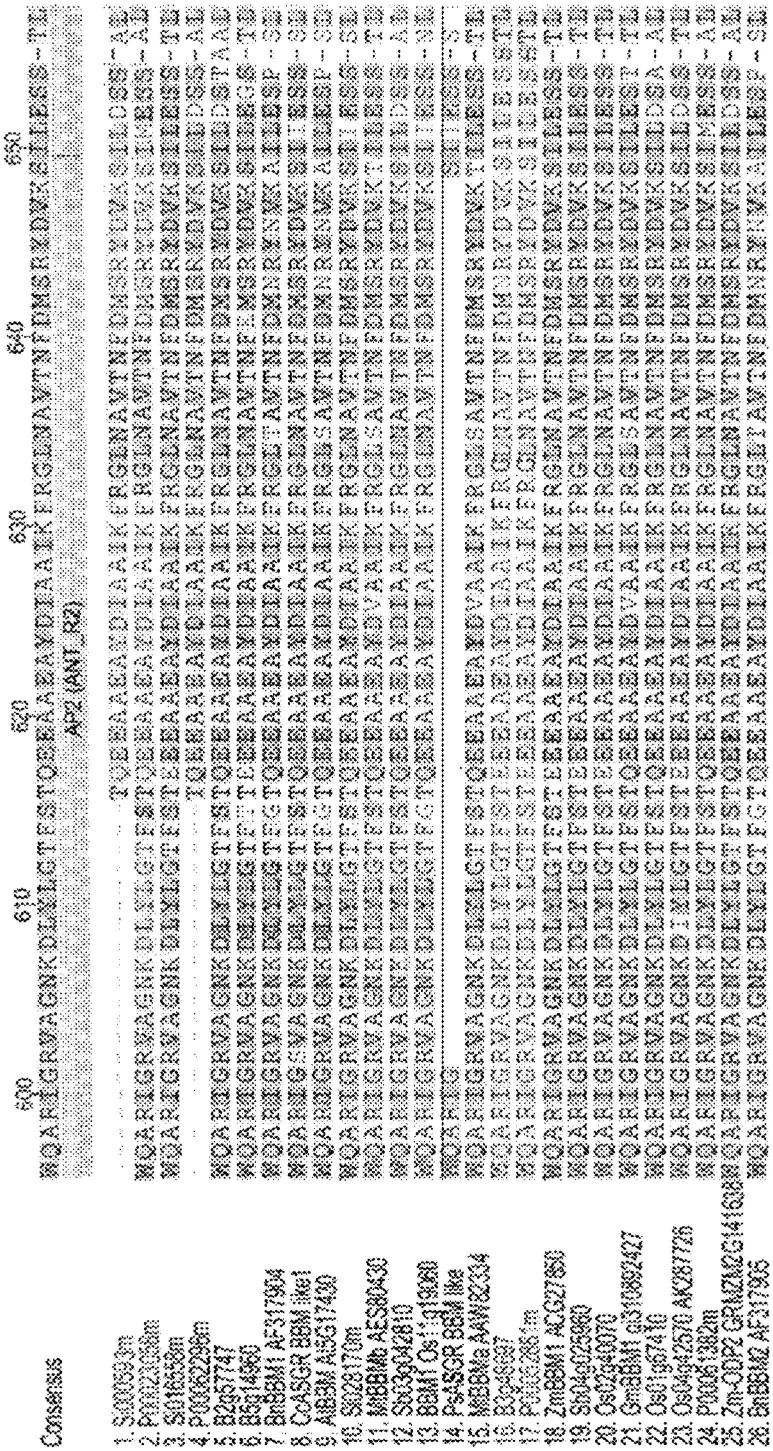
Figure 1:
Figure 1:
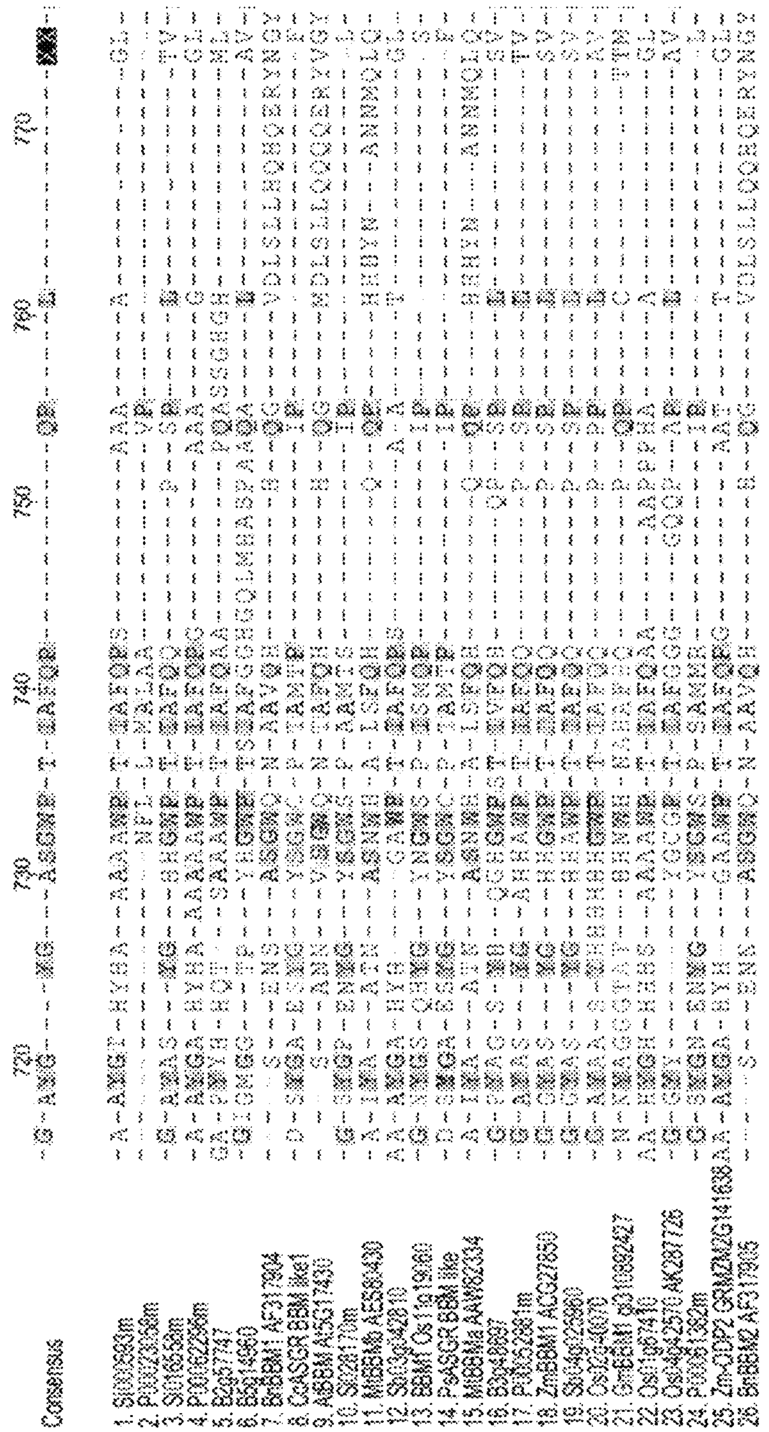
Figure 1:
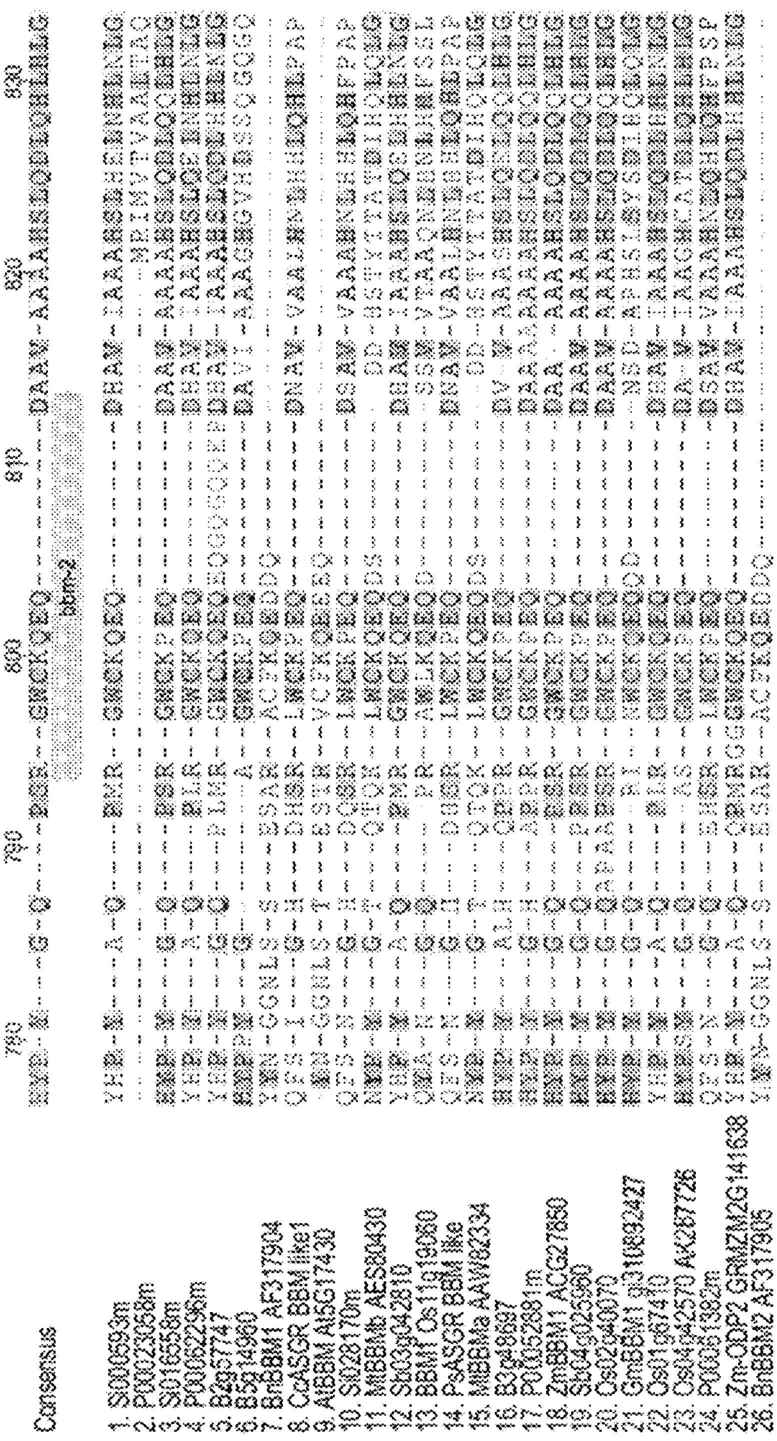
Figure 1:
Figure 1:
Figure 1:
Figure 1:

Unless otherwise noted, terms are to be understood according to conventional usage by those of ordinary skill in the relevant art.

As used herein, the terms "plant" and "plant part" can include inclusively, as context indicates, plant cells, plant protoplasts, plant cell tissue cultures from which plants can be regenerated, plant calli, plant clumps, and plant cells that are intact in plants or parts of plants such as embryos, pollen, ovules, seeds, flowers, kernels, ears, cobs, husks, stalks, roots, root tips, anthers, and the like.

The term polynucleotide can include the terms "nucleic acid", "nucleic acid sequence", and "oligonucleotide", as those terms are generally understood in the art. What is included in a specific instance will be appreciated by a person of skill in the art as indicated by the context, but where no particular context limits the scope, then the term will be understood to be broadly inclusive. Therefore, the term polynucleotide can also include DNAs or RNAs that contain one or more modified bases. Thus, DNAs or RNAs with backbones modified for stability or for other reasons are "polynucleotides", as that term is intended herein. Moreover, DNAs or RNAs comprising unusual bases, such as inosine, or modified bases, such as tritylated bases, to name just two examples, are polynucleotides as the term is used herein. It will be appreciated that a great variety of modifications have been made to DNA and RNA that serve many useful purposes known to those of skill in the art. The term polynucleotide as it is employed herein embraces such chemically, enzymatically or metabolically modified forms of polynucleotides, as well as the chemical forms of DNA and RNA characteristic of viruses and cells, including simple and complex cells, inter alia.

As used herein, the term "transgenic" describes a non-naturally occurring plant that contains a genome modified by man, wherein the plant includes in its genome an exogenous nucleic acid molecule, which can be derived from the same or a different species, including non-plant species. The exogenous nucleic acid molecule can be a gene regulatory element such as a promoter, enhancer, or other regulatory element, or can contain a coding sequence, which can be linked to a native or heterologous gene regulatory element. Transgenic plants that arise from sexual cross or by selfing are descendants of such a plant.

As used herein, "polymorphism" means the presence of one or more variations of a nucleic acid sequence at one or more loci in a population of one or more individuals. The variation can comprise, but is not limited to, one or more base changes, the insertion of one or more nucleotides, or the deletion of one or more nucleotides. A polymorphism includes a single nucleotide polymorphism (SNP), a simple sequence repeat (SSR), indels (insertions and deletions), a restriction fragment length polymorphism, a haplotype, and a tag SNP. In addition, a polymorphism can include a genetic marker, a gene, a DNA-derived sequence, a RNA-derived sequence, a promoter, a 5' untranslated region of a gene, a 3' untranslated region of a gene, microRNA, siRNA, a quantitative trait locus (QTL), a satellite marker, a transgene, mRNA, ds mRNA, a transcriptional profile, or a methylation pattern. A polymorphism can arise from random processes in nucleic acid replication, through mutagenesis, as a result of mobile genomic elements, from copy number variation and during the process of meiosis, such as unequal crossing over, genome duplication and chromosome breaks and fusions. The variation can be commonly found or can exist at low frequency within a population, the former having greater utility in general plant breeding and the latter can be associated with rare but important phenotypic variation.

As used herein, a "marker" can refer to a polymorphic nucleic acid sequence or nucleic acid feature. In a broader aspect, a "marker" can be a detectable characteristic that can be used to discriminate between heritable differences between organisms. Examples of such characteristics can include genetic markers, protein composition, protein levels, oil composition, oil levels, carbohydrate composition, carbohydrate levels, fatty acid composition, fatty acid levels, amino acid composition, amino acid levels, biopolymers, pharmaceuticals, starch composition, starch levels, fermentable starch, fermentation yield, fermentation efficiency, energy yield, secondary compounds, metabolites, morphological characteristics, and agronomic characteristics.

As used herein, a "genotype" can refer to the genetic component of the phenotype, and this can be indirectly characterized using markers or directly characterized by nucleic acid sequencing. Suitable markers include a phenotypic character, a metabolic profile, a genetic marker, or some other type of marker. A genotype can constitute an allele for at least one genetic marker locus or a haplotype for at least one haplotype window. In some embodiments, a genotype can represent a single locus, and in others it can represent a genome-wide set of loci. In some embodiments, the genotype can reflect the sequence of a portion of a chromosome, an entire chromosome, a portion of the genome, and the entire genome.

As used herein, a "construct" or "gene construct" can refer to a polynucleotide which codes for the particular gene of the gene construct. Such polynucleotides can be operably linked to one or more untranslated regions (UTRs), and/or one or more transcriptional initiation regulatory sequence/promoter regulatory region which is capable of directing the transcription of the polynucleotide in the intended host cell, such as tissues of a transformed plant, thereby regulating expression of a given gene. Expression of a given gene can be determined in terms of the amount of gene product or protein expressed, and a variety of methods can be used for detecting protein expression levels, including, for example, enzyme linked immunosorbent assays (ELISA), Western blots, immunoprecipitations, and immunofluorescence, and the like.

The construction of such gene constructs which can be employed in conjunction with the present invention is well known to those of skill in the art in light of the present disclosure. See, e.g., Sambrook et al.; Molecular Cloning: A Laboratory Manual. Cold Spring Harbor, N. Y. (1989); Gelvin et al.; Plant Molecular Biology Manual (1990). Plant Biotechnology: Commercial Prospects and Problems, eds. Prakash et al.; Oxford & IBH Publishing Co.; New Delhi, India; (1993); and Heslot et al.; Molecular Biology and Genetic Engineering of Yeasts; CRC Press, Inc., USA; (1992). For example, plant expression vectors may include (1) a cloned plant gene under the transcriptional control of 5' and 3' regulatory sequences and (2) a dominant selectable marker. Such plant gene constructs may also contain, if desired, a promoter regulatory region (e.g., one conferring inducible, constitutive, environmentally- or developmentally-regulated, or cell- or tissue-specific/selective expression), a transcription initiation start site, a ribosome binding site, an RNA processing signal, a transcription termination site, and/or a polyadenylation signal. Constitutive, tissue-preferred, or inducible promoters can be employed. For example, certain promoters are known to those in the art to be capable of initiating transcription preferentially in certain tissues, such as leaves, roots, fruit, seeds, or flowers.

As used herein, a "vector" can refer to any nucleic acid construct which is able to enter a plant cell, including circular or linear nucleic acids, and/or bacterial, viral fungal, plant and synthesized nucleic acids, as well as homologous or heterologous nucleic acid constructs.

As used herein, the terms "transform", "transformed", and "transforming" can refer to the introduction of a foreign gene into a plant. Numerous methods for introducing foreign genes into plants are known and can be used to insert nucleic acid sequences into a plant host, including biological and physical plant transformation protocols. See, for example, Miki et al. (1993) "Procedure for Introducing Foreign DNA into Plants," in Methods in Plant Molecular Biology and Biotechnology, ed. Glick and Thompson (CRC Press, Inc., Boca Raton), pages 67-88. The methods chosen can vary with the host plant, and many such methods are known to those in the art; these include chemical transfection methods such as calcium phosphate, microorganism-mediated gene transfer such as *Agrobacterium* (Horsch et al. (1985) Science 227:1229-1231), electroporation, micro-injection, and biolistic bombardment. Expression cassettes and vectors and in vitro culture methods for plant cell or tissue transformation and regeneration of plants are known and available. See, for example, Gruber et al. (1993) "Vectors for Plant Transformation," in Methods in Plant Molecular Biology and Biotechnology, ed. Glick and Thompson (CRC Press, Inc., Boca Raton), pages 89-119.

Once a single transformed plant has been obtained, e.g., a plant transformed with a desired gene, conventional plant breeding methods can be used to transfer the structural gene and associated regulatory sequences via crossing and backcrossing. In general, such plant breeding techniques are used to transfer a desired gene into a specific plant, e.g., a crop plant or another type of plant used for commercial purposes. Accordingly, the methods of the claimed invention can be used in, for example, plant breeding, plant improvement, propagation of unstable and/or recessive genotypes, seed production, and trait propagation, as well as other purposes involving the reproduction of plants.

As used herein, the terms "sequence identity" or "identity" in the context of two nucleic acid or polypeptide sequences includes reference to the residues in the two sequences that are the same when aligned for maximum correspondence over a specified comparison window. When percentage of sequence identity is used in reference to proteins it is recognized that residue positions that are not identical often differ by conservative amino acid substitutions, where amino acid residues are substituted for other amino acid residues with similar chemical properties (e.g., charge or hydrophobicity) and therefore do not change the functional properties of the molecule. When sequences differ in conservative substitutions, the percent sequence identity may be adjusted upwards to correct for the conservative nature of the substitution. Sequences that differ by such conservative substitutions are often said to have "sequence similarity" or "similarity". Means for making this adjustment are well known to those of skill in the art. Typically this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., as implemented in the program PC/GENE (Intelligenetics, Mountain View, Calif.).

Those in the art recognize that the value determined by comparing two optimally aligned sequences over a comparison window, wherein the portion of the polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison, and multiplying the result by 100 to yield the percentage of sequence identity.

The percentage of sequence identity/similarity is an integer selected from the group consisting of from 50 to 99. Exemplary sequence identity/similarity values include 55%, 60%, 65%, 70%, 75%, 80%, 85%, 90%, and 95%. Sequence identity can be determined using, for example, the GAP, CLUSTALW, or BLAST algorithms, preferably BLAST. Substantial identity of nucleotide or amino acid sequences for these purposes normally means sequence identity of at least 60%, 70%, 80%, 90%, and 95% or higher.

Moreover, one of skill in the art will recognize that the sequence identity values can be appropriately adjusted to determine corresponding identity of proteins encoded by two nucleotide sequences by taking into account codon degeneracy, amino acid similarity, reading frame positioning, and the like. Polypeptides that are "substantially similar" share sequences as noted above except that residue positions, which are not identical, can differ by conservative amino acid changes. Another indication that nucleotide sequences are substantially identical is if two molecules hybridize to each other under stringent conditions. Generally, stringent conditions are selected to be about 5° C. to about 20° C. lower than the thermal melting point (Tm) for the specific sequence at a defined ionic strength and pH. The Tm is the temperature (under defined ionic strength and pH) at which 50% of the target sequence hybridizes to a perfectly matched probe. Typically, stringent wash conditions are those in which the salt concentration is about 0.02 molar at pH 7 and the temperature is at least about 50, 55, or 60° C. However, nucleic acids which do not hybridize to each other under stringent conditions are still substantially identical if the polypeptides that they encode are substantially identical. This may occur, e.g., when a copy of a nucleic acid is created using the maximum codon degeneracy permitted by the genetic code. One indication that two nucleic acid sequences are substantially identical is that the polypeptide encoded by the first nucleic acid is immunologically cross reactive with the polypeptide encoded by the second nucleic acid.

For a description of various libraries, vectors, nucleic acids, etc., see, for example, Stratagene Cloning Systems, Catalogs 1999 (La Jolla, Calif); and, Amersham Life Sciences, Inc, Catalog '99 (Arlington Heights, Ill.).

The specification and claims use the singular forms "a", "an", and "the". These terms are intended to not exclude a plural interpretation, and may preferably include a plural interpretation, depending on the context. Thus, for example, reference to "a compound" may include a variety of such compounds, or several of those same compounds, unless the interpretation is contrary to the context in which it is used.

Apomixis is a naturally occurring developmental process of asexual reproduction wherein the offspring produced are genetically identical to the mother plant, thereby resulting in clonal propagation of the maternal plant through seed. Multiple forms of apomixis exist in nature. For example, gametophytic apomixis is characterized by apomeiosis, which is the formation of unreduced embryo sacs derived from nucellar cells of the ovary, as well as by parthenogenesis, which is the development of the unreduced egg into an embryo. The ability to accomplish apomixis via genetic engineering or introgression can have a major economic impact for agricultural crops, as breeding programs would have the ability to transmit apomixis through the paternal gametes, then subsequently fix hybrid genotypes/vigor through clonal propagation of the maternal seed.

Apospory is one form of apomixis, which is prevalent in the grass family. This gametophytic form of apomixis is characterized by the failure of meiosis (apomeiosis) or by the degeneration of meiotic products and the development of embryo sacs from chromosomally unreduced nucellar cells. In these embryo sacs, the unreduced egg develops parthenogenetically. Therefore, apomeiosis and parthenogenesis are two fundamental components of apomixis. The results described herein demonstrate the molecular basis for apomixis in a plant species where the reproductive process has naturally evolved. This discovery can be utilized to facilitate the propagation of superior gene combinations in crop plants. A gene that induces the apomixis trait has been highly sought after for decades. Such a gene can be of great value in plant breeding.

The present work describes apomictic species in the genera *Pennisetum* and *Cenchrus*; both genera are in the grass family, which is the single most important family of cultivated plants. One of the members of this family is pearl millet (*Pennisetum glaucum* syn. *Cenchrus americanus*), which is a sexual diploid grain crop with significant production in the semi-arid tropics. The genus *Pennisetum* also has many apomictic species, most of which have been crossed with pearl millet in an attempt to introduce gene(s) for apomixis; however, male sterility during backcrossing has heretofore limited their use for conventional transfer of the apomixis trait (Dujardin M., Hanna W., *J Hered.* 74:277-279 (1983a); Dujardin M., Hanna W., *Crop Sci.* 23:156-160 (1983b); Dujardin M., Hanna W., *Theor. Appl. Genet.* 69:97-100 (1984); Dujardin M., Hanna W., *Crop Sci.* 25:59-62 (1985)). Some progress with conventional transfer has been achieved via the use of apomictic *P. squamulatum* (2n=8x=56) (Akiyama Y. et al., *J Hered.* 97:521-524 (2006)) as the male parent in crosses with artificially induced tetraploid pearl millet (Dujardin M., Hanna W., J Genet. Breed. 43:145-151 (1989)).

Apospory is the type of apomictic reproduction in *Pennisetum/Cenchrus* (Ozias-Akins P. et al., *Funct. Integr. Genomics* 3:94-104 (2003)), i.e., one or more somatic cells of the nucellus begins to enlarge, and the nucleus of each aposporous initial undergoes two successive mitotic divisions to produce a four-nucleate embryo sac. The four nuclei comprise the egg, two synergids, and one polar nucleus, or, alternatively, the egg, one synergid, and two polar nuclei. The uni- or bi-nucleate central cell must be fertilized in pseudogamous species in order for endosperm to develop (Kojima A., Nagato Y., *Sex. Plant Reprod.* 5:79-85 (1992); Naumova T. et al., *Acta Botanica Neerlandica* 42:299-312 (1993); Nogler G., Gametophytic apomixis, in: *B. M.* Johri (Ed.), *Embryology of Angisoperms*, Springer, Berlin. pp. 475-518. (1984)). Thus, there is selection pressure for normal microsporogenesis resulting in viable pollen even though female meiosis can be irregular. The unreduced egg cell begins parthenogenetic development (Vielle J. et al., *Link. Plant J* 8:309-316 (1995)) either slightly before or soon after single fertilization of the central cell in apomictic *Cenchrus ciliaris.*

The reproductive phenotype of species and hybrids in a genus usually can be determined unambiguously based on screening of a relatively small number of cleared pistils (which have been made optically transparent through chemical treatment). Phenotype in the genus *Pennisetum* can also be established via a dominant, red marker gene (Hanna W., Burton G., *J Heredity* 83:386-388 (1992)) that, when present in the pollen parent of a testcross, will allow the classification of red progeny as having arisen through sexual reproduction.

The *Pennisetum squamulatum* origin of apomixes has been previously described (U.S. Pat. No. 5,811,636). In addition, a nucleic acid marker has been used to identify a clone containing the gene of interest (U.S. Pat. No. 6,028, 185), and some apospory genes have been previously characterized (Huo H. "Genetic analysis of the apospory-specific genomic region (ASGR) in *Pennisetum* squamulatum: from mapping to candidate gene" (Doctoral dissertation) (2008). Retrieved from http <colon slash slash>dbs <dot>galib <dot> uga <dot> edu <slash> cgi-bin <slash> getd <dot> cgi?userid=galileo&servemo=9&instcode=ugal; Zeng Y. "Identification and characterization of apospory candidate genes in *Pennisetum* and *Cenchrus*" (Doctoral dissertation) (2008). Retrieved from http <colon slash slash> dbs <dot> galib <dot> uga <dot> edu <slash> cgi-bin <slash> getd <dot>cgi?userid=galileo&servemo=9&instcode=ugal)). Apomixis is transmitted by a physically large, non-recombining chromosomal region in *P. squamulatum*; this region is known as the apospory-specific genomic region (ASGR) (P. Ozias-Akins, D. Roche, W. W. Hanna, *Proc Natl Acad Sci USA* 95:5127-5132 (1998)), and the PsASGR-BabyBoom-Like (PsASGR-BBML) genes reside within this region (G. Gualtieri et al., *Plant Physiology* 140:963-971 (2006)).

Apomixis in *Pennisetum* has been mapped molecularly via RAPD, RFLP, AFLP, and SCAR markers conducted in backcross populations as well as through a pseudo-testcross between the heterozygous apomict *P. squamulatum* (as male parent) and sexual pearl millet (Dujardin M., Hanna W., *J Genet.* Breed. 43:145-151 (1989); Goel S. et al., *Genetics* 163:1069-1082 (2003); Ozias-Akins P. et al., *Proc. Natl. Acad. Sci. USA* 95:5127-5132 (1998); Ozias-Akins P. et al., *Theor. Appl. Genet.* 85:632-638 (1993)). It was determined that a single linkage group from the apomictic parent was necessary and sufficient for the transmission of apomixis, and a single, intact chromosome has been transmitted to the BC8 generation where it has been found to reside in a tetraploid pearl millet background (Singh et al., *Crop Sci.* 50:892-902 (2011)). Mapping in a second species, namely *C. ciliaris*, has yielded similar results (Jessup R. et al., *Crop Sci.* 42:1688-1694 (2002); Roche D. et al., *Plant J* 19:203-208 (1999)). In both species, high-resolution mapping is prevented by a non-recombining chromosomal block, although the size of the ASGR has been reduced by recombination to ~¼ of a chromosome or ~50 Mb. A recombinant in buffelgrass was recently recovered that demonstrates separation of apomeiosis and parthenogenesis (Conner et al., *Planta* 238:51-63 (2013)). This recombinant retained the portion of the ASGR required for aposporous embryo sac formation; however, the portion of the ASGR necessary for parthenogenesis was lost. Comparison of the ASGR between buffelgrass and *P. squamulatum* shows conservation both on the macrosyntenic and microsyntenic level (Goel S. et al., *Genetics* 173:389-400 (2006); Gualtieri G. et al., *Plant Physiol* 140 963-971 (2006))

DNA sequence analysis of bacterial artificial chromosome clones (Roche D. et al., *Theor. Appl. Genet.* 104:804-812 (2002)) mapped to the ASGR has been conducted to search for synteny between rice and the two apomictic species under study. While small regions of microsynteny were identified whereas macrosynteny was not established, 25 *C. ciliaris* and 23 *P. squamulatum* ASGR genes were identified (Conner J. et al., *Plant Physiol.* 147:1396-1411 (2008)), with the sequencing data showed that overall the ASGR is a gene-poor and transposable element rich region. The identification of a highly abundant long terminal repeat (LTR) sequence within the ASGR sequencing data has allowed for the development of sequence-specific amplified polymorphism (SSAP) markers, which have been used to efficiently target the ASGR (Huo H. et al., *Theor. Appl. Genet.* 119: 199-212 (2009)).

As described herein, in *Pennisetum squamulatum* (L.) R.Br., apomixes has been found to segregate as a single dominant locus, namely the ASGR, which contains multiple copies of the PsASGR-BBML gene. The present study investigated the function of PsASGR-BBML in sexual tetraploid pearl millet and apomictic F1 plants. PsASGRBBML was found to be expressed in egg-cells prior to fertilization, and expression of PsASGR-BBML in sexual pearl millet was found to induce parthenogenesis and the production of haploid offspring. Reduced PsASGR-BBML expression in apomictic F1 transgenic plants inheriting a PsASGR-BBML silencing construct was found to correspond with fewer parthenogenetic embryos and cell number in parthenogenetic embryos. These data demonstrate the key role of the PsASGR-BBML gene in parthenogenesis in the apomictic pathway.

The results described herein describe a gene found in tightly-linked ASGR bacterial artificial chromosome (BAC) vectors of both apomictic species, but lost in the recombinant *C. ciliaris* plant lacking parthenogenesis; this gene has high protein similarity to the BABY BOOM (BBM) gene of *Brassica napus*. BBM originally was coined as the gene name for a cDNA transcript that was induced in microspore cultures of *Brassica napus* (BnBBM) undergoing somatic embryogenesis (Boutilier K. et al., Plant Cell 14:1737-1749 (2002)). BnBBMJ and BnBBM2 predicted proteins are 98% similar to one another and are also 85% similar to their *Arabidopsis* ortholog.

These three proteins have the key feature of an AP2-domain region. AP2 domains, named for an amino acid repeat identified in the APETALA2 gene of *Arabidopsis* (Jofuku K. et al., *Plant Cell* 6:1211-1225 (1994)), a flower development gene that also was shown to be involved in regulation of other floral homeotic genes, are 60-70 amino acid DNA-binding domains (Pfam-PF00847). These AP2 domains are characteristic of a large family of transcription factor proteins that cluster due to their similarity in this conserved region, which is highly conserved among not only BBM but other related developmental genes in this class.

The APETALA 2/ETHYLENE RESPONSE FACTOR (AP2/ERF) DNA-binding domain family has been identified in a wide group of plants, such as mosses, algae, gymnosperms, and angiosperms. The AP2 gene family is divided into two groupings, namely the ERP-like (ethylene response element binding factor) and AP2-like groups (Weigel D. *Plant Cell* 7:388-389 (1995); Ohme-Takagi M. and Shinshi H. *Plant Cell* 7:173-182 (1995); Okamuro J. et al., *Proceedings of the National Academy of Sciences* 94:7076-7081 (1997)). The ERP-like group is characterized as having only a single AP2 domain, in this group, functions tend to be related to stress responses (biotic and abiotic) (Riechmann J. and Meyerowitz E., *Biol. Chem.* 379:633-646 (1998)). The AP2-like genes contain two AP2 domains (repeat 1 and 2) that have similarity to one another and a short interdomain linker region; this group can be further divided into two groups, namely eu-AP2 (which includes APETELA2) and ANT (for AINTEGUMENTA) lineages. The ANT lineage can itself be divided between basalANT and euANT lineages, which contain specific motifs euANT1 thru 4 (S. Kim, P. S. Soltis, K. Wall, D. E. Soltis, Mal. Biol. Evol. 23:107-120 (2006)), which contain the PLETHORA-like, AINTEGUMENTA-like, AINTEGUMENTA-likel, AINTEGUMENTA-like5 and BBM-like subgroups. Proteins within these subgroups have critical roles in meristem maintenance, cell proliferation, organ initiation and growth, embryogenesis, and root formation (A. Horstman, V. Willemsen, K Boutilier, R. Heidstra, *Trends in Plant Science* 19:146-157 (2014)). The ANT lineage is required for integument initiation and female gametophyte development in addition to early growth of other primordia, with the exception of roots (Elliott R. et al., *Plant Cell* 8:155-168 (1996); Klucher K. et al., *The Plant Cell* 8:137-153 (1996)). ANT, AtBBM, and BnBBM genes fall within the ANT clade (Kim S. et al., Mal. Biol. Evol. 23:107-120 (2006)).

Figure 2:
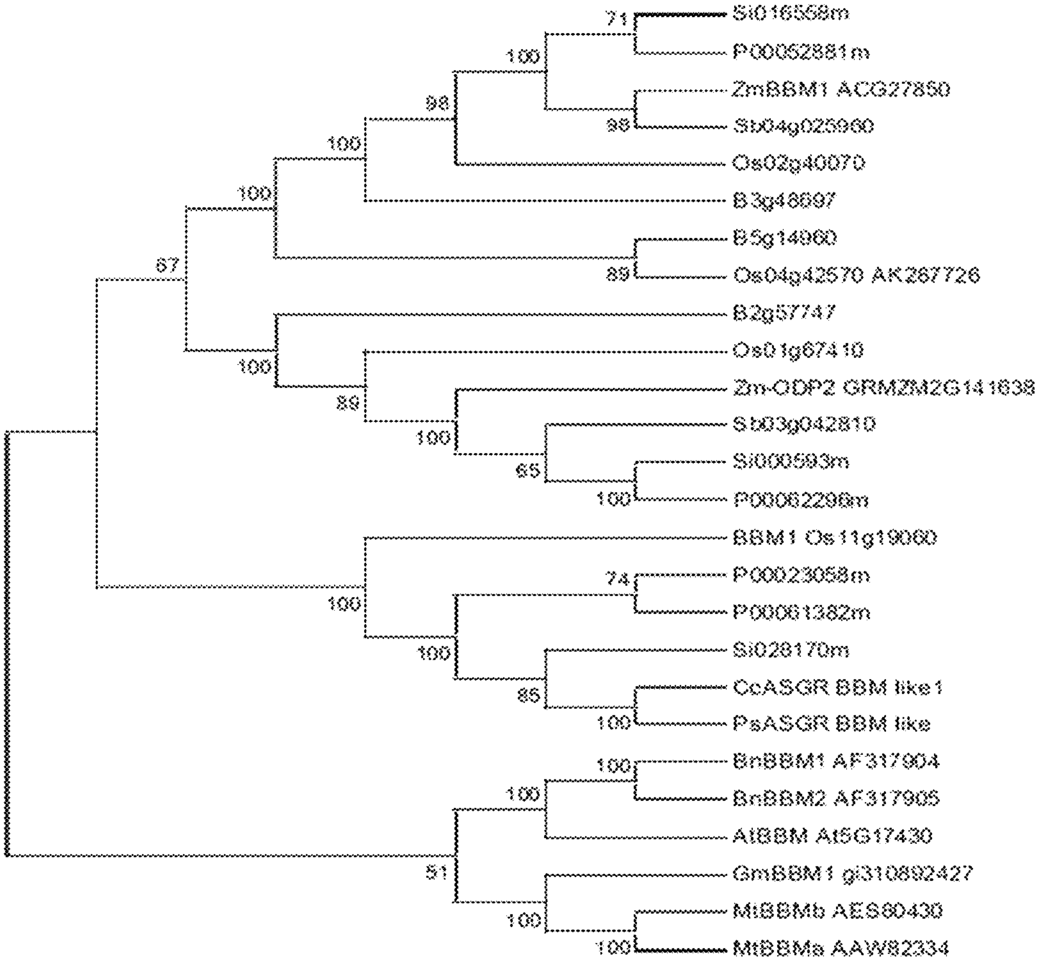
FIG. 2 depicts a phylogenetic tree of 26 BBM-like proteins. The evolutionary history was inferred using the Neighbor-Joining method (N. Saitou, M. Nei, *Molecular Biology and Evolution* 4:406-425 (1987)). The evolutionary distances were computed using the JTT matrix-based method (D. T. Jones, W. R. Taylor, J. M. Thornton, *Computer Applications in the Biosciences* 8:275-282 (1992)). The bootstrap consensus tree shown was inferred from 1000 replicates (J. Felsenstein, Evolution 39:783-791 (1985)). Branches corresponding to partitions reproduced in less than 50% bootstrap replicates were collapsed. The percentage of replicate trees in which the associated taxa clustered together in the bootstrap test is shown next to the branches. All ambiguous positions were removed for each sequence pair. There were a total of 1067 positions in the final dataset. Evolutionary analyses were conducted in MEGA6 (K. Tamura et al., *Molecular Biology and Evolution* 30:2725-2729 (2013)).

A BBM-like gene from *Zea mays* called ODP2 has previously been described (International Patent No. WO2005075655; U.S. Pat. No. 8,420,893). However, the apomixis-specific BBM differs substantially from the maize BBM genes outside of the AP2-domain. The BBM, BBM-like, and ASGR-BBM-like proteins share a conserved bbm-1 domain that has not been identified in other members of the euANT lineage. Deletion of the bbm-1 domain has eliminated the ability of transgenic plants to induce somatic embryogenesis on cotyledons (S. El Ouakfaoui et al., *Plant Mal Biol* 74:313-326 (2010)). A published phylogenetic study of the BBM-like proteins (S. El Ouakfaoui et al., *Plant Mal Biol* 74:313-326 (2010)) was extended to include BBM-like proteins from newly sequenced monocots. A distinct clade of proteins from *Oryza sativa*, including the ASGRBBMs, BBM1 (Osllg19060), and proteins from *Setaria italica* and *Panicum virgatum* were found to be formed in the majority of phylogenic trees constructed (FIG. 2). No functional studies on the genes within this clade, other than PsASGR-BBML, have been reported, although the UniGene database at NCBI (http <colon slash slash> www <dot> ncbi <dot> nlm <dot> nih <dot> gov <slash> unigene) and the Rice Oligonucleotide Array Database (http <colon slash slash> www <dot> ricearray <dot>org <slash> expression <slash> expression <dot> php) contains limited expression data for BBM1.

While BBM genes have been expressed from sexual species in ovules prior to fertilization, neither embryo development nor an apomixis phenotype has been observed to date. The expression of BnBBM has been observed in microspores 3-4 days post-induction (at the time they were destined to become embryogenic), persisting throughout the time frame tested (28 days post-induction) (Boutilier K. et al., *Plant Cell* 14:1737-1749 (2002); Malik M. et al., *Plant Physiology* 144:134-154 (2007)). BnBBM expression, as determined by RT-PCR, has also been observed in 3-day-old seeds/globular embryos, and expression was found to persist throughout embryo development (Malik M. et al., *Plant Physiology* 144:134-154 (2007)). BnBBM and BnLECJ (LEAFY COTYLEDON 1), whose expression primarily occurs during microspore and zygotic embryogenesis, are considered to be markers for embryogenesis. BBM was also found to be detectable in *Arabidopsis* ovules in free-nuclear endosperm, as established by in situ hybridization (Boutilier K. et al., *Plant Cell* 14:1737-1749 (2002)). While expression was found to decline in endosperm once cellularization was initiated, to date there has been no published evidence for expression of BBM in egg or zygote cells within ovules. BnBBM was originally considered to provide a route to induction of adventitious embryony in seeds, hence maternally derived embryos as a form of apomixis (U.S. Pat. No. 7,151,170). In adventitious embryony, no alteration in embryo sac development occurs; rather, somatic cells of the ovule, usually nucellus, directly divide to form embryos. Adventitious embryony is therefore sporophytic apomixis.

While amino acid similarity between the AP2 regions of ASGR-BBML and BnBBM is high (96%), the similarity declines significantly outside of this region (35% similarity upstream and 27% similarity downstream). Three highly conserved genomic duplications of PsASGR-BBML have been identified from ASGR-linked BACs p203, p207 (J. A. Conner et al., *Plant Physiol.*147:1396-411(2008)), and p208 to date. The p208 PsASGR-BBML sequence is identical to the p207 PsASGR-BBML2 sequence (EU559277.1), with the exception of the number of AT repeats (11 vs. 17) found in intron 1. The conservation of gene sequence means that it is not clear which of the PsASGR-BBML genomic regions are transcribed. The PsASGR-BBML transcript encodes a 545 amino acid protein derived from the splicing of 8 exons, a 73 bp 5' UTR, and multiple 3' UTRs, with lengths ranging from 30 to 258 bp. The PsASGR-BBML gene contains two AP2 DNA-binding domains and is therefore predicted to function as a transcription factor (FIG. 1). Two ASGR-linked copies of ASGR-BBML also have been found to be present in apomictic *Cenchrus ciliaris* (J. A. Conner et al., *Plant Physiol.*147:1396-411 (2008)), both of which are transcribed. CcASGR-BBM-like1 contains a full open reading frame nearly identical to PsASGR-BBML whereas CcASGR-BBMLike2 contains two nonsense mutations, the first of which is located within the first AP2 domain. Two related, but ASGR-unlinked, BBML (non-ASGR-BBML) genes also have been isolated from *C. ciliaris*, and orthologs have been found to be present in *P. squamulatum*. A previous comparative study with rice showed that ASGR-BBML was most closely related to a BBM gene at rice locus Osllg19060 (Conner J. et al., *Plant Physiol.* 147:1396-1411 (2008)), for which no function has been identified to date; expression has been documented in seed (5 days after pollination) and embryo (25 days after pollination), but not pistil (see http <colon slash slash> rice <dot> plantbiology <dot> msu <dot> edu <slash> cgi-bin <slash> ORF_infopage <dot> cgi?orf=LOC_Osllg19060). Furthermore, ASGR-BBML is conserved among eight apomictic, but absent from seven sexual, *Pennisetum* species tested (Akiyama Y. et al., *BMC Evol. Biol.* 11:289 (2011)).

Due to the protein similarity of the ASGR-BBM-LIKE (ASGR-BBML) gene to BBM, it was evaluated as to its use as an "apomixis" gene. As described herein, the ASGR-BBML gene was identified, and its role in parthenogenesis was characterized. ASGR-BBML was found to have an important role as a key gene in the induction of parthenogenesis in the apomictic pathway.

These results demonstrate that ASGR-BBML can be used to achieve in parthenogenesis in plants that do not normally show this phenotype. The seed set of the transformed lines was low, and plant offsprings can be screened for ploidy level. Parthenogenetic transgenic lines can thereby produce offspring that are reduced to the diploid level (or haploid within the context of the cell cycle). As haploid induction followed by chromosome doubling is a breeding practice followed in many cereal crops to more rapidly obtain homozygous lines, these findings can be used for haploid induction in sexual plants or clonal reproduction through an apomictic pathway dependent on chromosomal non-reduction in egg cells.

Figure 25:
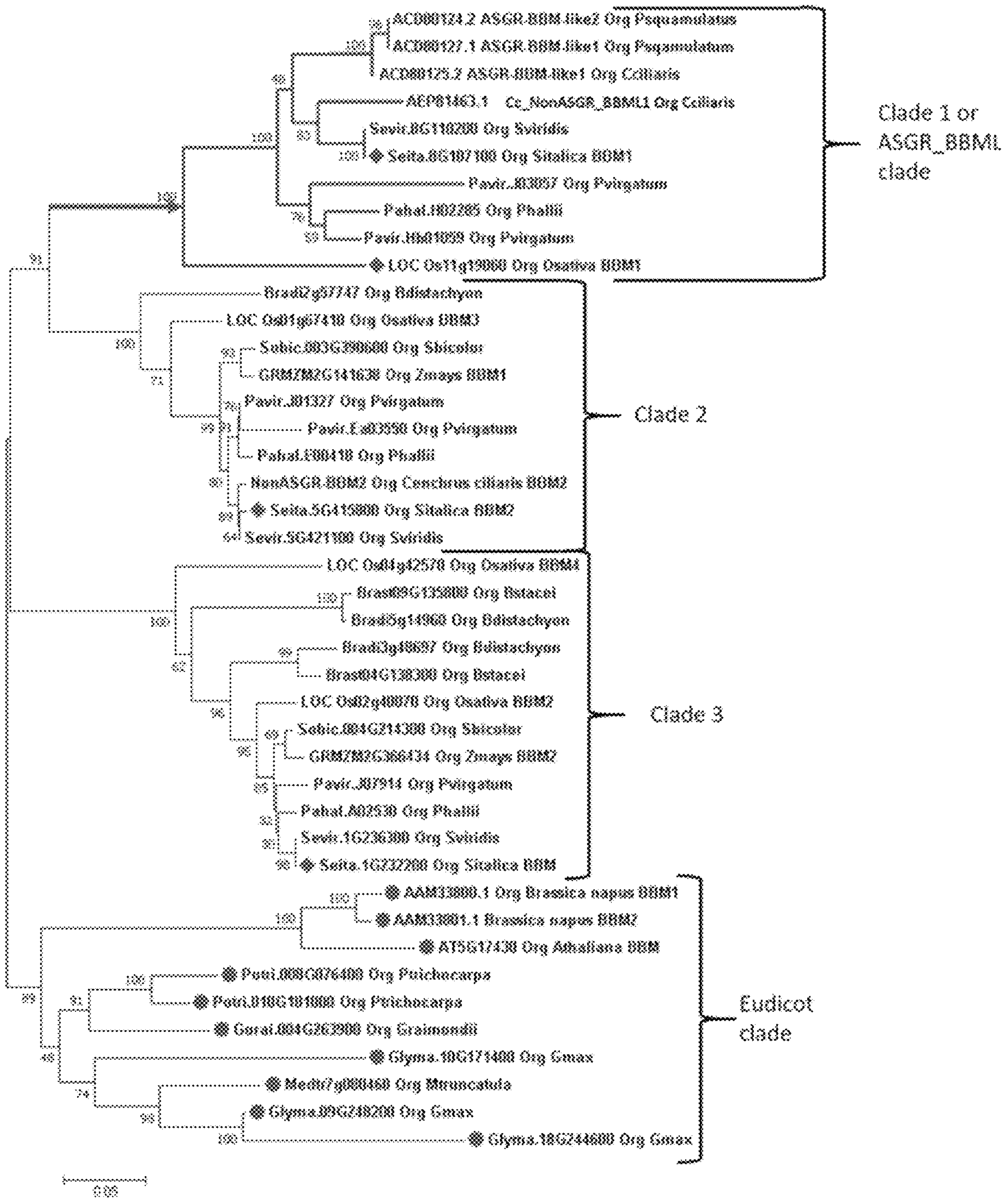
FIG. 25 depicts phylogenetic clades applicable to the invention.

The gene construct used in the invention can include a sequence from the phylogenetic clades provided in FIG. 25.

In some embodiments, the gene construct can include a gene selected from Seita.8G107100 (SiBBM1), Sieta.5G415800 (SiBBM2) and Seita.1G232200 (SiBBM3). In some embodiments, the gene construct can include a sequence that has 50, 55, 60, 65, 70, 75, 80 or more percent similarity to Seita.8G107100.1.p (SiBBM1), Sieta.5G415800.1.2 (SiBBM2) and Seita.1G232200.1.p (SiBBM3).

```
>Seita.8G107100.1.p
                                                              (SEQ ID NO: 70)
MGSTNNWLGF ASFSGAADDA AILPPLPPSP RGDGAGAEPK LEDFLGLQEP AATVAAGRPF   60

VGTGGASSIG LSMIKNWLRS QPAPEPAVAA DSMALAAVAV VSPEGSGKVT DDGAESGGGA  120

VVVAAQQRKA AAVDTFGQRT SIYRGVTKHR WTGRYEAHLW DNSCRREGQT RKGRQVYLGG  180

YDKEEKAARA YDLAALKYWG TTTTTNFQIS NYEKELEEMK HMSRQEYVAS LRRKSSGFSR  240

GASIYRGVTR HHQHGRWQAR IGRVAGNKDL YLGTFSTQEE AAEAYDIAAI KFRGLNAVTN  300

FDMSRYDVKS IIESSSLPVG GTTKRLKDVP DQSDMGRNGH SADSVGHMTA TNLLTDGIGS  360

YGPENYGYSG WSPAAMTSIP LQFSNGHDQS RLWCKPEQDS AVVAAAHNLH HLQHFPAPGG  420

THNFFQPSPI QDMTGVADVS SPSVDSNSFS YNGSVGYHGA MGGGYAMPVT TLVEGNPAAS  480

GYGVEEGTTD VYDCRNIYYL SQGSPGANTG KPEAYDQQGA GYESWVPAVP VISQKAANVT  540

VCHGTPLYSV WK*
```

-continued

```
>Seita.5G415800.1.p
                                                                   (SEQ ID NO: 71)
MATVNNWLAF SLSPQDLPPS QTDSTLISAT ATDEVSGDVC FNIPQDWSMR GSELSALVAE   60

PKLEDFLGGI NFSEQHHKAN LNVIPSSSNA CYASSGASTG YHQLYHHQSS ALHFADSVMV  120

ASSAGVHDGG ASMLSAAATV NGGAGAASAN GGSIGLSMIK NWLRSQPAPP LPQPRVVAAA  180

EGAQAAQGLS LSMNMAGAQG AGMPLLAGER GRAPESVSTS AQGGAVAARK EDSGSSGGAG  240

ALLAVSTDTG GSGTVAETAA RKTVDTFGQR TSIYRGVTRH RWTGRYEAHL WDNSCRREGQ  300

TRKGRQVYLG GYDKEEKAAR AYDLAALKYW GPTTTTNFPV SNYEKELEEM KHMTRQEFVA  360

SLRRKSSGFS RGASIYRGVT RHHQHGRWQA RIGRVAGNKD LYLGTFSTQE EAAEAYDIAA  420

IKFRGLNAVT NFDMSRYDVK SILDSSALPI GSAAKRLKEA EAAASAQHAG VVSYDVGRIA  480

SHLGDGGALA AYGTHYHAAA AAWPTIAFQP SAAAAGLYHP YAQPMRGWCK QEQDHAVIAA  540

AHSLHELNHL NLGAGGGAHD FFSAGQAAMH GLGSIDNASL EHSTGSNSVV YNGVGDSNGG  600

AVGGGYMMPM SAATATTTAM VSHEQVHARS HQGEHDEATK QAAQMGYESY LVNAEAAYGG  660

GRMPSWTPAS APAAASSNDN MAGVGHGGAQ LFSVWNDT*

>Seita.1G232200.1.p
                                                                   (SEQ ID NO: 72)
MASANNWLGF SLSGQDNPQA NQDSSPAAAG IDISGATDFY GLPTQQGSDG HLGVPGLRDD   60

HASYGIMEAF NRSQQETQDW NMRGLDYNGG ASELSMLVGS SGGKRAVEDG EPKLEDFLGG  120

NSFVSEQDQS GGYLFSGVPM ASSTNSNSGS NTMELSMIKT WLRNNQVPQP QPPAPHQAAP  180

QPEEMSTDAS ASSFGCSDSL GRNGTVAAGS SQSLALSMST GPQHLPMVVA GGGGGASGAA  240

ASESTSSENK RASGAMDSPS SGAIEAVPRK SIDTFGQRTS IYRGVTRHRW TGRYEAHLWD  300

NSCRREGQSR KGRQVYLGGY DKEDKAARAY DLAALKYWGT TTTTNFPISN YEKELEEMKH  360

MTRQEYIAYL RRNSSGFSRG ASKYRGVTRH HQHGRWQARI GRVAGNKDLY LGTFSTEEEA  420

AEAYDIAAIK FRGLNAVTNF DMSRYDVKSI LESSTLPVGG AARRLKDAVD HVEAGATIWR  480

ADMDAGVISQ LADAGMGAYA SYGHHGWPTI AFQQPSPLTV HYPYGQPSRG WCKPEQDAAV  540

AAAAHSLQDL QQLHLGSAAH NFFQASSSST VYNGGGASAA GYQGLGGGGG GSFLMPSSTV  600

VADQGHSSTA NQGSTCSYGD DQDGKLIGYD AMAAAGGDPY AAARSGYQFS QGSGSTVSIA  660

RANGYSNNWS SPFNGMG*
```

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Materials and Methods

DNA Extraction

DNA extraction was accomplished using a cetyltrimethyl ammomum bromide (CTAB) protocol (J. Conner, G. Gunawan, P. Ozias-Akins, *Planta* 238:51-63 (2013)).

PCR Amplification

Different PCR conditions were required based on primer combinations and amplicon length. Primer and PCR information for all unpublished amplicons appears in Table 1. PCR reactions were performed according to manufacturer recommendations unless noted otherwise. Reactions were performed in a GeneAmp 9700 Thermocycler (Applied Biosystems, Foster City, CA, USA).

Non-Quantitative RT-PCR Tissue Expression of ASGR-BBML

Expression of ASGR-BBML was confirmed by RT-PCR using RNA isolated from various tissues, including the following: ovaries isolated one day prior to anthesis, through seed development, and up to five days after anthesis; anthers at 1 day prior to anthesis; root tips collected from greenhouse-grown potted plants; newly emerging leaf tissue; and embryogenic callus derived from apomictic *Pennisetum* $BC_8$ lines (M. Singh et al, *Crop Science* 50:892-902 (2010)). Total RNA was extracted from the various tissues via the RNeasy plant mini kit (QIAGEN, Valencia, CA, USA) and subjected to DNAse treatment (Invitrogen, Carlsbad, CA, USA). Three to five micrograms of total RNA was used for first-strand cDNA synthesis via oligo-dT and SuperScriptIII (Invitrogen). Two μL of the first-strand cDNA synthesis reaction was used for PCR amplification using ASGR-BBML specific primers p779/80 (Y. Akiyama et al., *BMC Evolutionary Biology,* 11:289 (2011)) or actin depolymerizing factor 3 (ADF3) primers p1127/1128 which were used as a control. PCR products were run on a 1.25% agarose gel, stained with ethidium bromide, and imaged with the Molecular Imager Gel Doc XR System (Bio-Rad Laboratories, Hercules, CA, USA).

Rapid Amplification of cDNA Ends (RACE) of PsASGR-BBML

RACE products for the 5' and 3' UTRs for PsASGR-BBML were generated via the GeneRacer RLM-RACE kit (Invitrogen) and total RNA extracted from spikelet tissues from apomictic BC7 Line 58 (M. Singh et al., *Crop Science* 50:892-902 (2010)). The PCR primers used are listed in Table 1. The amplified PCR products were gel purified with QIAquick gel extraction kit (QIAGEN) and cloned into either a PCR4-TOPO (Invitrogen) or a pGEM-T easy (Promega, Madison, WI, USA) vector. Nucleotide sequencing was carried out with a CEQ 8000 Genetic Analysis System (Beckman Coulter, Fullerton, CA, USA), and sequences were processed with Vector NTI (Invitrogen).

Sequence Analysis of PsASGR-BBML Transgene

Total RNA was extracted from ovaries at the day of anthesis for g3f offspring, namely 105, 123, 144, and 159. Three pg of RNA was subjected to DNAse treatment (Invitrogen) and used for first-strand cDNA synthesis using oligo-dT and SuperScriptIII (Invitrogen). Two μL of the first-strand cDNA synthesis reaction was used for PCR amplification via transgene specific primers p1792/p1801 and p2347/p423. Amplified PCR products were gel purified with QIAquick gel extraction kit (QIAGEN) and cloned into PCR4-TOPO (Invitrogen). Nucleotide sequencing was conducted at the Laboratory for Genomics and Bioinformatics (University of Georgia, Athens, GA). Vector and bad quality sequences were removed, and trimmed sequences were then assembled using Geneious Pro 5.6.6 (Biomatters Limited, Auckland, New Zealand).

Transforming Constructs

PsASGR-BBMpromoter-GUS construct. pCambia3301 was digested with BamHI/NcoI to remove the CaMV 35S promoter, which was replaced with a 2,074 bp PCR-generated BamHI/NcoI PsASGR-BBMLpromoter fragment, which was amplified from BAC p208 (D. Roche et al. *Theor Appl Genet.,* 104:804-812 (2002)) using primers p690 and p692. The BamHI site is endogenous to the promoter and is located just downstream of p690. A Neal site was incorporated into p692. The PsASGR-BBMLpromoter-GUS-Nos polyA cassette in pCambia3301 was removed by digestion with BamHI/BseYI, blunted, and then placed into pACH20 (A. H. Christensen, P. H. Quail, *Transgenic Research,* 5:213-218 (1996)) at a blunted and dephosphorylated HindIII site to create plasmid 2BE.

gPsASGR-BBML construct. The pBluescript vector was engineered with 2,074 bp of the PsASGRBBML promoter, 3540 bp of the 8 exon, 7 intron PsASGR-BBM coding region from BAC p208 (D. Roche et al. *Theor Appl Genet.,* 104:804-812 (2002)), and 609 bp 3' of the stop codon, including the predicted poly(A) signal.

RNAi-BBM-3p construct. The binary expression vector pMCG161 (http<colon slash slash> www <dot> chromdb <dot> org) was used for RNAi vector construction. A 425 bp amplicon covering 52% of the last exon of PsASGRBBML and incorporating restriction enzymes for cloning into pMCG161 was generated via primers p966 and p967 and inserted into pMCG161 following instructions available at http <colon slash slash> www<dot> chromdb <dot> org.

Ubi-Hygro construct. pCB13 (H. Yang et al., *Plant Cell Reports,* 17:693-699 (1998)) was digested with HindIII/BamHI to remove the CaMV 35S promoter and replaced with the HindIII/BamHI maize ubiquitin (Ubi-1) promoter fragment from pAHC20 (A. H. Christensen, P. H. Quail, *Transgenic Research,* 5:213-218 (1996)).

Plant Transformation

Embryogenic callus generated from 7-10 day old immature embryos of tetraploid sexual IA4X plants were bombarded, selected (25 mg/I Hygromycin B or 15 mg/I PPT) and regenerated according to a previous protocol (J. J. Goldman, W. W. Hanna, G. Fleming, P. Ozias-Akins, *Plant Cell Rep.,* 21:999-1009 (2003)). The PsASGR-BBMpromoter-GUS lines were bombarded with a mix of plasmids 2BE and p524EGFP.1 (G. H. Fleming, O. Olivares-Fuster, S. Del-Bosco, J. W. Grosser, *In Vitro Cell Dev Biol* Plant 36:450-455 (2000)), the gPsASGR-BBML lines were bombarded with a mix of plasmids gPsASGR-BBML, p524EGFP.1 and Ubi-Hygro, and the RNAi lines were bombarded with plasmid RNAi-BBM-3p.

Embryo Rescue

Media for embryo rescue were based on previous work for zygotic *Pennisetum* embryos at 5 DAPS (C. Nitsch et al., "Production of haploid plants of *Zea mays* and *Pennisetum* through androgenesis." Variability in plants regenerated from tissue culture. Praeger, New York (1982): 69-91) and used IX Nitsch & Nitsch Basal Medium w/vitamins (PhytoTechnology Laboratories, Shawnee Mission, KS), 1% sucrose, gibberellic acid (1 mg/L), indoleacetic acid (0.03 mg/L), 0.75% agar, pH 5.8 with 0.2% Plant Preservative Mixture (PPM) (Plant Cell Technology, Inc., Washington, DC). Developing (10 to 15 days after pollination) and mature seed were sterilized according to a previous protocol (J. J. Goldman, W. W. Hanna, G. Fleming, P. Ozias-Akins, *Plant Cell Rep.,* 21:999-1009 (2003)). Embryos were surgically removed, placed scutellum side up on the media, and monitored for root and shoot elongation. Embryos were left on the GA/IAA media for up to 10 days and were then discarded if no root/shoot growth occurred. Offspring with root and shoot growth were moved to a IX Murashige & Skoog (MS) medium w/vitamins (PhytoTechnology Laboratories) supplemented with 3% sucrose, 0.75% agar pH 5.8 with PPM until growth permitted hardening and movement into the greenhouse.

X-Gluc Staining for B-Glucuronidase Activity for PsASGR BBMpromoter-GUS Lines

Eight independent PsASGR_BBMpromoter-GUS lines were produced which contained a full-length transgene based on overlapping PCR amplifications using transgene-specific primers, namely p2354/p2355; p2349/p2350; and p2885/p2886 (Table 1). The PsASGR_BBMpromoter-GUS To lines were either allowed to self-pollinate or were cross-pollinated with apomictic BC8-Line 63 pollen. Seeds from 5 lines were germinated, and then genotyped for inheritance of the ASGR if crossed and the PsASGR_BBMpromoter-GUS transgene. Initially, PsASGR_BBMpromoter-GUS gene expression patterns were examined from ovaries dissected one day prior to anthesis or on the day of anthesis from heads bagged prior to stigma exsertion; stigmas were mechanically removed prior to anthesis.

New PsASGR_BBMpromoter-GUS plants were germinated and isolated to a single greenhouse in order to further control for unintended pollination. All heads were continually cut back prior to pollen shed in order to keep the greenhouse free of millet pollen. Florets were collected one day prior to anthesis, with the anthers being manually removed. The emasculated florets were then placed on IX MS media, 0.75% agar pH 5.8 with 0.2% PPM and incubated in a growth chamber under long-day light condition at 27° C. for 24 hours. Ovaries were the dissected and incubated in an X-Gluc reaction solution (100 mM sodium phosphate/pH 7.0, 10 mM EDTA, 0.5 mM potassium ferrocyanide, 0.5 mM potassium ferricyanide, 0.1% Triton X-100, and 1 mM 5-bromo-4-chloro-3-D-glucuronide) at 37° C. for 48 hours. X-Gluc-stained ovaries were dehydrated in 15, 30, and 50% ethanol at room temperature for 1 hour each and were then fixed in FAA (50% ethanol, 3.7% formaldehyde, and 5% acetic acid) overnight. FAA-fixed ovaries were further dehydrated in 70, 85, 90, 100, and 100% ethanol at room temperature for 1 hour each, then the dehydrated ovaries were cleared by a series of ethanol: methyl salicylate solutions (3:1, 1:1, and 1:3 for 1 hour each). Cleared ovaries were stored in 100% methyl salicylate for 1 hour. Phase-contrast images of the ovaries acquired using an Axioskop 2 Plus microscope, AxioCam camera and Axio Vision software 4.8 (Zeiss, Thornwood, NY).

Genotyping of gPsASGR BBMLI Ubi Hvgo Transgenic Lines

Nine independent lines were recovered which contained both the gPsASGR_BBML and Ubi_Hygo constructs, based on results from PCR amplification using p1800/01 and p297/298, respectively.

Flow Cytometry

Samples were processed to run on a BD Accuri C6 flow cytometer (BD Biosciences, San Jose, CA USA) or a Partee Ploidy analyzer (Partee, Munster, Germany). The process involved chopping young leaf tissue of sorghum (control) and samples (unknown) together in 1000 μL of Tris-MgCl2 nuclei extraction buffer (0.2 M Tris-HCl, pH 7.5, 4 mM MgCl2×6H20, 0.5% Triton X-100) and passing the mixture through a 30 μm CellTries disposable filter (Partee). 500 μL of RNAse/propidium iodide solution (BD Biosciences) was added to the filtered samples, which were then incubated on ice for 15 minutes. For the BD Accuri C6 flow cytometric analysis, gating was set by the selection of objects that exhibited a strong correlation between the FL2 and FL3 signals using a flow rate of 14 μL sample per minute. At least 3000 events were collected for each sample within the gated region. Samples were run on the Partee Ploidy analyzer until peaks could be confidently called. Ploidy level was determined based on the G1 and G2 sample peaks relative to the sorghum control G1 and G2 peaks.

Root Tip Chromosomal Counts

If available, six healthy root tips were harvested from g3f offspring, cleaned of soil, placed in Eppendorf tubes with 300 μl dH20, treated with nitrous oxide for 2 to 2½ hours under 150 psi, and finally fixed in fresh ethanol:acetic acid (3:1) for a minimum of 2 days. The meristematic region of the root was incubated in 0.3% cellulase RS (Karlan Research, Torrance, CA), 0.3% pectolyase Y23 (Karlan Research), and 0.3% cytohelicase (Sigma-Aldrich, St. Louis) in 30 mM citrate buffer, at a pH of 4.5 at 37C for 60-90 minutes. After enzymatic digestion, a minimum of 3 root tips from each plant was spread individually on glass slides. Chromosomal spreads were located, digitally photographed, and chromosome number was then counted using Adobe Photoshop CS6. Ploidy level of each plant was determined using a minimum of 4 spreads originating from at least 2 slides.

RNAi Screening

Sixteen independent sexual tetraploid IA4X lines were recovered which contained the RNAi_BBM_3p construct based on PCR amplification for the BAR gene and the RNAi sense and antisense inserts using the following primers: p992/p993, p1222/p1223 and p1224/p1125, respectively. Eight lines were crossed with *P. squamulatum* pollen, thereby generating F1 offspring. The F1 offspring plants from each line were screened with *P. squamulatum*-specific primers p1032/1035, RNAi_BBM_3p primers p992/p993, p1222/p1223 and p1224/p1125, and ASGR-specific primers Ugt197 (P. Ozias-Akins, D. Roche, W. W. Hanna, *Proc Natl Acad Sci USA* 95:5127-5132 (1998)). ASGRpositive/RNAi-positive and ASGR-negative/RNAi-positive plants were subsequently tested for expression of the RNAi transgene using RT-PCR analysis of total RNA from leaf tissue and primers p1226/p1227 derived from the octopine synthase terminator region of the transgene. Twenty-five plants from 5 lines were chosen for further analysis; these included 14 ASGR-positive/RNAi-positive, 5 ASGRpositive/RNAi-negative and 6 ASGR-negative/RNAi-positive plants.

Semi-Quantitative Analysis of PsASGR-BBML Expression

Semi-quantitative RT-PCR quantification of PsASGR-BBML was based on a previous protocol (E. Albertini et al., *Plant Molecular Biology* 56:879-894 (2004)). ADF3 primers p1127/1128 were used as an internal control, along with PsASGR-BBML specific primers, namely p779/p780 (Y. Akiyama et al., *BMC Evolutionary Biology,* 11:289 (2011)). Each assay used 3.3 pg of total RNA extracted from ovaries at the day of anthesis via the RNeasy plant mini kit (QIAGEN), and the samples were subjected to DNAse treatment (Invitrogen, Carlsbad, CA, USA) for first-strand cDNA synthesis using oligodT and SuperScriptIII (Invitrogen). Two pl of the cDNA synthesis reaction were used in all PCR reactions; all reactions were run in triplicate. The PCR cycle number determined empirically for ADF3 and PsASGR-BBML was found to be 26 and 40 cycles, respectively. Hybridization imaging was conducted with a Storm phosphorimager (Amersham Biosciences, Pittsburgh, PA, USA), and bands were quantified using ImageQuant v5.0 following the manufacturer's instructions (Amersham Biosciences).

Histological Analysis of Embryo Development in RNAi Lines

Heads were bagged prior to stigma exertion, and stigmas were removed prior to anthesis to prevent pollination. Spikelets from heads were collected 2 days after anthesis, fixed in FAA, and then subjected to a 30-min vacuum treatment at 15 mm Hg prior to a 24-hour fixation at room temperature. Dehydration was initiated with TBAl (40% ethanol, 10% tertiary butyl alcohol (TBA), 50% distilled water) for 2 hours, then transferred through TBA2 (50% ethanol, 20% TBA, 30% distilled water) for 8 hours, TBA3 (50% ethanol, 35% TBA, 15% distilled water) for 1 hr, TBA 4 (45% ethanol, 55% TBA) for 1 hour, TBA 5 (25% ethanol, 75% TBA) for 1 hour, and TBA 6 (100% TBA) for 1 hour. Ovaries were then transferred to fresh 100% TBA for another 8 hours prior to being transferred to TBA: paraffin oil (Fisher, Pittsburgh, PA, USA) (1:1) at 58° C. overnight. Ovaries were taken through three changes of pure Paraplast X-tra (Fisher, Pittsburgh, PA) for 48 hours each before embedding. Sectioning was then carried out for all samples at 9 μm. Samples were stained with safranin O/fast green using a modification to a previously described protocol (Jensen 1962) wherein embedded and sectioned samples were de-waxed in ethanol, then coated with 0.05% nitrocellulose (diluted from collodion, Fisher, Pittsburgh, PA) in ether-alcohol (50% diethyl ether, 50% ethanol) for 30 seconds. Rehydration of samples was accomplished by transfer through 70% ethanol, 30% ethanol, and distilled water for 5 minutes each. Staining was performed first in Safranin O solution (4 g Safranin 0, 100 ml distilled water, 100 ml 95% ethanol, 4 g sodium acetate) for 5 minutes. Samples then were subjected to dehydration in the following series of solutions for 5 minutes each: two changes of distilled water, 50% ethanol, 95% ethanol, 100% ethanol. Samples subsequently were stained in fast green solution (1 g fast green, 100 ml 100% ethanol, 100 ml cellosolve and 100 ml clove oil) for 4 seconds, then immediately placed into pure clove oil for 10 seconds, prior to being quickly transferred into clearing mix (50% clove oil, 25% ethanol, 25% histoclear). Slides were finally cleared in histoclear for 5 minutes and were then mounted with permount.

Phylogenetic Analysis

The proteins identified in the BBM-like clade (S. El Ouakfaoui et al., *Plant Mal Biol* 74:313-326 (2010)) were downloaded from NCBI. Each member of the Grass clade in Phytozome was then individually searched using BLASTP and the entire PsASGR-BBML protein. All proteins with similarity to PsASGR-BBML extending past the AP2 domains were downloaded, while truncated proteins and those without a bbm-1 domain (S. El Ouakfaoui et al., *Plant Mal Biol* 74:313-326 (2010)) were removed. The phytozome target databases employed were the *Sorghum bicolor* v1.4 proteome; *Zea mays* proteome, *Setaria italica* proteome, *Panicum virgatum* v0.0 proteome, *Oryza sativa* proteome, and Brachypodium distachyon proteome. Proteins that were found to be identical between the BBM-like clade (S. El Ouakfaoui et al., *Plant Mal Biol* 74:313-326 (2010)) and Phytozome were removed. Twenty-six amino acid sequences were aligned using multiple web-based alignment programs; the results were that both T-Coffee (http <colon slash slash> tcoffee<dot> erg <dot> cat <slash> apps <slash> tcoffee <slash> do<dot> regular) and Mafft (http <colon slash slash> mafft <dot> cbrc <dot> jp<slash> alignment <slash>server) alignments identified the most conserved domains the BBM-like clade, especially within the C terminus of the proteins without editing. The T-Coffee alignment produced a 1,067 amino acid consensus sequence length with 283 conserved positions for all proteins (FIG. 1). The Mafft alignment produced a 1,040 amino acid consensus length with 264 conserved positions for all proteins using the E-INS-I command. The T-Coffee alignment was used to create phylogenetic trees (P. Di Tommaso et al., Nucl. Acids Res. 39 (suppl 2): W13-W1 7 (2011)) via MEGA6 software (K. Tamura et al., *Molecular Biology and Evolution* 30:2725-2729 (2013)) (FIG. 2).

TABLE 1

Primers and PCR Conditions

| | Primer ID | Primer sequence 5' to 3' | DNA polymerase used | Anneal/ Extension |
|---|---|---|---|---|
| PsASGR-BBM construct promoter | P690 | CCTCAGTGCATCAGCGAAGG (SEQ ID NO. 6) | iProof High-Fidelity | 60° C./1 min |
| | P692 | TGGAACCCATGGCGGAACGC (SEQ ID NO. 7) | | |
| PsASGR-RNAi construct | P966 | GTACTAGTGGCGCGCCCCTCAATGCTGTCACGAACTT (SEQ ID NO. 8) | PrimeSTAR HS tak | 68° C./30 sec |
| | P968 | GTGCGATCGCCCTAGGCAACACCTGTCATGTCCTGAA (SEQ ID NO. 9) | | |
| Genomic ORF and cDNA sequencing | P1792 | TTCCACCAACAACTGGCTGCGCT (SEQ ID NO. 10) | ORF: Primestar GXL rapid method cDNA: iProofHigh-Fidelity with DMSO | 60° C./40 sec 64° C./1 min |
| | P1801 | TTCTCATGGCTCCTAGACTCCCAC (SEQ ID NO. 11) | | |
| cDNA5'UTR sequencing | p2347 | CCCTAGGATCAGTGCTAGTGC (SEQ ID NO. 12) | Primestar GXL | 60° C./30 sec |
| | p423 | GGGCTTCATACCTTCCTGTCCAT (SEQ ID NO. 13) | | |
| PsASGRpromoter-GUS-1 | p2354 | GAAACGGGAAAGGAGTCAAA (SEQ ID NO. 14) | Takara ExTaqHot Start | 60° C./2 min |
| | p2355 | CGCTAGTGCCTTGTCCAGTT (SEQ ID NO. 15) | | |
| PsASGRpromoter-GUS-1 | p2349 | GCCGCGTTCCGCCATGGTA (SEQ ID NO. 16) | Takara ExTaqHot Start | 60° C./2 min |
| | p2350 | TGACACCGCGCGCGATAATTT (SEQ ID NO. 17) | | |
| PsASGRpromoter-GUS-3 | P2885 | ACGATCAACAGATGACTGCCT (SEQ ID NO. 18) | Jump Start | 60° C./30 sec |
| | P2886 | TGATGTGGTGGCGATGGAAT (SEQ ID NO. 19) | | |
| 3'RACE gene-specific primer | P1021 | TGGCAAGCAAGAATAGGAAGTGTGGC (SEQ ID NO. 20) | Jump Start | RACE manual |

TABLE 1-continued

Primers and PCR Conditions

| | Primer ID | Primer sequence 5' to 3' | DNA polymerase used | Anneal/ Extension |
|---|---|---|---|---|
| 3'RACE nested gene-specific primer | P1022 | GGCACATTCAGTACCCAGGAGGA (SEQ ID NO. 21) | Jump Start | RACE manual |
| 5'RACEgene specific primer for RT | P1025 | TTCCTTGAGACGCTTTGGAGTGC (SEQ ID NO. 22) | Jump Start | 62° c1 2 min |
| 5'RACEgene specific primer | P1026 | GCTCTTGACGTCATACCGGCTCA (SEQ ID NO. 23) | Jump Start | 62° c1 2 min |
| 5'RACE nexted gene specific primer | P1028 | AAGTTCGTGACAGCATTGAGGCCTC (SEQ ID NO. 24) | Jump Start | 62° c1 2 min |
| Screen for Ubi_Hygo construct | P296<br>P297 | CCCCAATGTCAAGCACTTCCG (SEQ ID NO. 25)<br>CCGCGACGTCTGTCGAGAAG (SEQ ID NO. 26) | Jump Start | 60° C./30 sec |
| Initial screen of for gPsASGR-BBML construct | P1800<br>P1801 | TTCCTCAGGCGCCAATACTGG (SEQ ID NO. 27)<br>TTCTCATGGCTCCTAGACTCCCAC (SEQ ID NO. 28) | Jump Start | 62° C./30 sec |
| BBM RNAi 3 construct BAR | P992<br>P993 | CATCGTGACAAGCACGGTCAACTTC (SEQ ID NO. 29)<br>ATATCCGAGCGCCTCGTGCATGCG (SEQ ID NO. 30) | Jump Start | 62° C./30 sec |
| BBM_RNAi_3 construct RNAi sense | P1222<br>P1223 | GTTGAGTGGCCCTGTTTCTC (SEQ ID NO. 31)<br>CATTGATCAGCCTAACCAAACA (SEQ ID NO. 32) | Jump Start | 55° C./30 sec |
| BBM_RNAi_3 construct RNAi anti-sense | P1224<br>P1225 | GGCGGTAAGGATCTGAGCTA (SEQ ID NO. 33)<br>CAAATTCTAATCCCCAATCCAA (SEQ ID NO. 34) | Jump Start | 55° C./30 sec |
| Ps-specific | P1032<br>P1035 | AGGCTGTCGACTGCAGCTAT (SEQ ID NO. 35)<br>CAGAATTGTCATCATGTAAGAACCAC (SEQ ID NO. 36) | Jump Start | 59° C./30 sec |
| Octopine synthase | P1226<br>P1227 | AGTGGGTCTAGAGTCCTGCTT (SEQ ID NO. 37)<br>GGCGGTAAGGATCTGAGCTA (SEQ ID NO. 38) | Jump Start | 55° C./30 sec |
| ADF3 | P1127<br>P1128 | ACGAGGATTTCACCAACAGC (SEQ ID NO. 39)<br>AACGCATAGACGACGCCT (SEQ ID NO. 40) | Jump Start | 55° C./30 sec |

iProof (Bio-Rad Laboratiories)
JumpStart Taq DNA Polymerase (Sigma)
Takara ExTaq Hot Start, Primestar GXL, PrimeSTAR HS DNA polymerase (Clonetech Laboratories, Inc, Mountain View, CA)

Example 2

ASGR-BBML Overexpression in *Arabidopsis*

Figure 3:
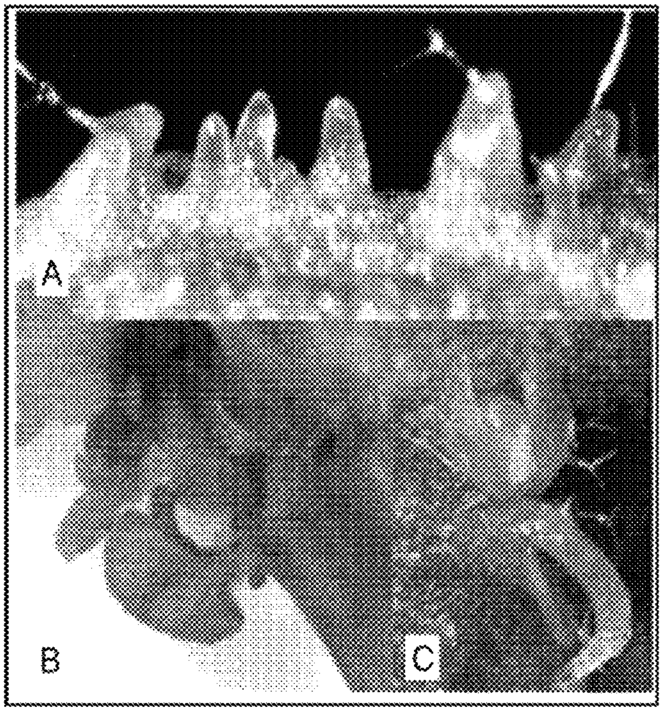
FIG. 3 depicts the results of overexpression of ASGR-BBML in *Arabidopsis*, including the formation of trichomed projections, as depicted in FIG. 3A, ectopic shoots, as depicted in FIG. 3B, and ectopic flowers, as depicted in FIG. 3C.

A full-length ASGR-BBML cDNA from *P. squamulatum* was identified via 5' and 3' RACE. The cDNA was found to be overexpressed in *Arabidopsis* using the CaMV35S promoter, with pleiotropic effects of overexpression such as the formation of ectopic shoots, projections with trichomes, and incomplete flowers (FIGS. 3A-C). Fertility was found to be impaired in these lines, and distorted segregation of the transgene was observed. The overexpression phenotype for ASGR-BBML is more readily interpreted when overexpression is under the control of an inducible promoter.

Example 3

ASGR-BBML Expression in *P. Squamulatum, C. Ciliaris*, and Apomictic Backcrosses Transformation of sexual tetraploid pearl millet with the genomic copy of the ASGR-BBML gene construct, including a promoter and 3'UTR, was found to induce the formation of embryos in meiotically-derived embryo sacs in the absence of corresponding endosperm fertilization. Fertilization was prevented by bagging of heads prior to stigma exsertion and subsequent removal of stigma/style prior to anther exsertion, with evidence for lack of fertilization in ovules being the persistence of two polar nuclei in the central cell and absence of endosperm formation. Expression of ASGR-BBML was previously observed by RT-PCR in two apomictic species (*P. squamulatum* and *C. ciliaris*) and in apomictic *Pennisetum* backcross 7 and 8 lines (M. Singh et al., *Crop Science* 50:892-902 (2010)) in ovaries starting I-day prior to anthesis and continuing through early seed development, in anthers I-day prior to anthesis and roots.

Figure 4:
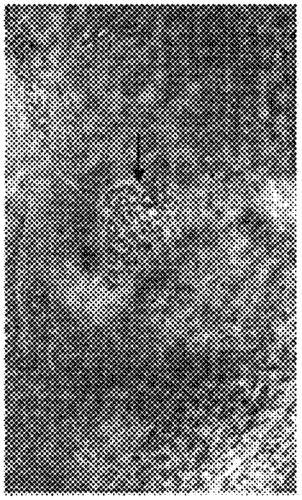
FIG. 4 depicts BC8 embryo development in the absence of pollination.
Figure 5:
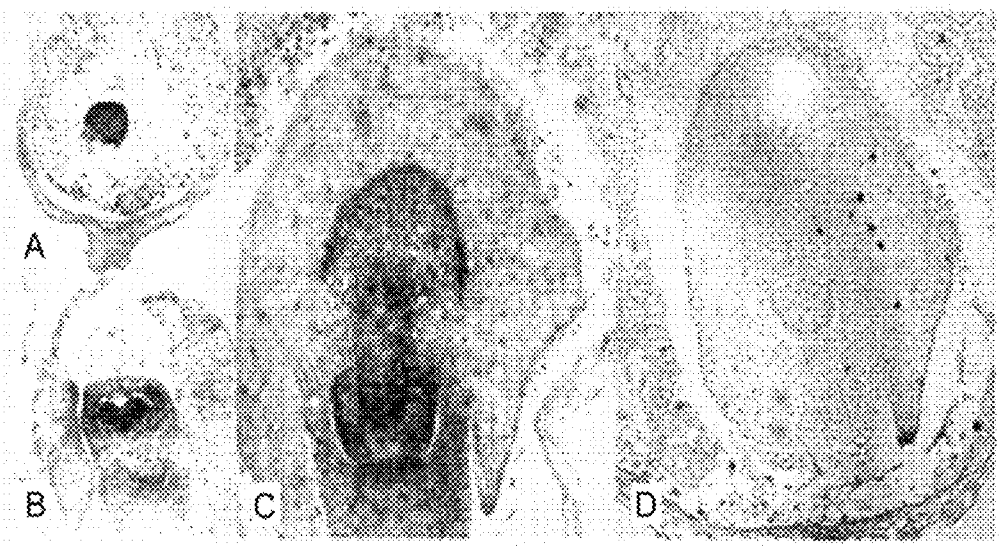
FIG. 5 depicts the results of in situ hybridization of globular embryos, as depicted in FIG. 5A, and later stage embryos, as depicted in FIGS. 5B and 5C, using a locked nucleic acid oligonucleotide probe designed to target ASGR-BBML.

PsASGR-BBML was found to be expressed in embryogenic callus derived from apomictic *Pennisetum* BC8 lines. In the apomictic species and the apomictic backcrosses, embryo development in aposporous embryo sacs can initiate prior to pollen shed, continuing for several days after pollen shed when pollination is prevented, and no endosperm is formed (FIG. 4). Although globular and later stage embryos showed good signal, low levels of ASGR-BBML gene expression in reproductive tissues resulted in inconclusive RNA in situ hybridization experiments for early stages of embryo development (FIGS. 5A-D). Therefore, expression was determined by RT-PCR.

Figure 6:
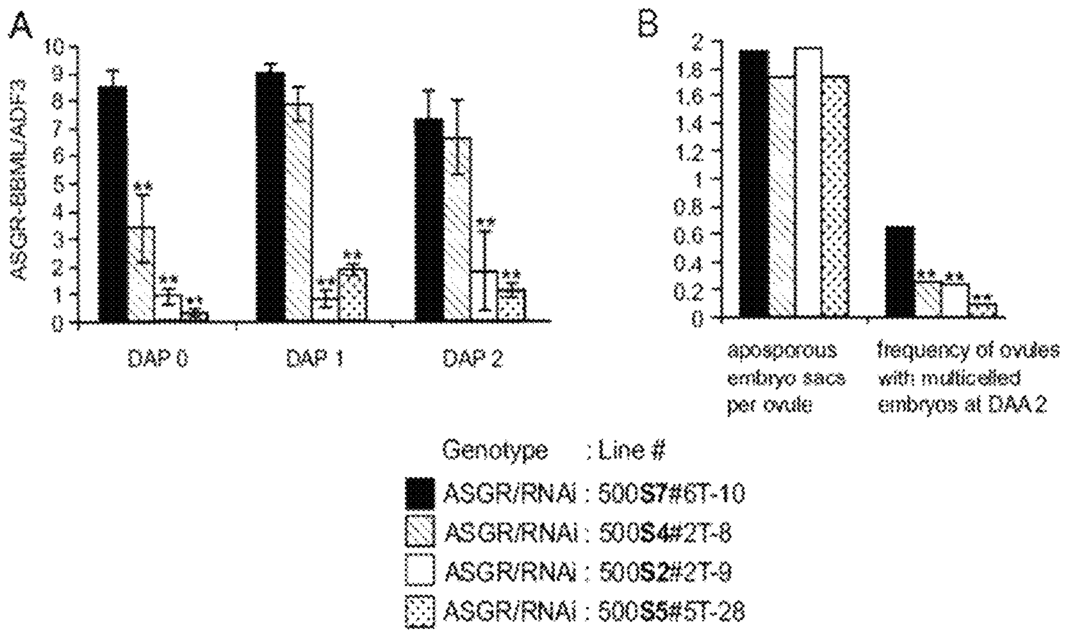
FIG. 6 depicts results from ASGR-BBML expression studies. The differences in ASGR-BBML expression among RNAi events (S7>S4>S2>S5), as shown in FIG. 6A, are correlated with the frequency of ovules with multicelled embryos but not the number of aposporous embryo sacs per ovule, as shown in FIG. 6B.

Unpollinated pistils were examined both for transcription of ASGR-BBML as well as for embryo development prior to the day of pollen shed and up to two days after pollen shed; pollination was prevented by removing the stigmas. Expression of the ASGR-BBML gene was demonstrated to correlate with parthenogenetic development of the unreduced egg in apomictic *P. squamulatum* and *C. ciliaris*; that is, expression was detected in the absence of pollination as ensured by removal of stigmas prior to anther dehiscence and pollen shed (DAPO in FIG. 6). Anthers, pollen, and roots from *P. squamulatum* and *C. ciliaris* showed ASGR-BBML expression, but stigmas and leaf tissue did not; however, expression in the leaf was demonstrated in apomictic *Pennisetum* BC7 and BC8 lines. The temporal pattern of expression (by semi-quantitative RT-PCR) of a second embryo-expressed gene, namely LEC, and the non-ASGR-BBML genes identified in *C. ciliaris*, was slightly delayed as compared with ASGR-BBML. At BBM has been shown to upregulate its own expression but not to directly regulate expression of LEC (Passarinho P. et al., *Plant Mal. Biol.* 68:225-237 (2008)). Accordingly, the non-ASGR-BBML genes can be targets of ASGR-BBML.

Example 4

Knockdown of ASGR-BBML Expression

Tetraploid pearl millet was transformed with a portion of the ASGR-BBML coding region in an inverted repeat (TR) construct via microprojectile bombardment and selection on phosphinothricin. Transcription of the IR proceeded via the CaMV 35S promoter. Homology-dependent gene silencing depends on the formation of hairpin RNA and triggering of the RNA interference where endogenous gene sense transcripts are targeted for degradation (Ossowski S. et al., *Plant Journal* 53:674-690 (2008); Eamens A. et al., *Plant Physiology* 147:456-468 (2008)). According to Southern blot hybridization, the ASGR-BBML IR did not show significant homology with pearl millet.

RNAi lines were generated by transformation of tetraploid IA4X, but no RNAi phenotype was expected until the IR was combined with the ASGR by crossing. Crosses of IA4X RNAi lines with *P. squamulatum* produced progeny that combined both genes and were then screened for transcription of the transgene, changes in transcription of ASGR-BBML, and changes in reproductive development. Transcription of ASGR-BBML as determined by semi-quantitative RT-PCR varied in the progeny of several events, as follows: a reduction in ASGR-BBML signal (FIG. 6A) correlated with reduced precocious embryo development (FIG. 6B) and event S7>S4>S2>S5. Similar observations were made while analyzing a knockdown line containing a different portion of the gene as an inverted repeat expressed under the control of the rice actin 1 promoter.

Since no complete knockdown was obtained from either of these experiments, these data did not correlate ASGR-BBML expression with the extent of embryo development vs causality (ASGR-BBML expression was responsible for embryo induction); therefore, additional experiments were undertaken to test the role of ASGR-BBML in parthenogenesis. These consisted of the following steps: 1) transformation of sexual pearl millet with beta-glucuronidase (GUS) as a reporter gene, expressed under the control of the native BBM promoter, and 2) transformation of sexual pearl millet with ASGR-BBML, either as cDNA or as genomic DNA under control of its native promoter.

Although the organ-specific expression pattern of ASGR-BBML has been extensively characterized by RT-PCR in two apomictic species (*P. squamulatum* and *C. ciliaris*) and apomictic *Pennisetum* backcrosses, this does not enable the cellular location of expression to be determined. Expression in apomicts was observed in gynoecia (pistils) up to 2 days prior to pollination; expression was also observed after pollination as embryos began to develop and continued to grow. These analyses were conducted by RT-PCR because ASGR-BBML transcripts are of low abundance in gynoecia at anthesis; therefore, transcripts were not detected by in situ hybridization.

Figure 7:
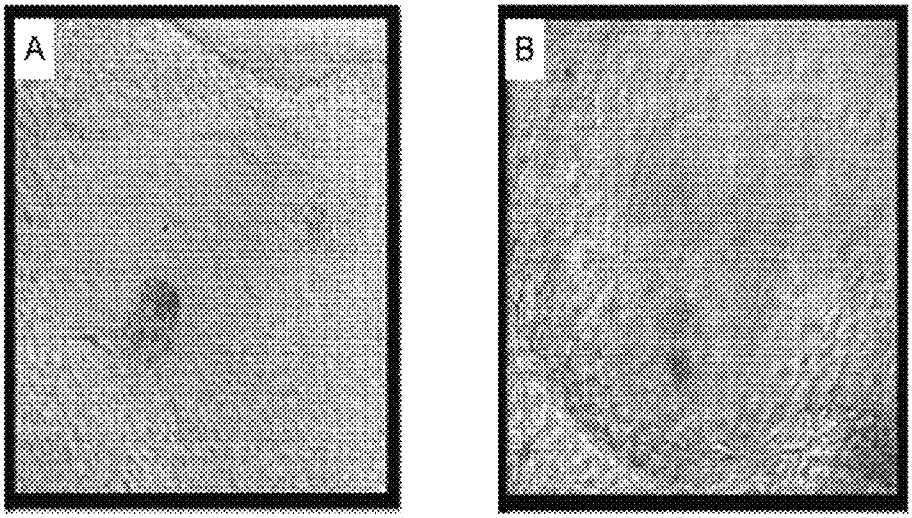
FIG. 7 depicts a cleared ovule from an apomictic plant derived from crossing BC8 with the GUS-expressing transgenic pearl millet. Expression is seen in egg cells and in young embryos.
Figure 8:
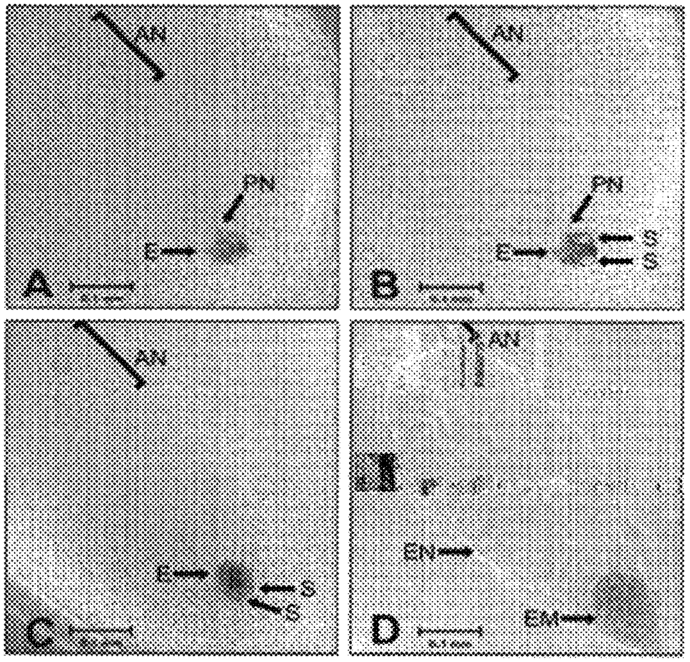
FIG. 8 depicts PsASGR-BBML expression in sexual embryo sacs. Ovaries from three sexual offspring derived from a To PsASGR-BBMLpromoter-GUS line are shown (FIG. 8A-D).

The pattern of PsASGR-BBML expression was investigated at the cellular level in ovaries prior to fertilization via a PsASGR-BBML promoter-GUS construct. In apomictic lines recovered from crosses with transgenic pearl millet, dividing unreduced egg cells expressing GUS were identified in aposporous embryo sacs (FIG. 7). In unfertilized embryo sacs on day of anthesis, GUS signal was observed within the egg cell; a weaker GUS signal sometimes occurred in the synergids (FIG. 8A-C). The synergid signal can be attributed to lower expression of PsASGR-BBML or leakage of GUS signal from the egg cell. The presence of intact synergid cells and polar nuclei within the embryo sac demonstrate that PsASGR-BBML expression occurs prior to fertilization. No GUS staining was visualized in the central cell or antipodal cells of the sexual embryo sac or in the surrounding ovary tissues (FIG. 8A-C). GUS activity was also identified in cells of the developing embryo characterized up to 3 days after fertilization (FIG. 8D); GUS activity was not identified in the developing endosperm.

This pattern of expression indicates that BBM is cell autonomous and expressed within a developmental time frame that is consistent a role in parthenogenesis. To obtain more definitive evidence, sexual pearl millet was transformed with ASGR-BBML either as cDNA or genomic DNA under control of its native promoter. The two versions of the construct are as described below according to the sequences provided in Table 2 below, which provides the cDNA, genomic DNA, amino acid sequence, and promoter sequence of ASGR-BBML. Genomic construct: 2074 bp ASGR-BBM promoter (p208) (containing a 6-residue GGATCC BamHI restriction site sequence) upstream of the 3,540 bp coding region (exons:introns) as well as 610 bp of the 3'UTR. cDNA construct: 2074 bp ASGR-BBM promoter (containing a 6-residue GGATCC BamHI restriction site sequence) fused to the 1,638 bp cDNA coding region as well as 610 bp of the 3' UTR region. The alignment of the cDNA to the genomic DNA is depicted in FIG. 9.

TABLE 2

ASGR-BBML cDNA, genomic DNA, amino acid sequence, and promoter sequence; the start codons are indicated by single underline and the stop codons are indicated through double underline.

SEQ ID NO: 1. ASGR-BBM cDNA sequence with UTRs
TCTCTCTCTCTTCTCTCTCTCCATTTCTCTTCCCTAGGATCAGTGCTAGTGCTTGCAGCGGCCGCGTT
CCGAGATGGGTTCCACCAACAACTGGCTGCGCTTCGCCTCGTTCTCCGGCGGCGGCGGCGCCAAGGAT
GCCGCGGCCCTGCTCCCGCTGCCGCCCTCGCCCCGTGGCGATGTCGACGAGGCCGGCGCAGAGCCGAA
GCTCGAGGACTTCCTCGGCCTGCAGGAGCCGAGCGCCGCCGCGGTGGGGGCTGGGCGGCCATTCGCGG
TGGGTGGCGGTGCGAGCTCCATCGGGCTGTCCATGATCAGGAACTGGCTGCGCAGCCAGCCGGCGCCG
GCCGGGCCTGCTGCGGGGGTCGATTCGATGGTGCTGGCGGCTGCGGCGGCGTCGACGGAGGTGGCCGG
CGATGGCGCGGAGGGCGGCGGCGCCGTGGCTGACGCGGTGCAGCAGAGGAAGGCGGCGGCGGTGGACA
CTTTCGGGCAGCGGACCTCCATATACCGCGGCGTCACAAAGCATAGATGGACAGGAAGGTATGAAGCC
CATCTTTGGGACAATAGCTGCAGAAGAGAAGGTCAAACTCGGAAAGGTAGACAAGTGTATCTTGGTGG
ATATGATAAAGAAGAAAAAGCAGCTAGAGCTTATGATTTAGCTGCTCTCAAGTACCGGGGCACCACAA
CTACTACAAATTTTCCGATGAGCAACTATGAAAAGGAGTTAGAAGAGATGAAGCATATGTCACGACAA
GAATATGTTGCATCCCTTAGAAGGAAAAGCAGTGGTTTTTCTCGTGGTGCATCAATTTACCGAGGGGT
TACCAGGCACCATCAGCATGGAAGGTGGCAAGCAAGAATAGGAAGTGTGGCAGGAAACAAGGATCTTT
ATTTGGGCACATTCAGTACCCAGGAGGAAGCTGCAGAGGCTTACGACATTGCTGCCATCAAATTCCGA
GGCCTCAATGCTGTCACGAACTTTGACATGAGCCGGTATGACGTCAAGAGCATCATTGAGAGCAGCTC
CCTGCCTGTTGGCGGCACTCCAAAGCGTCTCAAGGAAGTGCCTGATCAATCAGATATGGGCATCAACA
TAAACGGTGACTCTGCTGGTCATATGACTGCTATCAACCTTCTTACTGATGGCAATGACAGCTATGGA
GCTGAGAGTTATGGTTACAGTGGTTGGTGTCCCACAGCCATGACGCCAATCCCCTTTCAATTCAGCAA
TGGCCATGACCATTCCAGGCTGTGGTGCAAGCCAGAGCAGGACAATGCGGTTGTTGCAGCACTGCATA
ACCTGCATCACCTCCAGCACTTGCCAGCCCCAGTTGGCACCCATAATTTTTTCCAGCCATCGCCTGTT
CAGGACATGACAGGTGTTGCCGATGCTTCATCGCCACCAGTAGAATCTAATTCATTCCTGTACAATGG
GGACGTTGGTTACCATGGTGCCATGGGTGGCAGCTATGCCATGCCGGTTGCCACACTAGTTGAGGGCA
ACTCTGCGGGCAGTGGCTATGGAGTTGAGGAAGGCACAGGGTCTGAAATCTTTGGTGGACGGAACTTG
TATTCTCTCTCCCAAGGTTCCTCAGGCGCCAATACTGGAAAGGCAGATGCTTATGAAAGCTGGGATCC
ATCTATGCTGGTGATATCACAGAAGTCTGCCAATGTGACTGTCTGCCATGGCGCACCTGTATTTTCAG
TTTGGAAATGATGGTTAGATGAAAATATAGTAGTGATATTAACTAGTTCTTGGAGGGGAAGATTAAAT
TCTAGGTATACAAAAGTTTAATTTATTAGTGCTTCAAGATCTCGTATGAAAAAAAGTTTTGCTGCTTA
ATCAGCTCCAGTGGGAGTCTAGGAGCCATGAGAAATGTCGTTTTATTATTGACTAATGCTACAATGCT
AACATGCTGACTCTTTTGAATGGCACAAGAGCTCTGGTGTTTCAATACATCAGCCAGTTTCATT SEQ ID NO: 2. ASGR-BBM cDNA sequence
ATGGGTTCCACCAACAACTGGCTGCGCTTCGCCTCGTTCTCCGGCGGCGGCGGCGCCAAGGATGCCGC
GGCCCTGCTCCCGCTGCCGCCCTCGCCCCGTGGCGATGTCGACGAGGCCGGCGCAGAGCCGAAGCTCG
AGGACTTCCTCGGCCTGCAGGAGCCGAGCGCCGCCGCGGTGGGGGCTGGGCGGCCATTCGCGGTGGGT
GGCGGTGCGAGCTCCATCGGGCTGTCCATGATCAGGAACTGGCTGCGCAGCCAGCCGGCGCCGGCCGG
GCCTGCTGCGGGGGTCGATTCGATGGTGCTGGCGGCTGCGGCGGCGTCGACGGAGGTGGCCGGCGATG
GCGCGGAGGGCGGCGGCGCCGTGGCTGACGCGGTGCAGCAGAGGAAGGCGGCGGCGGTGGACACTTTC
GGGCAGCGGACCTCCATATACCGCGGCGTCACAAAGCATAGATGGACAGGAAGGTATGAAGCCCATCT
TTGGGACAATAGCTGCAGAAGAGAAGGTCAAACTCGGAAAGGTAGACAAGTGTATCTTGGTGGATATG
ATAAAGAAGAAAAAGCAGCTAGAGCTTATGATTTAGCTGCTCTCAAGTACCGGGGCACCACAACTACT
ACAAATTTTCCGATGAGCAACTATGAAAAGGAGTTAGAAGAGATGAAGCATATGTCACGACAAGAATA
TGTTGCATCCCTTAGAAGGAAAAGCAGTGGTTTTTCTCGTGGTGCATCAATTTACCGAGGGGTTACCA
GGCACCATCAGCATGGAAGGTGGCAAGCAAGAATAGGAAGTGTGGCAGGAAACAAGGATCTTTATTTG
GGCACATTCAGTACCCAGGAGGAAGCTGCAGAGGCTTACGACATTGCTGCCATCAAATTCCGAGGCCT
CAATGCTGTCACGAACTTTGACATGAGCCGGTATGACGTCAAGAGCATCATTGAGAGCAGCTCCCTGC
CTGTTGGCGGCACTCCAAAGCGTCTCAAGGAAGTGCCTGATCAATCAGATATGGGCATCAACATAAAC
GGTGACTCTGCTGGTCATATGACTGCTATCAACCTTCTTACTGATGGCAATGACAGCTATGGAGCTGA
GAGTTATGGTTACAGTGGTTGGTGTCCCACAGCCATGACGCCAATCCCCTTTCAATTCAGCAATGGCC
ATGACCATTCCAGGCTGTGGTGCAAGCCAGAGCAGGACAATGCGGTTGTTGCAGCACTGCATAACCTG
CATCACCTCCAGCACTTGCCAGCCCCAGTTGGCACCCATAATTTTTTCCAGCCATCGCCTGTTCAGGA
CATGACAGGTGTTGCCGATGCTTCATCGCCACCAGTAGAATCTAATTCATTCCTGTACAATGGGGACG
TTGGTTACCATGGTGCCATGGGTGGCAGCTATGCCATGCCGGTTGCCACACTAGTTGAGGGCAACTCT
GCGGGCAGTGGCTATGGAGTTGAGGAAGGCACAGGGTCTGAAATCTTTGGTGGACGGAACTTGTATTC
TCTCTCCCAAGGTTCCTCAGGCGCCAATACTGGAAAGGCAGATGCTTATGAAAGCTGGGATCCATCTA
TGCTGGTGATATCACAGAAGTCTGCCAATGTGACTGTCTGCCATGGCGCACCTGTATTTTCAGTTTGG
AAATGA SEQ ID NO: 3. ASGR-BBM construct sequence
GGATCCAGCCATGTCTAAACGATCAACAGATGACTGCCTAATATAAGGTTTTTGGGTTGTTGAATAAT
TAGGCAATATCCATATTAGATTCCGAAAGCAGTAAAACATGACAATGATAGTAACTAGTATGCACGCA
TAAGACATACTAGACGATAGTAACAACATAACCATGAACTCAGTAAACATGACTAAAGATTGGATCTT
AGATCCGTACCTGGCGCTCAGAGTTGCAAGCACTGCGGAGGGCGTCGATACTTCGGGGAAGACAAGCG
GCGCAGACGAAGCGACGACGGTGTTCCGGACGGCACGTAGCAGCCGACATTGAAGGCAATGCGCCCTC
TCGTCAGGAGACTTGCTAGGAAGACGAGCCACGATGACGACGATTGAGCAGTCACGCGGAGCACTTCC
CAAAAACCTTATTCGCCCTCTCCCGGTGCAGGATCGCAAGGACGGACGGTTCCGGAGACCTGCTCTCC
CAATCACCTGTGCACGCAGGTGTTCGGGATGGAGTAGATGGCGGCGGCGGCGGCGCAGCAGCGAGCGA
GAGAGGCAAAGTCCTAACTCAGATCAGATCTATTTTAGGGATACCCTTTCATGGGGCCTTTCCGTAGA
TAGTCTATTGTGCATCTCTTCTGTGAGGGGGTGGTCCATTTTTATATGGAGGGAAACCTCCAACACCC
TCGTCTATTAGCAATATGAGACTAATAGATGGTGTACCCCCTCATCACGCTAATGGGCCTTTGAGATT
TATTCAGGAATTATTGGATTGGCTAATGGGCCAAGCCCAAAATTCCAACACAATCAAGTTTGCCTCGC
ATATCTCGATTCTCGAACCAACCTCCGAGCCATATCTGATTGTAGACAAGTAAACAAACTCGGAGGCG
GAAGGGGGAACTGACCCGTTGAACGCCGTCACTGCCGGAACCGACGTCGCCGTCACTGAAGAAGAAGG
AAGATGCTTCCGAACCACCCAATACAAAACCTCACTAATTCCTCGCTGACGCCAGAGCAGACGCCGAC
GAAACGGGAAAGGAGTCAAAATACCTTATTCCATCGCCACCACATCATTTGGGCGCTGCTCGCTGATA
CGCCGGCGGGAGCGGTGGCAGCCAGGTGTACGCCCCCGCGGACTGCGCGCCGGCTGGCCGGCCGGCCA TABLE 2-continued

| ASGR-BBML cDNA, genomic DNA, amino acid sequence, and promoter sequence; the start codons are indicated by single underline and the stop codons are indicated through double underline. |
|---|
| CCGGGGCCGGGGCCCTTCAATCTCTTAGGGCGTCCCCAACAAGGCTGATTCAGCTAGCTATTTGAGTG<br>TACACATCAGCATGTATCCTACATGGAGGAAAGAGAGTATGCATTGAACATTGAGCCGGCTATTTGCT<br>CGTCGCCTATCTAGCACATCACCCAAGGCAGCGCTGTGTCTATGGCCTGGCAGAAAATATTGTTTAAA<br>TAACAAGTAGCCAGCTTTAGTAGATAGTACTTTCTCTTGCTGGCTTTTTTTTTTTTTGATAACAGCTC<br>TTGCTGGCTTTTAGCGTGCCGGCTCCGAGCTACTCCCTCTGTCCCAGAATTTGAGTCGCCGGCCAACA<br>GTGAAATGAGAGAGGGGCACGGAGTCCCAACGACAGTAATATTGGGACAGGGAGTAGCAGCTATCCAG<br>GACTGCTGTAGACGCCCTTAGTCCTCGACTCCTCGCAGCCTTTCGCCGTTGAAAGAATCACACCGCCC<br>CCTGCAGTTACGTGTTAACCCAACCCGGGCCATTGGTCAGTCCCTAACCCGGGCGGTTGACCGCTAGA<br>AATTAGAATTAACCCTTGGTTAACACCGGTCAAAGCGCACATATGCGGTGCAATCTAATCGAAGTGGC<br>CGCGTCATAATTACACACGCCCGCTCCTATACGTGTGCCCCGTTCATACGCATGCTCACCTCGCGCGT<br>TCCCATGAGGTTTCACACCCCTTGTGGGAATCCAAGGCGTCAGAGATTTATTGATCCCATTTCCCTAG<br>CCTGCCTCGCCTCTCTATCTACTTGTGTGGAGATTAGAGCACAGCAGCGAGAAAGGGCTTGCAGTCTA<br>TAAAGGCGACAAGAGCCCACACCCTCCTCTCTCTCTCTTCTCTCTCTCCATTTCTCTTCCCTAGGA<br>TCAGTGCTAGTGCTTGCAGCGGCCGCGTTCCGAGATGGGTTCCACCAACAACTGGCTGCGCTTCGCCT<br>CGTTCTCCGGCGGCGGCGGCGCCAAGGATGCCGCGGCCCTGCTCCCGCTGCCGCCCTCGCCCCGTGGC<br>GATGTCGACGAGGCCGGCGCAGAGCCGAAGCTCGAGGACTTCCTCGGCCTGCAGGAGCCGAGCGCCGC<br>CGCGGTGGGGGCTGGGCGGCCATTCGCGGTGGGTGGCGGTGCGAGCTCCATCGGGCTGTCCATGATCA<br>GGAACTGGCTGCGCAGCCAGCCGGCGCCGGCCGGGCCTGCTGCGGGGGTCGATTCGATGGTGCTGGCG<br>GCTGCGGCGGCGTCGACGGAGGTGGCCGGCGATGGCGCGGAGGGCGGCGGCGCCGTGGCTGACGCGGT<br>GCAGCAGAGGAAGGCGGCGGCGGTGGACACTTTCGGGCAGCGGACCTCCATATACCGCGGCGTCACAA<br>AGTAGGTTCTTGATTTTATTTTGGTTTTGGAAAAATTCTTCTTTGTTTTTTCTGTTTTCTTCCGACTG<br>GTATATCTTGTGTTAAGAACTTTTTCATTAGATGCATGTCATACTGTTGCTTTTTCTTGTTGCTTTGA<br>ACCTTTTGGCGTTTGCAGCTTCGTTTGGATATACAGAACCTATATTATCCCCTTTAGTAACCAGTAGA<br>TTCTTTTTTTTTCTTTTTTTTTTTTTGCTTTCGATGTTGTTAGTGTTCTTGCATCACGCATGTTTTTC<br>CTCTGATATTTTAATGGACGATATCATCTCTAGTTCAAGTTTTTGCTCTTGCTCTTGTTGTAGTGGTG<br>CTAAGATTTTTAAAAAAAAAAATTATGAGCAGTTCTTGTGCTGTTTGAAAATGTAAGCATCTCACAGT<br>TCTAAAATATATATATATATATATATATATAAGTCTCTCATGTTGATTTGTGGATGTACTGAAGCCCCGC<br>GCGCACACATGCACACACCGCACGCTCACACGCCCTAAATCCCCGGTGCAACACCAGGGTTGTCCCCG<br>ATGGGGATCGAACCCTGGCGGGTGGCCTAACCACCGTCAGCTCCCACCACCGAGCTATCAGCTCGTTT<br>GCCCATATTTCGTGTGGTACCTCGATATTTTTATATTTCTAGATTGCTGTATCTATCTTCTAGACTTA<br>TATAAGTGTTGCGCCACTCATACTTTTTACCGCCTGTAATCGAGTAGAACTGCTTCCTCTTTTGATTA<br>TATTGTATCAGTTAAATGATCTTGTTGTTGATGTGTTTACCACTTTACCATCACCATTGCATGAAATC<br>ACTTCAAGACATGTATTCATGATTTGGCTGGCTAAATTTGCTAGTGGCACATACATGTGGTAAAAAAA<br>TATTTTTAGTTTGTGCTTGCTATTCTTTTCGGTCATCCCTTCGTGCCTGTTTATCCAGAACACCCAAT<br>CTGCTTCACATAGTTTTTGAATGCTATCATCATATTTCTTTTTTGGAGATATTGTTACTAAAAGTTTG<br>GCTTTGTCCTCAATAGGCATAGATGGACAGGAAGGTATGAAGCCCATCTTTGGGACAATAGCTGCAGA<br>AGAGAAGGTCAAACTCGGAAAGGTAGACAAGGTAATGATTATAATATAGATATTTAAATTTGTAATTA<br>TAAGCTGCATCATATTATTATTTATTAGATCGGCTTTAAAATTTCACTAGCTAATTTAGTGTTTTTCT<br>TTTCTTCATCGATACCTGCAATCGCTTCATTCCATTGATTCAGTGTATCTTGGTAAGTAATACTTGTT<br>TACAATTGCAAAATGGTATATCTCTTGTTGTTTCTCATGTCAAGTATATTAAATATGTGGTTGATGCA<br>TTGAAGGTGGATATGATAAAGAAGAAAAAGCAGCTAGAGCTTATGATTTAGCTGCTCTCAAGTACCGG<br>GGCACCACAACTACTACAAATTTTCCGGTATTACTTATTGTTAATATGTTGGTTCTCCAGAATTGATA<br>TTTTACTTCTAATATATAACTGCGTATATGAATGAATGTTGTAAGATTTTGCATTTTATGTTCAGATG<br>AGCAACTATGAAAAGGAGTTAGAAGAGATGAAGCATATGTCACGACAAGAATATGTTGCATCCCTTAG<br>AAGGTACATGTGTTGTCAAAACTTTGTACCTTCATGGAAACTGAACTTATATATTTCACAAATGGATT<br>GACATAGAACATATATTTGTGATACAGGAAAAGCAGTGGTTTTTCTCGTGGTGCATCAATTTACCGAG<br>GGGTTACCAGGTACAAAATATTCCTTTTCCTTATTATCTCTGGTTTTAGTTAGCAAGTGCATTGTTTC<br>TATGGGAATTTGTGTTGCATGTAGATGGGAATTTGTGTTGCATGTAGATCATAAATAGTTGCAACTAT<br>TAATCTCATCGTTCTATTGCTGAATAGTTGTGGTACTCCTTTACCACAGTTGACTATGATATTCTATT<br>ATATTATTTTTCTTGCAAAGTTGATATTTAATTGCTTGTCTAGCTAACTTTCAAGCAATCATGTAAAA<br>CAGGCACCATCAGCATGGAAGGTGGCAAGCAAGAATAGGAAGTGTGGCAGGAAACAAGGATCTTTATT<br>TGGGCACATTCAGTAAGTCACATTTTAATATTTTTAATGAAGCACTGATTTTTTTTTGTCAAGCAAAA<br>TGGAAGCAAGACAGAAAAACATAAACCTACTGGAGCACCTTTTTCATTATTTTGTCTCTTGAATATAA<br>TAGTATGTGGCTGACCTCTCCCTGTGTAGGTACCCAGGAGGAAGCTGCAGAGGCTTACGACATTGCTG<br>CCATCAAATTCCGAGGCCTCAATGCTGTCACGAACTTTGACATGAGCCGGTATGACGTCAAGAGCATC<br>ATTGAGAGCAGCTCCCTGCCTGTTGGCGGCACTCCAAAGCGTCTCAAGGAAGTGCCTGATCAATCAGA<br>TATGGGCATCAACATAAACGGTGACTCTGCTGGTCATATGACTGCTATCAACCTTCTTACTGATGGCA<br>ATGACAGCTATGGAGCTGAGAGTTATGGTTACAGTGGTTGGTGTCCCACAGCCATGACGCCAATCCCC<br>TTTCAATTCAGCAATGGCCATGACCATTCCAGGCTGTGGTGCAAGCCAGAGCAGGACAATGCGGTTGT<br>TGCAGCACTGCATAACCTGCATCACCTCCAGCACTTGCCAGCCCCAGTTGGCACCCATAATTTTTTCC<br>AGCCATCGCCTGTTCAGGACATGACAGGTGTTGCCGATGCTTCATCGCCACCAGTAGAATCTAATTCA<br>TTCCTGTACAATGGGGACGTTGGTTACCATGGTGCCATGGGTGGCAGCTATGCCATGCCGGTTGCCAC<br>ACTAGTTGAGGGCAACTCTGCGGGCAGTGGCTATGGAGTTGAGGAAGGCACAGGGTCTGAAATCTTTG<br>GTGGACGGAACTTGTATTCTCTCTCCCAAGGTTCCTCAGGCGCCAATACTGGAAAGGCAGATGCTTAT<br>GAAAGCTGGGATCCATCTATGCTGGTGATATCACAGAAGTCTGCCAATGTGACTGTCTGCCATGGCGC<br>ACCTGTATTTTCAGTTTGGAAATGATGGTTAGATGAAAATATAGTAGTGATATTAACTAGTTCTTGGA<br>GGGGAAGATTAAATTCTAGGTATACAAAAGTTTAATTTATTAGTGCTTCAAGATCTCGTATGAAAAAA<br>AGTTTTGCTGCTTAATCAGCTCCAGTGGGAGTCTAGGAGCCATGAGAAATGTCGTTTTATTATTGACT<br>AATGCTACAATGCTAACATGCTGACTCTTTTGAATGGCACAAGAGCTCTGGTGTTTCAATACATCAGC<br>CAGTTTCATTATTGTCCATTTGCTGTGCACATTTTCTGCGCTGGCACCTATAATAATATGATTCTAAA<br>CTGTGAATTAGTTCAGATGTCAACTGTAAGTAACTTTATTTTAGCTTTCTTATATACATCTCTTTTTC<br>TTTTTGAGAAACGGGCTTTGCCCCCAGCCTTCATAGGAGGCTGGTGCAGCGTACCGGGTCCGAACCTG<br>GGCTGGTGACGTCCTCAGCATGAGCGCCCACCACCGAGCTACACGCTCGTCTGCTCTTATATACATCT<br>CTTCAGTAAGGGTAATATGGTACTTCACAGTTCACAGTCCAGTCATTCCAACCATGGATGAGCAAAAT<br>GTGCTTGTGCACATGGTGGGTC |

TABLE 2-continued

| ASGR-BBML cDNA, genomic DNA, amino acid sequence, and promoter sequence; the start codons are indicated by single underline and the stop codons are indicated through double underline. |
|---|
| SEQ ID NO: 4. ASGR-BBM amino acid sequence<br>MGSTNNWLRFASFSGGGGAKDAAALLPLPPSPRGDVDEAGAEPKLEDFLGLQEPSAAAVGAGRPFAVG<br>GGASSIGLSMIRNWLRSQPAPAGPAAGVDSMVLAAAAASTEVAGDGAEGGGAVADAVQQRKAAAVDTF<br>GQRTSIYRGVTKHRWTGRYEAHLWDNSCRREGQTRKGRQVYLGGYDKEEKAARAYDLAALKYRGTTTT<br>TNFPMSNYEKELEEMKHMSRQEYVASLRRKSSGFSRGASIYRGVTRHHQHGRWQARIGSVAGNKDLYL<br>GTFSTQEEAAEAYDIAAIKFRGLNAVTNFDMSRYDVKSIIESSSLPVGGTPKRLKEVPDQSDMGININ<br>GDSAGHMTAINLLTDGNDSYGAESYGYSGWCPTAMTPIPFQFSNGHDHSRLWCKPEQDNAVVAALHNL<br>HHLQHLPAPVGTHNFFQPSPVQDMTGVADASSPPVESNSFLYNGDVGYHGAMGGSYAMPVATLVEGNS<br>AGSGYGVEEGTGSEIFGGRNLYSLSQGSSGANTGKADAYESWDPSMLVISQKSANVTVCHGAPVFSVW<br>K* |
| SEQ ID NO: 5. ASGR-BBM promoter sequence<br>GGATCCAGCCATGTCTAAACGATCAACAGATGACTGCCTAATATAAGGTTTTTGGGTTGTTGAATAAT<br>TAGGCAATATCCATATTAGATTCCGAAAGCAGTAAAACATGACAATGATAGTAACTAGTATGCACGCA<br>TAAGACATACTAGACGATAGTAACAACATAACCATGAACTCAGTAAACATGACTAAAGATTGGATCTT<br>AGATCCGTACCTGGCGCTCAGAGTTGCAAGCACTGCGGAGGGCGTCGATACTTCGGGGAAGACAAGCG<br>GCGCAGACGAAGCGACGACGGTGTTCCGGACGGCACGTAGCAGCCGACATTGAAGGCAATGCGCCCTC<br>TCGTCAGGAGACTTGCTAGGAAGACGAGCCACGATGACGACGATTGAGCAGTCACGCGGAGCACTTCC<br>CAAAAACCTTATTCGCCCTCTCCCGGTGCAGGATCGCAAGGACGGACGGTTCCGGAGACCTGCTCTCC<br>CAATCACCTGTGCACGCAGGTGTTCGGGATGGAGTAGATGGCGGCGGCGGCGGCGCAGCAGCGAGCGA<br>GAGAGGCAAAGTCCTAACTCAGATCAGATCTATTTTAGGGATACCCTTTCATGGGGCCTTTCCGTAGA<br>TAGTCTATTGTGCATCTCTTCTGTGAGGGGGTGGTCCATTTTTATATGGAGGGAAACCTCCAACACCC<br>TCGTCTATTAGCAATATGAGACTAATAGATGGTGTACCCCCTCATCACGCTAATGGGCCTTTGAGATT<br>TATTCAGGAATTATTGGATTGGCTAATGGGCCAAGCCCAAAATTCCAACACAATCAAGTTTGCCTCGC<br>ATATCTCGATTCTCGAACCAACCTCCGAGCCATATCTGATTGTAGACAAGTAAACAAACTCGGAGGCG<br>GAAGGGGGAACTGACCCGTTGAACGCCGTCACTGCCGGAACCGACGTCGCCGTCACTGAAGAAGAAGG<br>AAGATGCTTCCGAACCACCCAATACAAAACCTCACTAATTCCTCGCTGACGCCAGAGCAGACGCCGAC<br>GAAACGGGAAAGGAGTCAAAATACCTTATTCCATCGCCACCACATCATTTGGGCGCTGCTCGCTGATA<br>CGCCGGCGGGAGCGGTGGCAGCCAGGTGTACGCCCCCGCGGACTGCGCGCCGGCTGGCCGGCCGGCCA<br>CCGGGGCCGGGGCCCTTCAATCTCTTAGGGCGTCCCCAACAAGGCTGATTCAGCTAGCTATTTGAGTG<br>TACACATCAGCATGTATCCTACATGGAGGAAAGAGAGTATGCATTGAACATTGAGCCGGCTATTTGCT<br>CGTCGCCTATCTAGCACATCACCCAAGGCAGCGCTGTGTCTATGGCCTGGCAGAAAATATTGTTTAAA<br>TAACAAGTAGCCAGCTTTAGTAGATAGTACTTTCTCTTGCTGGCTTTTTTTTTTTTTGATAACAGCTC<br>TTGCTGGCTTTTAGCGTGCCGGCTCCGAGCTACTCCCTCTGTCCCAGAATTTGAGTCGCCGGCCAACA<br>GTGAAATGAGAGAGGGGCACGGAGTCCCAACGACAGTAATATTGGGACAGGGAGTAGCAGCTATCCAG<br>GACTGCTGTAGACGCCCTTAGTCCTCGACTCCTCGCAGCCTTTCGCCGTTGAAAGAATCACACCGCCC<br>CCTGCAGTTACGTGTTAACCCAACCCGGGCCATTGGTCAGTCCCTAACCCGGGCGGTTGACCGCTAGA<br>AATTAGAATTAACCCTTGGTTAACACCGGTCAAAGCGCACATATGCGGTGCAATCTAATCGAAGTGGC<br>CGCGTCATAATTACACACGCCCGCTCCTATACGTGTGCCCCGTTCATACGCATGCTCACCTCGCGCGT<br>TCCCATGAGGTTTCACACCCCTTGTGGGAATCCAAGGCGTCAGAGATTTATTGATCCCATTTCCCTAG<br>CCTGCCTCGCCTCTCTATCTACTTGTGTGGAGATTAGAGCACAGCAGCGAGAAAGGGCTTGCAGTCTA<br>TAAAGGCGACAAGAGCCCACACCCTCCTCTCTCTCTCTTCTCTCTCTCCATTTCTCTTCCCTAGGA<br>TCAGTGCTAGTGCTTGCAGCGGCCGCGTTCCGAG |

Example 5 gPsASGR-BBML-Containing Transgenic Pearl Millet Lines

Transgenic lines were regenerated from these experiments, and two plates of pearl millet embryogenic tissues were bombarded for each construct. For these constructs, the marker gene selected was for hygromycin resistance rather than phosphinothricin resistance. Of 5 cDNA construct lines, consisting of 13 plants total, that were regenerated and screened by ovule clearing, 3 plants showed a low frequency of small groups of densely cytoplasmic dividing cells in the nucellus; however, none of these was clearly interpreted as representing an organized embryo structure beyond the globular stage.

Of the nine independent transgenic lines (18 plants) containing the transgene, gPsASGR-BBML, generated from sexual tetraploid pearl millet, four lines, consisting of six plants, were not analyzed as a result of lack of flowering or demise of the plant. Four plants within 3 lines showed evidence of embryo formation from egg cells in the absence of fertilization, and 3 plants died prior to ovary analysis. Evidence for lack of fertilization was the persistence of polar nuclei in the central cell of the embryo sac. Parthenogenesis was assayed two days after anthesis for the remaining transgenic plants using a cleared-pistil technique (B. A. Young, R. T. Sherwood, E. C. Bashaw, *Can. J Bot.* 57:1668-1672 (1979)), and observation was conducted via differential interference contrast (DIC) or phase contrast optics. Fertilization was prevented by bagging heads prior to stigma exsertion and removing stigmas/styles prior to anthesis (since the plants are protygynous, meaning that stigmas exsert prior to anthers).

Figure 10:
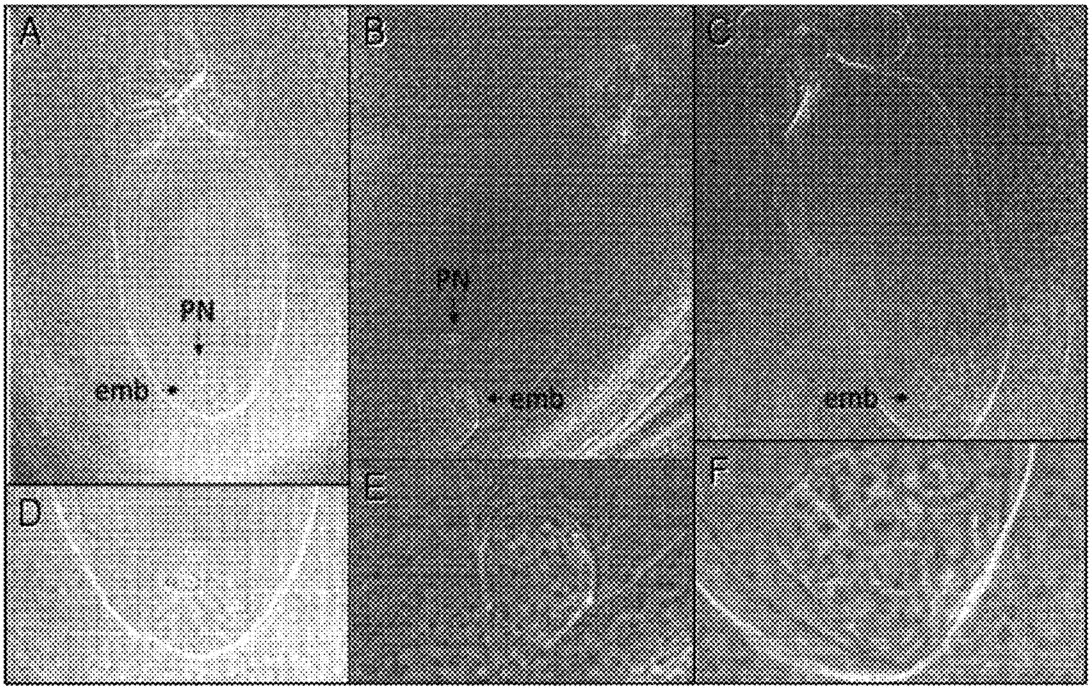
FIG. 10 depicts examples of embryo formation in embryo sacs with polar nuclei.

As shown in Table 3, the presence of embryos in the same embryo sac where polar nuclei persist (embryo+PN) provides evidence that the embryo sac was not fertilized and that the egg is developing parthenogenetically. Examples of embryo formation in embryo sacs with polar nuclei are shown in FIG. 10. Since this would be indicative parthenogenesis in a sexual plant where meiosis occurs, the parthenogenetically-derived, haploid embryos are expected to have half the chromosome number and DNA content (FIG. 10) of the mother plant. Offspring #105 (FIG. 10D) and #106 (FIG. 10C) are examples of haploid (ln=2×) individuals with half the expected DNA content of progeny from a sexual diploid (2n=4×) plant (e.g. #100 (FIG. 10B), #107 (FIG. 10D) and #108 (FIGS. 10A, 10C)). While not all embryos developed parthenogenetically in these lines (embryo sac+PN), this was likely due to incomplete penetrance of the phenotype as well as segregation of the transgene. While not all embryo sacs developed normally (no embryo sac/abnormal sac structure) in these lines, this was likely due to variation induced by tissue culture, poor health of plants, and/or a peiotropic effect of the transgene. Further information regarding these alternatives can be gleaned via genetic analysis. Stigma removal was not 100%, resulting in occasional pollination (last column).

TABLE 3

| Line | Embryo + PN | Embryo Sac + PN | No Embryo Sac | Abnormal embryo sac structure | Pollination occurred-clear endosperm development |
|---|---|---|---|---|---|
| G3f#35 1$^{st}$ | 24 | 24 | 12 | 5 | 4 |
| G3f#35 A | 4 | 14 | 17 | 5 | 10 |
| G3f#35 B | 11 | 19 | 20 | 5 | 8 |
| G11a#37 1$^{st}$ | 3 | 7 | 3 | 2 | 3 |
| G11a#37 2$^{nd}$ | 8 | 14 | 12 | 5 | 11 |
| G52#72 1$^{st}$ | 11 | 16 | 1 | 5 | 22 |
| G52#72 2$^{nd}$ | 6 | 13 | 11 | 1 | 24 |

Figure 11:
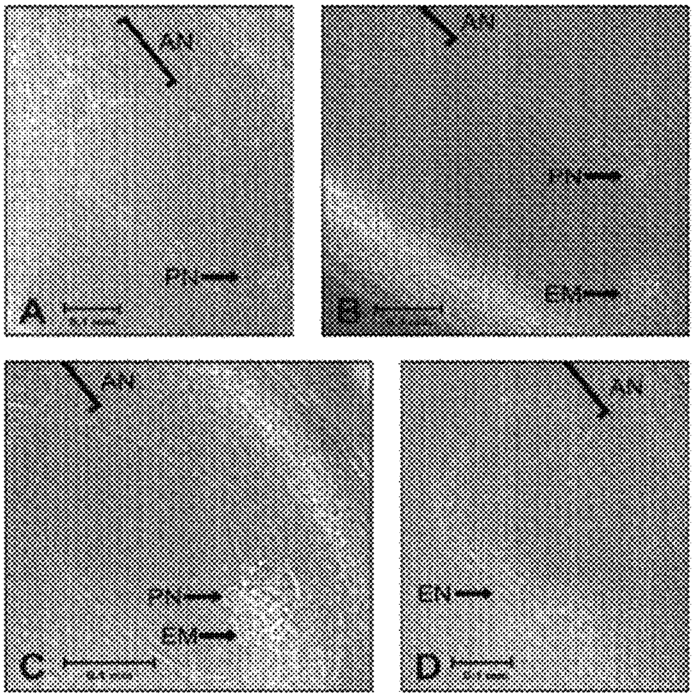
FIG. 11 depicts parthenogenetic embryo development in ovaries of sexual tetraploid pearl millet containing the gPsASGR-BBML transgene. Images are from ovaries collected and fixed 2 days after anthesis, cleared with methyl salicylate and visualized under phase contrast optics at 20×.
Figure 12:
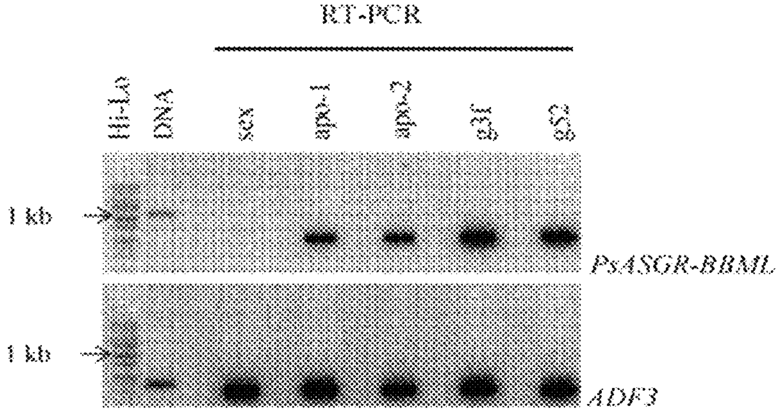
FIG. 12 depicts non-quantitative RT-PCR analysis of gPsASGR-BBML expression in ovaries. Total RNA was isolated from sexual (sex) and apomictic (apo-1, apo-2) BC8 ovaries at day of anthesis and from line g3f and g52 ovaries at 2 days after anthesis. Three micrograms of total RNA was subjected to DNAse treatment, reverse transcribed and an aliquot of the first strand cDNA was amplified with PsASGR-BBML specific primers p779/80 (Y. Akiyama et al., *BMC Evolutionary Biology,* 11:289 (2011)) and ADF3 primers p1127/28. The genomic DNA sample was isolated from an apomictic BC8 plant. Ladder is HI-LO DNA marker (Minnesota Molecular, Minneapolis, MN). The marker and DNA lanes originated from the same gel for both primers and were merged with the RT-PCR lanes to remove unnecessary lanes.
Figure 13:
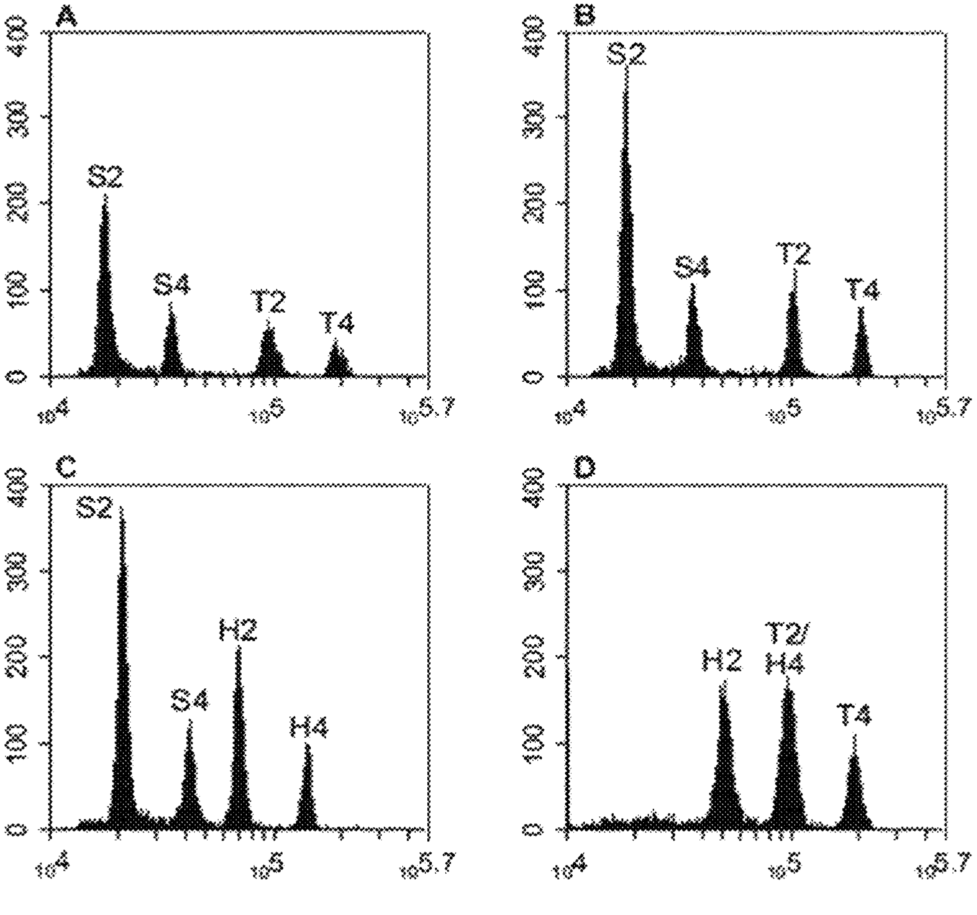
FIG. 13 depicts flow cytometry analysis to determine genome size of TO plants and offspring. Examples of genome size analysis using a BD-Accuri flow cytometer of TO plants and g3f offspring (T1).

All lines contained structurally mature embryo sacs (FIG. 11A), of which three independent lines (g3f, g11a, and g52) showed parthenogenesis (FIGS. 11B, 11C) based on the persistence of polar nuclei in the central cell and an absence of endosperm development, as endosperm can be readily visualized in fertilized embryo sacs of the same developmental stage. When pollination was not prevented, all three lines demonstrated endosperm formation at day 2 (FIG. 11D). A minimum of 3 heads and 150 ovaries were analyzed for each of the 3 lines, wherein the percentage of structurally mature sexual embryo sacs (FIG. 11A) on each head and the percentage of those containing parthenogenetic embryos at 2 days after anthesis were 66, 79, 71, and 35, 36, 35 for lines g11a, g52 and g3f, respectively. gPsASGR-BBML transgene expression was verified by RT-PCR with RNA extracted from open-pollinated ovaries 2 days after anthesis for lines g52 and g3f (FIG. 12). To rule out potential ploidy changes induced by tissue culture selection and regeneration, the three to gPsASGR-BBML lines were analyzed via flow cytometry (FIG. 13A). All three lines were shown to maintain a tetraploid ploidy level.

Figure 14:
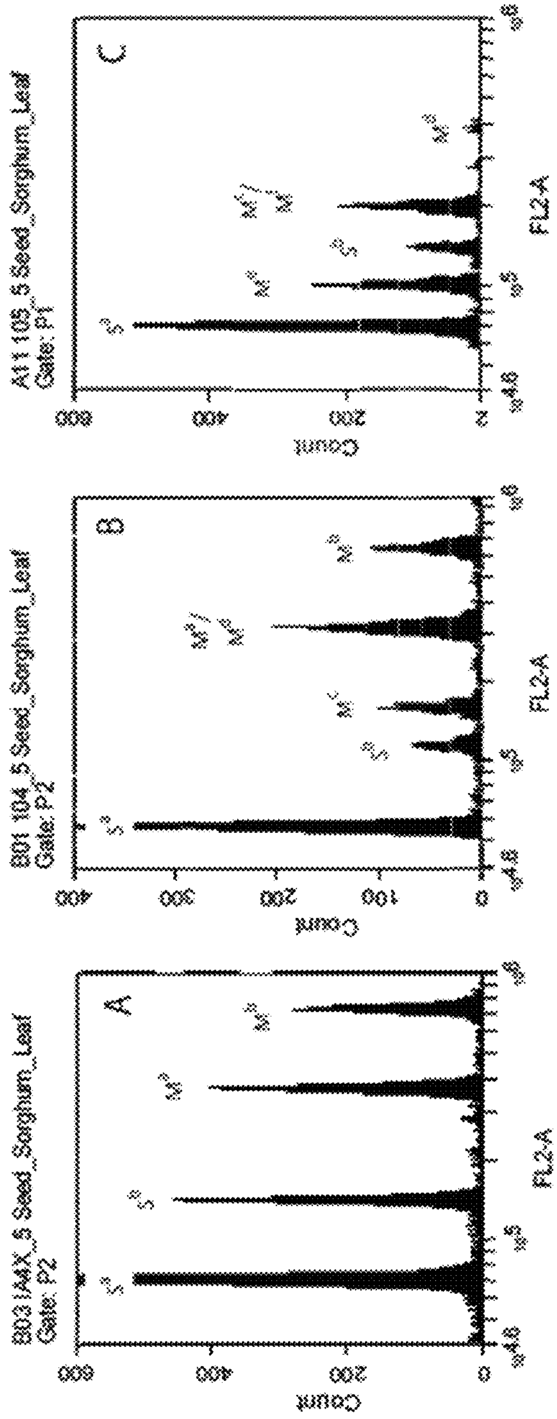
FIG. 14 depicts flow cytometry of seed, showing the production of reduced offspring.

As a result of low germination rates and low seed set for lines g11a and g52, embryo rescue was employed on developing seed 10 to 15 days after pollination and on non-germinating mature seed in order to recover offspring from the 3 lines. Seed analyzed via flow cytometry demonstrated the production of reduced offspring (FIG. 14).

Pollination with Red IA4X plants, which are sexual tetraploid lines containing a dominant Rpl allele which confers a dark red pigmentation in the midrib and sheath of leaves (W. W. Hanna, G. W. Burton, *J Hered.* 83:386-388 (1992)), over multiple heads and days was used to compensate in part for potential pollen sterility of the transgenic lines. Plant g11a set a total of nine seed, two offspring of which survived to greenhouse planting. Plant g52 set 97 seed 31 offspring of which survived to greenhouse planting. Plant g3f set hundreds of seed of which 194 were randomly selected, with 107 surviving to greenhouse planting.

All offspring were analyzed for the inheritance of a 3,694 bp amplicon covering the gPsASGR-BBML open reading frame starting five base pairs downstream from the start codon and amplifying into the 3' UTR (ORF amplicon). The two g11a offspring showed no inheritance of the transgene. All offspring from g52 showed red pigmentation of the midrib; these were derived from the fertilization of g52 sexual embryo sacs with Red IA4X pollen. Nine of the offspring plants carried at least one copy of the ORF amplicon. The g3f offspring plants had a mix of both green and red pigmentation of the midrib. Twenty-six g3f offspring plants carried at least one copy of the ORF amplicon.

All offspring plants from line g52 were assayed for parthenogenesis (Table 4, FIG. 15B), which demonstrated that only offspring inheriting the ORF amplicon showed parthenogenesis 2 days after anthesis. No embryo formation was identified in 791 structurally mature sexual embryo sacs from 21 g52 offspring which did not inherit the ORF amplicon. Ninety sexual embryo sacs displayed embryo development as well as polar nuclei from the nine g52 offspring inheriting the ORF amplicon. The percentage of ovules showing embryo development ranged from 12% to 53% in the various g52 offspring.

Figure 15:
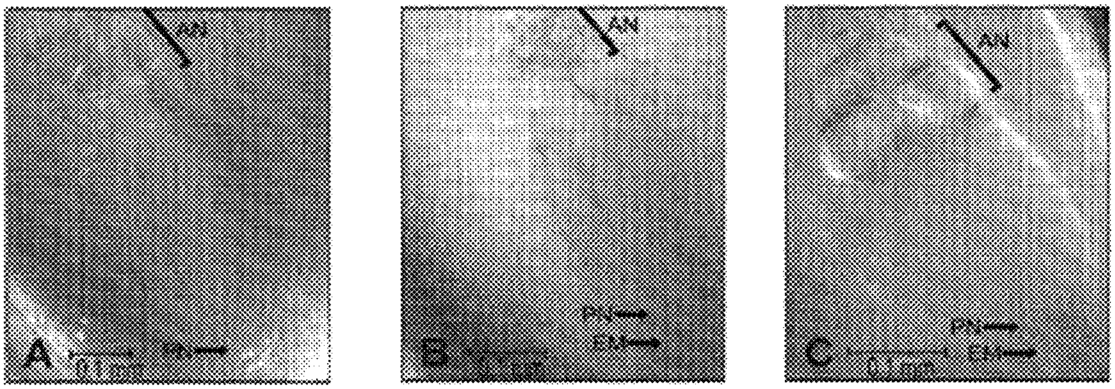
FIG. 15 depicts parthenogenetic embryo development in ovaries of sexual offspring of pearl millet TO lines g52 and g3f inheriting the gPsASGR-BBML transgene. Examples of ovaries collected and fixed 2 days after anthesis, cleared with methyl salicylate and visualized under DIC optics at 20X.
Figure 16:
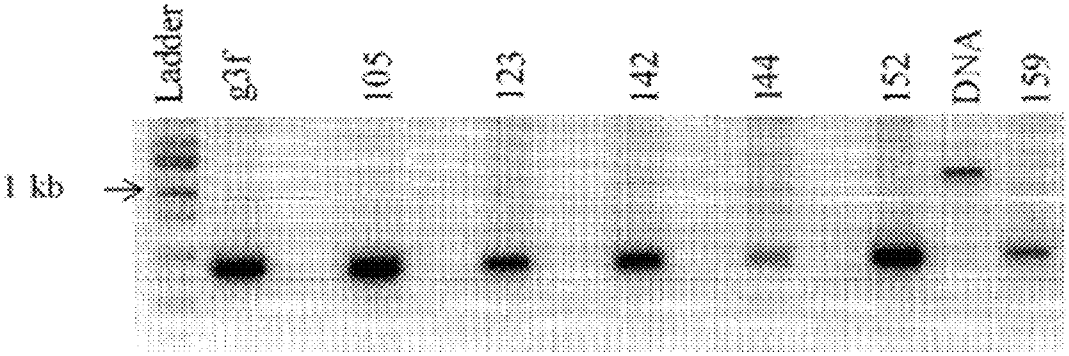
FIG. 16 depicts results from non-quantitative RT-PCR analysis of gPsASGR-BBML expression in ovaries of g3f offspring. Total RNA was isolated from ovaries at day of anthesis from g3f and g3f offspring. Three micrograms of total RNA was subjected to DNAse treatment, reverse transcribed and an aliquot of the first strand cDNA was amplified with PsASGR-BBML specific primers p779/80 (Y. Akiyama et al., *BMC Evolutionary Biology,* 11:289 (2011)). The genomic DNA sample was isolated from an apomictic BC8 plant. Ladder is HI-LO DNA marker (Minnesota Molecular).

A subset of offspring plants generated from the g3f line was assayed for parthenogenesis (Table 5, FIG. 15C). No embryo formation was identified in a total of 951 structurally mature sexual embryo sacs from 28 g3f offspring which did not inherit the ORF amplicon. Three of the 26 offspring inheriting the ORF amplicon were unavailable for parthenogenesis assay because they did not flower. Of the remaining 23 offspring inheriting the ORF amplicon, ampicon, 19 displayed parthenogenesis, and four did not. The percentage of structurally mature embryo sacs in which embryo development was observed ranged from 1% to 52% from the various g3f offspring displaying parthenogenesis. Of the four offspring carrying the transgene but not showing parthenogenesis, plants 123, 144, and 159 were assayed for transgene expression via RT-PCR analysis (FIG. 16). In all three offspring, gPsASGR-BBML expression was detected in unpollinated ovaries at the day of anthesis. Two transgene-specific amplicons covering the gPsASGR-BBML cDNA transgene from the 5' UTR through the 3' UTR were sequenced from plants 123, 144, and 159, along with plant 105 which also displayed parthenogenesis. All sequences were found to be identical to the PsASGR-BBM cDNA sequences derived from the BC7 and BC8 apomictic plants.

Figure 17:
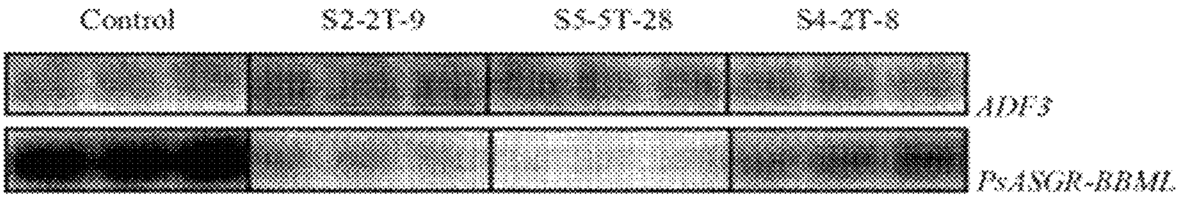
FIG. 17 depicts results from semi-quantitative RT-PCR analysis of the reduction in PsASGR-BBML expression in apomictic RNAi Fl lines. Image of signals produced after hybridization of RT-PCR products of unpollinated ovary tissue from RNAi Fl lines at day of anthesis for quantification. Signals from triplicate PCR reactions were averaged to determine the final reduction of PsASGR-BBML in ASGR positive/RNAi positive lines compared to the control plant (ASGR positive/RNAi negative). The ADF3 signal was used to normalize starting RNA amounts for each sample. Reductions were calculated using the following formula: (1−(averaged signal of ASGR-BBML RNAi line/averaged signal of ADF3)/(averaged signal of ASGR-BBML control line/averaged signal of ADF3))×100 (Table 7).
Figure 18:
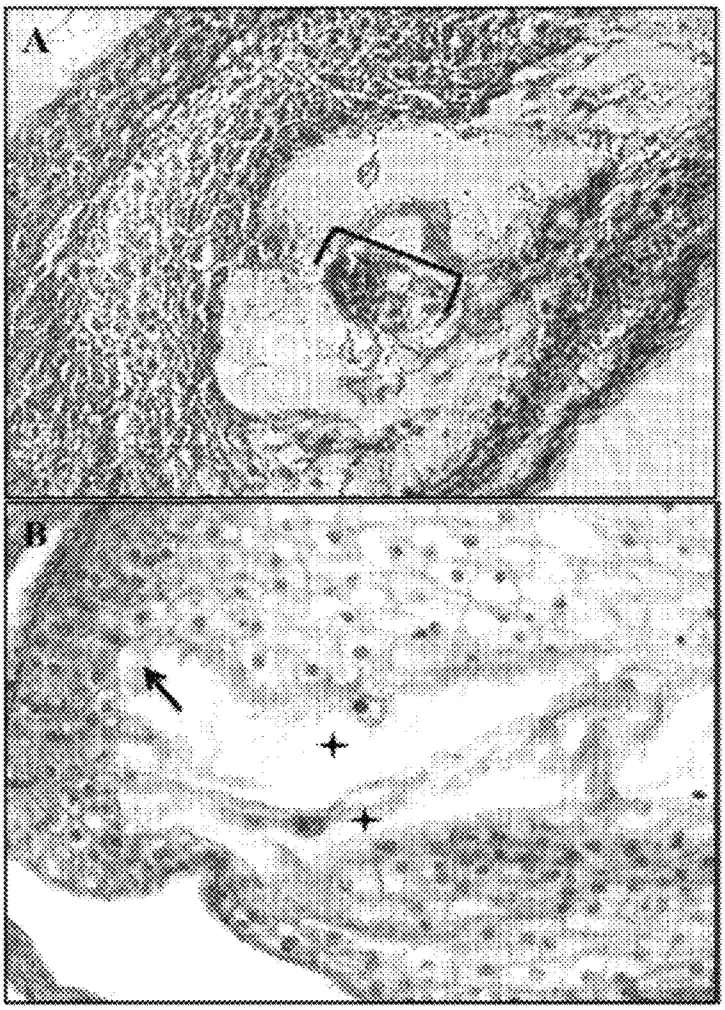
FIG. 18 depicts an example of histological observation used to determine embryo cell number in control and PsASGR-BBML RNAi lines.

Because g3f offspring were a mix of both red and green pigmentation of the midrib, determination of ploidy level of the green phenotypes was required (Table 6). Six offspring were diploid/dihaploid in genome size as analyzed via flow cytometry using sorghum as the genome size reference (FIG. 13B-C). The diploid/dihaploid offspring were further confirmed by mixing predicted diploid/dihaploid and tetraploid offspring together in order to generate 3 peaks (FIG. 13D). All six haploid offspring carry the ORF amplicon; of the four that flowered, all displayed parthenogenesis (FIG. 15C). The role of PsASGR-BBML in apomictic development was evaluated in apomictic F1 transgenic lines using an RNAi knock-down strategy with a RNAi-BBM-3p construct. As direct transformation and regeneration of apomictic *P. squamulatum* was not possible, an alternative strategy and screening protocol for generating apomictic F1 plants with reduced expression of PsASGR-BBML was employed. After screening, three plants, each of which was derived from a different line, with a genotype of ASGR-positive/RNAi-positive showed reduced PsASGR-BBML gene expression based on semi-quantitative analysis of PsASGR-BBML expression at the day of pollination (Table 7, FIG. 17), as compared against the ASGR-positive/RNAi-negative control genotype. The three PsASGR-BBML reduced-expression F1 plants were found to contain the same percentage of ovules with aposporous embryo sac formation as the control plant (Table 7). The plants were then pollinated with Red IA4X pollen, and offspring were found to be derived through apomixis based on the lack of red pigmentation of the midrib and uniform phenotypes. However, histological observation showed that the number of ovaries showing parthenogenetic embryo development and the number of cells in those embryos 2 days after anthesis was significantly reduced in the PsASGRBBML reduced-expression lines (Table 7, FIG. 18).

Analysis of sexual transgenic lines which carry the gPsASGR-BBML transgene and produce fertilization-independent embryo formation and diploid/dihaploid offspring, albeit at somewhat low penetrance, demonstrates that the PsASGR-BBML gene alone can promote parthenogenesis in sexual tetraploid pearl millet, which are plants which do not normally show this trait. None of the TO lines or offspring from the TO lines showed complete penetrance of the trait; this incomplete penetrance within the original TO lines and offspring of lines g3f and g52 is likely due to transgene segregation, transgene expression levels, and/or unknown genetic factors interacting with PsASGRBBML. Although transcription of the transgene was identified in offspring that did not demonstrate parthenogenesis, quantifying levels of transgene expression is difficult due to variation in percentage of structurally mature sexual embryo sacs and the inability to verify that RNA is being extracted from ovaries that are at the same developmental stage. Generation of inbred lines containing a single copy of the gPsASGR-BBML transgene or the expression of the gPsASGRBBML transgene using egg-specific promoters with different expression levels would be advantageous to confirm these issues.

Ploidy level was not found to be critical for PsASGR-BBML transgene-induced parthenogenesis, as the four chromosomally reduced diploid/dihaploid offspring generated from g3f showed a similar range of parthenogenesis levels as the unreduced tetraploid offspring. While most natural apomicts are polyploid, natural populations and experimentally recovered apomictic diploids/dihaploids from several species have been identified. For example, polyploid apomictic plants can produce diploids/dihaploids offspring either through the genetic separation of the apomeiosis and parthenogenesis loci (R. D. Noyes, J. D. Wagner, *American Journal of Botany* 101:1-10 (2014)) or through the parthenogenetic development of a reduced egg carrying an apomixis locus (M. Dujardin, W. W. Hanna, *Theor Appl Genet* 72:33-36 (1986)).

The lack of an F1 aposporous transgenic line showing complete knock-down of PsASGRBBML precludes a determination of whether PsASGR-BBML is the sole gene required to induce parthenogenesis in plants programmed for the apomixis pathway through the inheritance of the ASGR. However, given that the number of ovaries showing parthenogenetic embryo development and that the number of cells in those embryos at 2 days after anthesis were significantly reduced in the F1 PsASGR-BBML-reduced-expression lines, PsASGRBBML clearly has an important role in parthenogenesis in the apomictic reproductive pathway.

While members of the BBM-like clade of AP2 transcription factors have noted roles in somatic embryogenesis and cell proliferation, these results have uncovered for the first time the role for PsASGRBBML in parthenogenesis. It is worth noting that neither maize nor sorghum have a PsASGR-BBML protein more related to PsASGR-BBML than does the more distantly related species rice. Therefore, this newly discovered role can have a major impact on the ability to genetically engineer apomixis into crop species This technique therefore can also be used as an alternative method for haploid induction in order to rapidly obtain homozygous lines for breeding.

TABLE 4

Visual determination of parthenogenesis in cleared ovaries 2 days after anthesis in offspring from g52.

| Offspring Designation: | Genotype-ORF amplicon: | Number of identified developing embryos with polar nuclei in structurally mature sexual embryo sacs | Number of identified developing embryos without distinct polar nuclei but also without endosperm development | Number of structurally mature sexual embryo sacs without embryo development | Number of ovaries with no structurally mature sexual embryo sacs | Percentage of structurally mature sexual embryo sacs | Percentage of parthenogenesis in structurally mature sexual embryo sacs |
|---|---|---|---|---|---|---|---|
| 300 | – | 0 | 0 | 25 | 4 | 86 | 0 |
| 301 | – | 0 | 0 | 22 | 22 | 50 | 0 |
| 302 | – | 0 | 0 | 37 | 10 | 79 | 0 |
| 305 | – | 0 | 0 | 40 | 13 | 75 | 0 |
| 307 | – | 0 | 0 | 46 | 6 | 88 | 0 |
| 309 | – | 0 | 0 | 34 | 12 | 74 | 0 |
| 310 | – | 0 | 0 | 30 | 19 | 61 | 0 |
| 311 | – | 0 | 0 | 45 | 5 | 90 | 0 |
| 312 | – | 0 | 0 | 39 | 6 | 87 | 0 |
| 313 | – | 0 | 0 | 44 | 7 | 86 | 0 |
| 314 | – | 0 | 0 | 48 | 3 | 94 | 0 |
| 315 | – | 0 | 0 | 40 | 14 | 74 | 0 |
| 317 | – | 0 | 0 | 41 | 12 | 77 | 0 |
| 319 | – | 0 | 0 | 32 | 14 | 70 | 0 |
| 320 | – | 0 | 0 | 49 | 0 | 100 | 0 |
| 321 | – | 0 | 0 | 26 | 21 | 55 | 0 |
| 322 | – | 0 | 0 | 41 | 5 | 89 | 0 |
| 323 | – | 0 | 0 | 31 | 20 | 61 | 0 |

TABLE 4-continued

Visual determination of parthenogenesis in cleared ovaries 2 days after anthesis in offspring from g52.

| Offspring Designation: | Genotype-ORF amplicon: | Number of identified developing embryos with polar nuclei in structurally mature sexual embryo sacs | Number of identified developing embryos without distinct polar nuclei but also without endosperm development | Number of structurally mature sexual embryo sacs without embryo development | Number of ovaries with no structurally mature sexual embryo sacs | Percentage of structurally mature sexual embryo sacs | Percentage of parthenogenesis in structurally mature sexual embryo sacs |
|---|---|---|---|---|---|---|---|
| 326 | – | 0 | 0 | 48 | 8 | 86 | 0 |
| 329 | – | 0 | 0 | 29 | 17 | 63 | 0 |
| 330 | – | 0 | 0 | 44 | 11 | 80 | 0 |
| Total numbers analyzed without the gPsASGR-BBMORF | 21 | 0 | 0 | 791 | 229 | 78 | 0 |
| 303 | + | 7 | 0 | 25 | 16 | 67 | 22 |
| 306 | + | 10 | 0 | 45 | 13 | 81 | 18 |
| 308 | + | 7 | 4 | 24 | 8 | 81 | 31 |
| 316 | + | 11 | 1 | 29 | 11 | 79 | 29 |
| 318 | + | 6 | 0 | 33 | 8 | 83 | 15 |
| 324 | + | 8 | 3 | 21 | 14 | 70 | 34 |
| 325* | + | 31 | 6 | 33 | 12 | 85 | 53 |
| 327 | + | 6 | 1 | 28 | 12 | 74 | 20 |
| 328 | + | 4 | 0 | 30 | 15 | 69 | 12 |
| Total numbers analyzed with the gPsASGR-BBMORF | 9 | 90 | 15 | 268 | 109 | 77 | 28 |

*data combined from 2 heads collected on different days for analysis

TABLE 5

Visual determination of parthenogenesis in cleared ovaries 2 days after anthesis in offspring from g3f.

| Offspring Designation: | Genotype-ORF amplicon: | Number of identified developing embryos with polar nuclei in structurally mature sexual embryo sacs | Number of identified developing embryos without distinct polar nuclei but also without endosperm development | Number of structurally mature sexual embryo sacs without embryo development | Number of ovaries with no structurally mature sexual embryo sacs | Percentage of structurally mature sexual embryo sacs | Percentage of parthenogenesis in structurally mature sexual embryo sacs |
|---|---|---|---|---|---|---|---|
| 111 | – | 0 | 0 | 34 | 15 | 69 | 0 |
| 112 | – | 0 | 0 | 37 | 12 | 76 | 0 |
| 113 | – | 0 | 0 | 37 | 18 | 67 | 0 |
| 114 | – | 0 | 0 | 29 | 17 | 63 | 0 |
| 115 | – | 0 | 0 | 30 | 21 | 59 | 0 |
| 116 | – | 0 | 0 | 42 | 5 | 89 | 0 |
| 119 | – | 0 | 0 | 39 | 10 | 80 | 0 |
| 120 | – | 0 | 0 | 38 | 16 | 70 | 0 |
| 124 | – | 0 | 0 | 42 | 6 | 88 | 0 |
| 126 | – | 0 | 0 | 36 | 11 | 77 | 0 |
| 128 | – | 0 | 0 | 30 | 17 | 64 | 0 |
| 129 | – | 0 | 0 | 29 | 12 | 71 | 0 |
| 130 | – | 0 | 0 | 29 | 17 | 63 | 0 |
| 132 | – | 0 | 0 | 27 | 20 | 57 | 0 |
| 133 | – | 0 | 0 | 28 | 21 | 57 | 0 |
| 137 | – | 0 | 0 | 43 | 8 | 84 | 0 |
| 138 | – | 0 | 0 | 42 | 10 | 81 | 0 |
| 140 | – | 0 | 0 | 33 | 14 | 70 | 0 |
| 145 | – | 0 | 0 | 48 | 19 | 72 | 0 |
| 151 | – | 0 | 0 | 33 | 11 | 75 | 0 |

TABLE 5-continued

Visual determination of parthenogenesis in cleared ovaries 2 days after anthesis in offspring from g3f.

| Offspring Designation: | Genotype-ORF amplicon: | Number of identified developing embryos with polar nuclei in structurally mature sexual embryo sacs | Number of identified developing embryos without distinct polar nuclei but also without endosperm development | Number of structurally mature sexual embryo sacs without embryo development | Number of ovaries with no structurally mature sexual embryo sacs | Percentage of structurally mature sexual embryo sacs | Percentage of parthenogenesis in structurally mature sexual embryo sacs |
|---|---|---|---|---|---|---|---|
| 153 | − | 0 | 0 | 32 | 18 | 64 | 0 |
| 154 | − | 0 | 0 | 27 | 15 | 64 | 0 |
| 161 | − | 0 | 0 | 30 | 16 | 65 | 0 |
| 163 | − | 0 | 0 | 25 | 17 | 60 | 0 |
| 167 | − | 0 | 0 | 27 | 18 | 60 | 0 |
| 168 | − | 0 | 0 | 25 | 17 | 60 | 0 |
| 178 | − | 0 | 0 | 38 | 6 | 86 | 0 |
| 188 | − | 0 | 0 | 41 | 5 | 89 | 0 |
| Total numbers analyzed without the gPsASGR-BBMORF | 28 | 0 | 0 | 951 | 392 | 71 | 0 |
| 100† | + | 5 | 2 | 28 | 22 | 61 | 20 |
| 101† | + | 5 | 4 | 8 | 24 | 41 | 53 |
| 104 | + | 16 | 0 | 22 | 15 | 72 | 42 |
| 105*† | + | 20 | 0 | 30 | 23 | 68 | 40 |
| 106† | + | 6 | 1 | 16 | 23 | 50 | 30 |
| 108 | + | 6 | 0 | 28 | 12 | 74 | 18 |
| 117 | + | 4 | 0 | 29 | 18 | 65 | 12 |
| 122 | + | 9 | 2 | 26 | 13 | 74 | 30 |
| 131 | + | 8 | 0 | 20 | 16 | 64 | 29 |
| 142 | + | 5 | 0 | 23 | 29 | 49 | 18 |
| 146 | + | 11 | 2 | 18 | 14 | 69 | 42 |
| 147 | + | 8 | 2 | 21 | 17 | 65 | 32 |
| 152 | + | 6 | 3 | 27 | 14 | 72 | 25 |
| 158* | + | 1 | 0 | 84 | 67 | 56 | 1 |
| 160 | + | 7 | 0 | 24 | 16 | 66 | 23 |
| 189 | + | 3 | 0 | 31 | 15 | 69 | 9 |
| 196 | + | 7 | 2 | 23 | 14 | 70 | 28 |
| 197 | + | 9 | 7 | 15 | 21 | 60 | 52 |
| 208* | + | 5 | 1 | 74 | 23 | 78 | 8 |
| 123*, 0 | + | 0 | 0 | 79 | 30 | 72 | 0 |
| 144*, 0 | + | 0 | 0 | 118 | 29 | 80 | 0 |
| 159*, 0 | + | 0 | 0 | 82 | 53 | 61 | 0 |
| 183*, 0 | + | 0 | 0 | 77 | 22 | 78 | 0 |
| 102 | + | N/A | N/A | N/A | N/A | N/A | N/A |
| 103 | + | N/A | N/A | N/A | N/A | N/A | N/A |
| 191 | + | N/A | N/A | N/A | N/A | N/A | N/A |
| Total numbers analyzed with the gPsASGR-BBMORF | 26 | 122 | 26 | 903 | 530 | 66 | 14 |

N/A = plant did not flower or ovaries collected did not contain >15 structurally mature sexual embryo sacs out of ~50 processed.

*data combined from two independently collected heads.

0plants with the gASGR-BBM transgene not showing expected parthenogenesis.

†plants with 2x ploidy level.

TABLE 6

Ploidy level of g3f offspring with green pigmentation of the midrib determined either by flow cytometry or chromosomal counts from root tips.

| Offspring designation | Ploidy level | Transgene | Offspring designation | Ploidy level | Transgene |
|---|---|---|---|---|---|
| 100 | 2x | + | 115 | 4x* | − |
| 101 | 2x | + | 118 | 4x* | − |
| 102 | 2x | + | 127 | 4x | − |
| 103 | 2x | + | 128 | 4x* | − |

TABLE 6-continued

Ploidy level of g3f offspring with green pigmentation of the midrib determined either by flow cytometry or chromosomal counts from root tips.

| Offspring designation | Ploidy level | Transgene | Offspring designation | Ploidy level | Transgene |
|---|---|---|---|---|---|
| 105 | 2x | + | 133 | 4x* | − |
| 106 | 2x | + | 139 | 4x* | − |
| 108 | 4x | + | 140 | 4x* | − |
| 117 | 4x* | + | 143 | 4x* | − |

TABLE 6-continued

Ploidy level of g3f offspring with green pigmentation of the midrib determined either by flow cytometry or chromosomal counts from root tips.

| Offspring designation | Ploidy level | Transgene | Offspring designation | Ploidy level | Transgene |
|---|---|---|---|---|---|
| 122 | 4x* | + | 145 | 4x* | – |
| 142 | 4x* | + | 151 | N/A | – |
| 146 | 4x* | + | 153 | 4x | – |
| 147 | 4x* | + | 154 | 4x | – |
| 158 | 4x* | + | 161 | 4x | – |
| 159 | 4x | + | 167 | 4x | – |
| 160 | 4x | + | 178 | 4x | – |
| 183 | 4x* | + | 193 | 4x | – |
| 191 | 4x* | + | 198 | 4x* | – |
| 196 | 4x* | + | 201 | 4x* | – |
| 197 | 4x* | + | | | |

*Ploidy level determined by chromosomal root-tip counts.

TABLE 7

Analysis of PsASGR-BBML expression and embryo development from selected $F_1$ RNAi plants.

| Plant designation | Plant genotype | % of ovaries containing aposporous embryo sacs | % reduction of PsASGR-BBML at DOP based on control plant on day of anthesis | % of ovules producing parthenogenetic embryos at +2 DOP | % of embryos greater than 16 cells at +2 DOP from ovaries showing parthenogenesis |
|---|---|---|---|---|---|
| S7-6T-10 (control) | ASGR+ RNAi– | 97.1 | 0 | 64.4 | 38 |
| S4-2T-8 | ASGR+ RNAi+ | 96.4 | 59.87 | 24.6 | 5.6 |
| S2-2T-9 | ASGR+ RNAi+ | 96.3 | 88.84 | 23.7 | 0 |
| S5-5T-28 | ASGR+ RNAi+ | 97.0 | 95.90 | 8.5 | 0 |

Example 6 gPsASGR-BBML-Containing Transgenic Rice Lines

Figure 19:
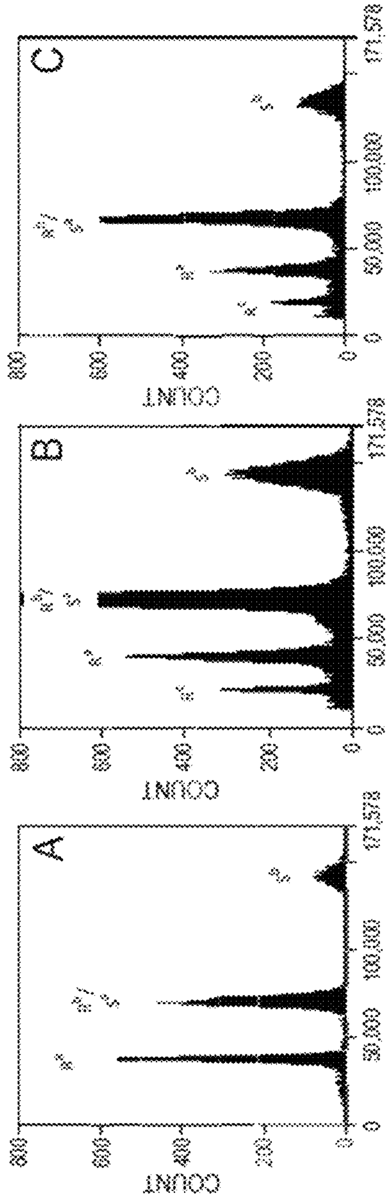
FIG. 19 depicts flow cytometry of dissected embryos, showing the production of haploid offspring in rice transgenic plants carrying the PsASGR-BBM transgene.
Figure 20:
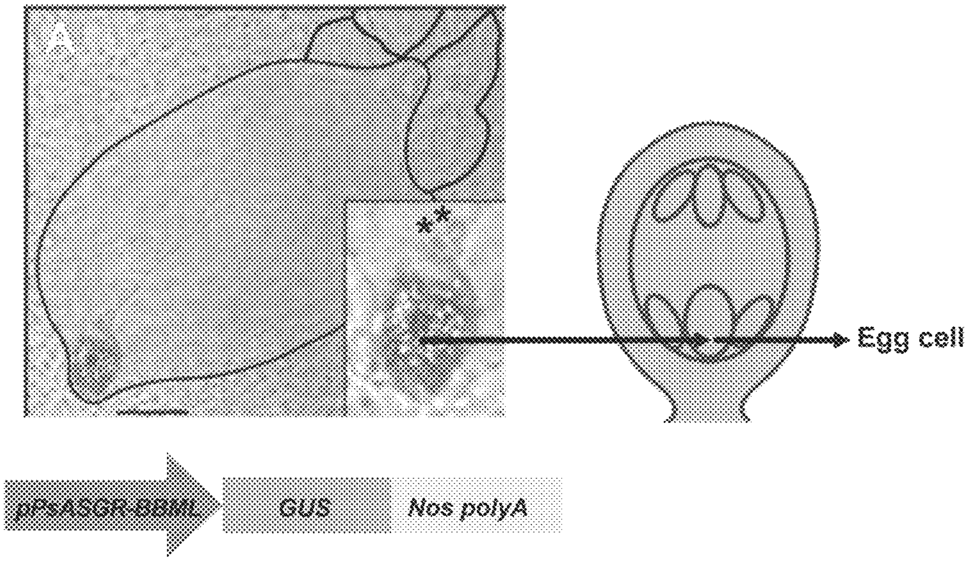
FIG. 20 depicts data showing pearl-millet lines carrying the pPsASGR-BBML-GUS construct showing egg cell expression of GUS.

The genomic PsASGR-BBM construct used in pearl millet transformation, which included A 2074 bp ASGR-BBM promoter (p208) (containing a 6-residue GGATCC BamHI restriction site sequence) upstream of the 3,540 bp coding region (exon:introns) plus 610 bp of the 3'UTR and residing in a blue script plasmid, was transferred using enzymes at the multiple cloning site to pCambial300 for transformation of rice (*Oryza sativa Japonica* cv. Nipponbare). Sixteen different rice lines were found to contain the complete coding region of the PsASGR-BBM construct based on PCR analysis. RNA was isolated from four different lines of developing rice seed, and expression of the PsASGR-BBM transgene was assayed by non-quantitative RT-PCR. All four lines showed PsASGR-BBM transgene expression. Flow cytometry using ~5 dissected developing rice embryos was used to determine whether haploid (In/le) offspring were generated from rice transgenic lines carrying the PsASGR-BBM transgene (FIG. 19). Sorghum was used as a control for samples. Eight lines showed production of haploid offspring based on this analysis.

Example 7

Haploid Induction in Maize and Other Crops

The present invention can be used as an alternative method for haploid induction in maize and other cereals. Specific lines of maize have been identified that, when used as pollinators, result in a low (2-8%) frequency recovery of haploid offspring from seed of the maternal parent (Chang M. and Coe E. H., "Doubled haploids," ppl27-142, in Molecular Genetic Approaches to Maize Improvement, Kritz A. L. and Larkins B, Eds, Springer). These lines are extensively used in commercial maize breeding programs in North America and Europe.

The advantage of haploid induction in breeding is that different gene combinations can be fixed in each line once the chromosome number is doubled from haploid to diploid. This rapid recovery of homozygous inbred lines allows selection of inbred parents that can generate high-yielding, high-quality hybrids. Multiple inducer lines of maize have been identified, and the mechanism of haploid induction reported for at least one of them is chromosome elimination (Zhang Z. et al., *Plant Cell Reports* 27:1851-1860 (2008)). Chromosome elimination post-fertilization is more likely to result in male contribution to haploid offspring than the invention described herein, where fertilization of the egg is avoided.

Haploid induction using the present invention can be of use in crops other than maize where inducer lines are not known. Any heterozygous individual will generate unique gene combinations in each egg if eggs are being formed from meiotically-derived products and are haploid. Each unique haploid individual will become homozygous and fertile once chromosomes are artificially doubled by chemical treatment. Homozygous lines can be more quickly generated by the method described herein for testing in the field.

Example 8

Expression of ASGR-BBML to Induce Egg Division in Absence of Fertilization

A further use of this invention is as a component of apomixis. Both apomeiosis and parthenogenesis are required for functional gametophytic apomixis. Apomeiosis can be achieved by a combination of mutations affecting meiosis (Crismani W. et al., *J. Exp. Bot.* 64:55-65 (2013)), with the outcome of chromosomal non-reduction in megaspores, i.e., mitosis rather than meiosis. Somatic cells that assume a gametophytic fate through epigenetic alterations (Grimanelli D., *Curr. Opin. Plant Biol.* 15:57-62 (2012)) also result in unreduced spore-like cells that potentially can give rise to unreduced gametes (eggs). By whatever means unreduced eggs are formed, proper temporal and spatial expression of ASGR-BBML can induce the egg cells to behave as zygotes and divide in the absence of fertilization. The division of an unreduced egg to form the embryo component of a seed satisfies the conditions for apomixis provided that the endosperm of the seed can also complete development to yield a viable propagule.

Example 9

Use of Apomixis for Efficient Seed Production

Apomixis results in genetic identity of the offspring of a mother plant. The mother plant can be highly heterozygous, but since apomixis bypasses meiosis, there is no segregation of traits among seed-derived progeny. Apomixis can be used for more efficient hybrid seed production in hybrid crops, such as maize and the like, eliminating the need to use separate male and female parents grown in isolation to generate hybrid seed. Apomixis can also be used for seed propagation of heterozygous crops, such as potato and the like, that typically are vegetatively propagated through tubers, organs that can harbor and transmit diseases across generations. Apomixis can also promote the development of hybrids in crops where hybrids currently are not available due to the lack of parental lines that can be easily crossed on a commercial scale. Apomixis can be used as a breeding tool to increase and test large numbers of novel hybrids generated by sexual reproduction but increased through apomictic reproduction. The present invention, egg development into an embryo without fertilization, is an essential component of apomixis or clonal reproduction through seeds.

Example 10

Materials and Methods

Figure 21:
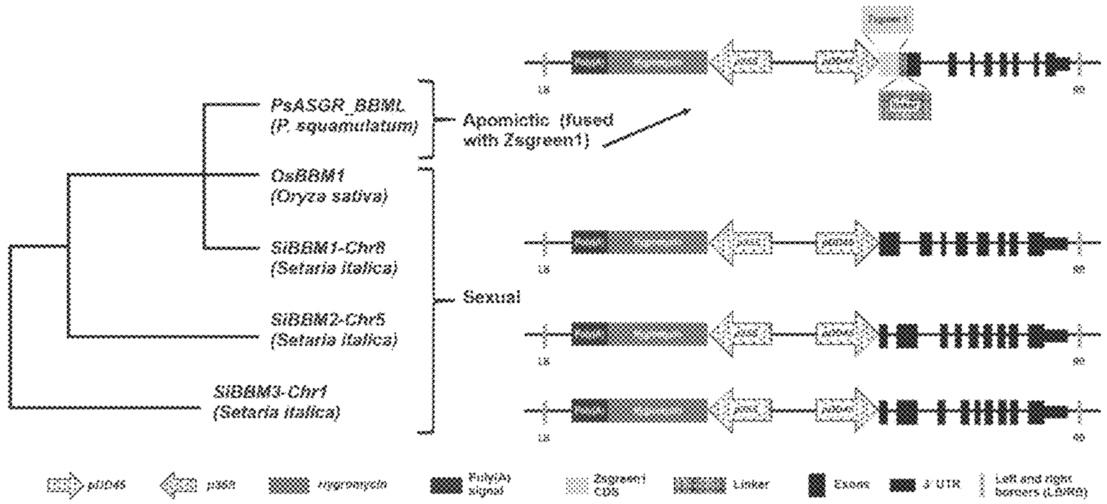
FIG. 21 is a schematic of the phylogenetic relationship between BBML polypeptides used in this study (red and blue) and the BBML polypeptides that have already been shown to induce parthenogenesis (blue). Schematic was developed from a phylogenetic tree constructed using the ‘Maximum likelihood method in Mega7’. Apomictic and sexual represent the mode of reproduction for the species from which the gene was identified. Corresponding to the genes are the transgene cassettes used for this study (not to scale).

Transgene cassettes shown in FIG. 21, incorporated in pCambia1300 transformation binary vector, were used to develop transgenic rice lines (Nipponbare background) at Cornell and Iowa State transformation facilities.

Transgene specific primers were used to screen transgene carrying plantlets. Pre-anthesis ovaries were collected and RNA extracted using Qiagen RNeasy plant mini kit and cDNA synthesis was done using Superscript III first-strand synthesis system. RT-PCR was performed to check the expression.

Induction of parthenogenesis was checked by doing flow cytometry on embryos dissected from the mature seeds, through germination of T1 seed and flow cytometry on germinated seedlings to determine ploidy and through phase contrast microscopy on fixed and cleared pre-anthesis ovaries.

Results

Figure 22:
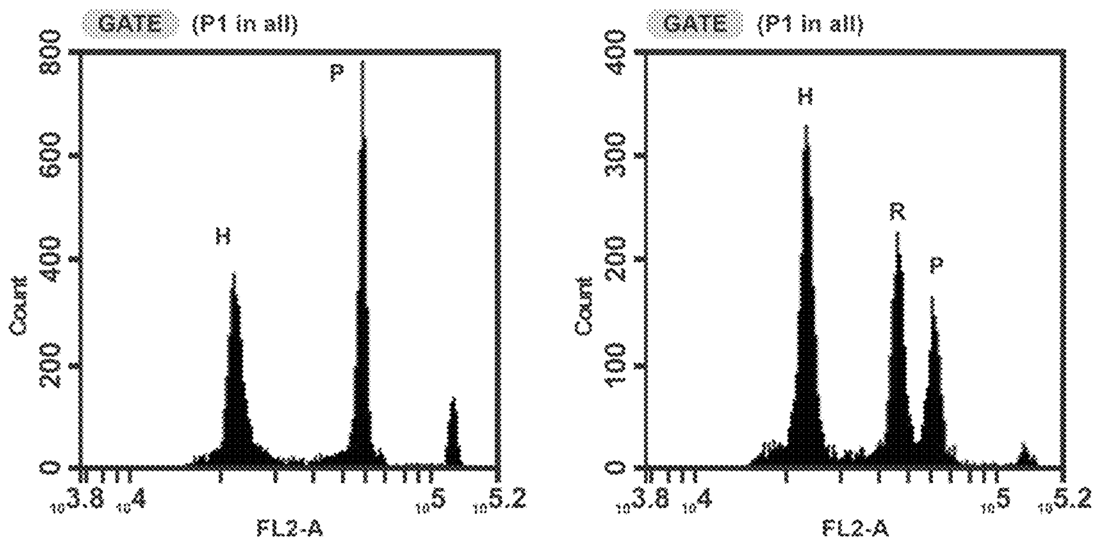
FIG. 22 Haploid signal from a single seed from the pDD45::PsASGR-BBML-ZsGreen1-1A line (Left). Both a diploid and haploid signal were identified from a single seed from the pDD45::PsASGR-BBML-ZsGreen1-8A line (Right). Double peaks can be due to replication status of the seed at time of analysis or the potential of two embryos within one seed. Peak designations: P, *Paspalum notatum* (genome standard); R: Rice wild type (diploid); H: Rice Haploid.
Figure 23:
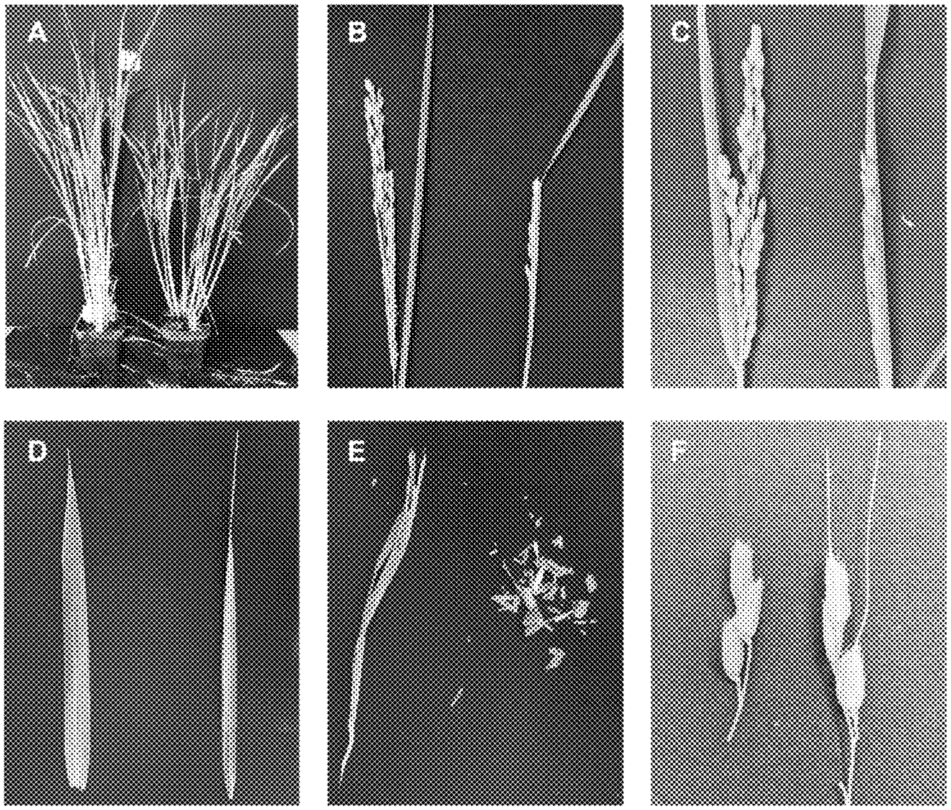
FIG. 23 depicts developmental abnormalities in SiBBM3 transgenic plants (right plant in each picture) as compared to wild type (left plant in each picture).
Figure 24:
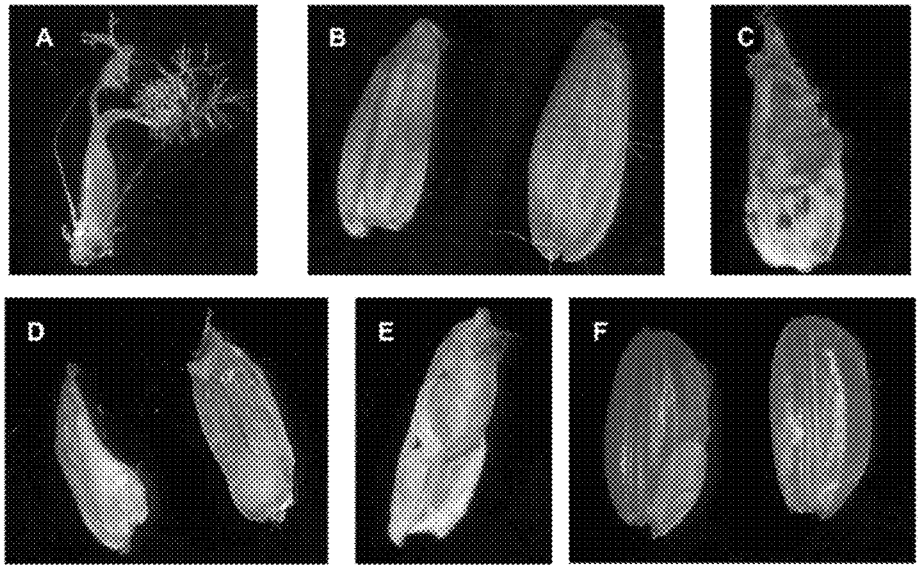
FIG. 24 depicts Ovaries 28-30 DAP in pDD45::PsASGR-BBML-ZsGreen1_9A_1_T1 plant.

All transgenes showed expression in rice ovaries before anthesis.

pDD45:: PsASGR-BBML-ZsGreen1 lines show parthenogenetic embryo development as indicated by the haploid signal in flow cytometry plots (FIG. 22).

pDD45::SiBBBM3 lines showed developmental abnormalities pertaining to vegetative as well as reproductive development (FIG. 23).

pDD45::SiBBM1 and pDD45:: PsASGR-BBML-ZsGreen1 lines showed that both transgenes interfere with the normal embryo and/or seed development causing the lower seed set in transgenic lines (0-86%) compared to untransformed lines (85.6%).

In pDD45:: PsASGR-BBML-ZsGreen1 and pDD45:: SiBBM3, transgene expression was observed in young leaf tissues and in tissue containing shoot meristems.

All transgenes (Seita.8G107100 (SiBBM1), Sieta.5G415800 (SiBBM2), Seita.1G232200 (SiBBM3) and PsASGR-BBML-Zsgreen1 driven by pDD45) induced parthenogenesis.

The various methods and techniques described above provide a number of ways to carry out the application. Of course, it is to be understood that not necessarily all objectives or advantages described are achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by including one, another, or several other features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, any numbers expressing quantities of ingredients, properties such as molecular weight, reaction conditions, and so forth, used to describe and claim certain embodiments of the disclosure are to be understood as being modified in some instances by the term "about." Accordingly, in some embodiments, the numerical parameters set forth in the written description and any included claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are usually reported as precisely as practicable.

In some embodiments, the terms "a" and "an" and "the" and similar references used in the context of describing a particular embodiment of the application (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Variations on preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A method of propagating one or more gametophytic cells in an ovule of a plant in the absence of egg cell fertilization, the method comprising:

transforming a plant with an BBML gene construct comprising a nucleic acid encoding a polypeptide having at least 40% sequence similarity to the polypeptide of SEQ ID NO: 4 or SEQ ID NO: 43, wherein the nucleic acid is operably-linked to a promoter effective within an egg cell;

growing and selecting a progeny plant from the one or more gametophytic cells, wherein the progeny plant contains one or more sets of chromosomes from the transformed plant, wherein propagation of the plant occurs in the absence of egg cell fertilization.

2. The method of claim 1, wherein the BBML gene construct further comprises one or more untranslated region (UTR).

3. The method of claim 2, wherein the BBML gene construct further comprising one or more UTR has at least 70% sequence identity to SEQ ID NO: 1 or a fully complementary strand thereof.

4. The method of claim 1, wherein the promoter comprises a nucleotide having at least 70% sequence identity to SEQ ID NO: 5 or a fully complementary strand thereof.

5. The method of claim 2 wherein the ASGR-BBML gene construct has at least 70% sequence identity to SEQ ID NO: 3 or a fully complementary strand thereof.

6. The method of claim 1, wherein an embryo is formed from an unreduced egg.

7. The method of claim 1 in which a polyploid plant is transformed to produce a diploid or dihaploid progeny plant.

8. The method of claim 1, in which a diploid plant is transformed to produce a haploid progeny plant.

9. The method of claim 8, in which the haploid progeny plant is treated to achieve chromosome doubling and production of a homozygous plant.

10. The method of claim 1, wherein the progeny plant is obtained via culturing.

11. The method of claim 1, wherein the plant is a monocot.

12. The method of claim 1, wherein the plant is a dicot.

13. The method of claim 1, wherein the plant comprises a grass or a leguminous plant.

14. The method of claim 13, wherein the grass is a species of millet, rice, maize, wheat, sorghum, or switchgrass.

15. The method of claim 1, wherein the plant is heterozygous and is transformed to produce a clonal offspring.

16. The method of claim 1, wherein the plant is heterozygous and is transformed to produce a haploid offspring.

17. The method of claim 1, wherein the method is used to propagate one or more heritable traits in the plant.

18. A plant or plant part produced by the method of claim 1.

19. A method of producing a plant capable of being reproduced in the absence of egg cell fertilization, the method comprising:

transforming a plant with an BBML gene construct encoding a polypeptide having at least 40% sequence similarity to the polypeptide of SEQ ID NO: 4, thereby producing a plant capable of being reproduced in the absence of egg cell fertilization.

* * * * *

SEQUENCE LISTING

```
Sequence total quantity: 69
SEQ ID NO: 1            moltype = DNA  length = 1968
FEATURE                 Location/Qualifiers
source                  1..1968
                        mol_type = genomic DNA
                        organism = Pennisetum squamulatum
SEQUENCE: 1
tctctctctc ttctctctct ccatttctct tccctaggat cagtgctagt gcttgcagcg  60
gccgcgttcc gagatgggtt ccaccaacaa ctggctgcgc ttcgcctcgt tctccggcgg  120
cggcggcgcc aaggatgccg cggccctgct cccgctgccg ccctcgcccc gtggcgatgt  180
cgacgaggcc ggcgcagagc cgaagctcga ggacttcctc ggcctgcagg agccgagcgc  240
cgccgcggtg ggggctgggc ggccattcgc ggtgggtggc ggtgcgagct ccatcgggct  300
gtccatgatc aggaactggc tgcgcagcca gccggcgccg gccgggcctg ctgcgggggt  360
cgattcgatg gtgctggcgg ctgcggcggc gtcgacggag gtggccggcg atggcgcgga  420
gggcggcggc gccgtggctg acgcggtgca gcagaggaag gcggcggcgg tggacacttt  480
cgggcagcgg acctccatat accgcggcgt cacaaagcat agatggacag gaaggtatga  540
agcccatctt tgggacaata gctgcagaag agaaggtcaa actcggaaag gtagacaagt  600
gtatcttggt ggatatgata aagaagaaaa agcagctaga gcttatgatt tagctgctct  660
caagtaccgg ggcaccacaa ctactacaaa ttttccgatg agcaactatg aaaaggagtt  720
agaagagatg aagcatatgt cacgacaaga atatgttgca tcccttagaa ggaaaagcag  780
tggtttttct cgtggtgcat caatttaccg aggggttacc aggcaccatc agcatggaag  840
gtggcaagca agaataggaa gtgtggcagg aaacaaggat ctttatttgg gcacattcag  900
tacccaggag gaagctgcag aggcttacga cattgctgcc atcaaattcc gaggcctcaa  960
tgctgtcacg aactttgaca tgagccggta tgacgtcaag agcatcattg agagcagctc  1020
cctgcctgtt ggcggcactc caaagcgtct caaggaagtg cctgatcaat cagatatggg  1080
catcaacata aacggtgact ctgctggtca tatgactgct atcaaccttc ttactgatgg  1140
caatgacagc tatggagctg agagttatgg ttacagtggt tggtgtccca cagccatgac  1200
gccaatcccc tttcaattca gcaatggcca tgaccattcc aggctgtggt gcaagccaga  1260
gcaggacaat gcggttgttg cagcactgca taacctgcat cacctccagc acttgccagc  1320
cccagttggc acccataatt ttttccagcc atcgcctgtt caggacatga caggtgttgc  1380
cgatgcttca tcgccaccag tagaatctaa ttcattcctg tacaatgggg acgttggtta  1440
ccatggtgcc atgggtggca gctatgccat gccggttgcc acactagttg agggcaactc  1500
tgcgggcagt ggctatggag ttgaggaagg cacagggtct gaaatctttg gtggacggaa  1560
cttgtattct ctctcccaag gttcctcagg cgccaatact ggaaaggcag atgcttatga  1620
aagctgggat ccatctatgc tggtgatatc acagaagtct gccaatgtga ctgtctgcca  1680
tggcgcacct gtattttcag tttggaaatg atggttagat gaaaatatag tagtgatatt  1740
aactagttct tggaggggaa gattaaattc taggtataca aaagtttaat ttattagtgc  1800
ttcaagatct cgtatgaaaa aaagttttgc tgcttaatca gctccagtgg gagtctagga  1860
gccatgagaa atgtcgtttt attattgact aatgctacaa tgctaacatg ctgactcttt  1920
tgaatggcac aagagctctg gtgtttcaat acatcagcca gtttcatt              1968

SEQ ID NO: 2            moltype = DNA  length = 1638
FEATURE                 Location/Qualifiers
source                  1..1638
                        mol_type = genomic DNA
                        organism = Pennisetum squamulatum
SEQUENCE: 2
atgggttcca ccaacaactg gctgcgcttc gcctcgttct ccggcggcgg cggcgccaag  60
gatgccgcgg ccctgctccc gctgccgccc tcgccccgtg gcgatgtcga cgaggccggc  120
```

```
gcagagccga agctcgagga cttcctcggc ctgcaggagc cgagcgccgc cgcggtgggg  180
gctgggcggc cattcgcggt gggtggcggt gcgagctcca tcgggctgtc catgatcagg  240
aactggctgc gcagccagcc ggcgccggcc gggcctgctg cgggggtcga ttcgatggtg  300
ctggcggctg cggcggcgtc gacggaggtg gccggcgatg gcgcggaggg cggcggcgcc  360
gtggctgacg cggtgcagca gaggaaggcg gcggcggtgg acactttcgg gcagcggacc  420
tccatatacc gcggcgtcac aaagcataga tggacaggaa ggtatgaagc ccatctttgg  480
gacaatagct gcagaagaga aggtcaaact cggaaaggta gacaagtgta tcttggtgga  540
tatgataaag aagaaaaagc agctagagct tatgatttag ctgctctcaa gtaccggggc  600
accacaacta ctacaaattt tccgatgagc aactatgaaa aggagttaga agagatgaag  660
catatgtcac gacaagaata tgttgcatcc cttagaagga aaagcagtgg tttttctcgt  720
ggtgcatcaa tttaccgagg ggttaccagg caccatcagc atggaaggtg gcaagcaaga  780
ataggaagtg tggcaggaaa caaggatctt tatttgggca cattcagtac ccaggaggaa  840
gctgcagagg cttacgacat tgctgccatc aaattccgag gcctcaatgc tgtcacgaac  900
tttgacatga gccggtatga cgtcaagagc atcattgaga gcagctccct gcctgttggc  960
ggcactccaa agcgtctcaa ggaagtgcct gatcaatcag atatgggcat caacataaac  1020
ggtgactctg ctggtcatat gactgctatc aaccttctta ctgatggcaa tgacagctat  1080
ggagctgaga gttatggtta cagtggttgg tgtcccacag ccatgacgcc aatccccttt  1140
caattcagca atggccatga ccattccagg ctgtggtgca agccagagca ggacaatgcg  1200
gttgttgcag cactgcataa cctgcatcac ctccagcact tgccagcccc agttggcacc  1260
cataattttt tccagccatc gcctgttcag gacatgacag gtgttgccga tgcttcatcg  1320
ccaccagtag aatctaattc attcctgtac aatggggacg ttggttacca tggtgccatg  1380
ggtggcagct atgccatgcc ggttgccaca ctagttgagg gcaactctgc gggcagtggc  1440
tatggagttg aggaaggcac agggtctgaa atctttggtg gacggaactt gtattctctc  1500
tcccaaggtt cctcaggcgc caatactgga aaggcagatg cttatgaaag ctgggatcca  1560
tctatgctgg tgatatcaca gaagtctgcc aatgtgactg tctgccatgg cgcacctgta  1620
ttttcagttt ggaaatga                                                1638

SEQ ID NO: 3           moltype = DNA  length = 6210
FEATURE                Location/Qualifiers
source                 1..6210
                       mol_type = genomic DNA
                       organism = Pennisetum squamulatum
SEQUENCE: 3
ggatccagcc atgtctaaac gatcaacaga tgactgccta atataaggtt tttgggttgt  60
tgaataatta ggcaatatcc atattagatt ccgaaagcag taaaacatga caatgatagt  120
aactagtatg cacgcataag acatactaga cgatagtaac aacataacca tgaactcagt  180
aaacatgact aaagattgga tcttagatcc gtacctggcg ctcagagttg caagcactgc  240
ggagggcgtc gatacttcgg ggaagacaag cggcgcagac gaagcgacga cggtgttccg  300
gacggcacgt agcagccgac attgaaggca atgcgccctc tcgtcaggag acttgctagg  360
aagacgagcc acgatgacga cgattgagca gtcacgcgga gcacttccca aaaaccttat  420
tcgccctctc ccggtgcagg atcgcaagga cggacggttc cggagacctg ctctcccaat  480
cacctgtgca cgcaggtgtt cgggatggag tagatggcgg cggcggcggc gcagcagcga  540
gcgagagagg caaagtccta actcagatca gatctatttt agggataccc tttcatgggg  600
cctttccgta gatagtctat tgtgcatctc ttctgtgagg gggtggtcca tttttatatg  660
gagggaaacc tccaacaccc tcgtctatta gcaatatgag actaatagat ggtgtacccc  720
ctcatcacgc taatgggcct ttgagattta ttcaggaatt attggattgg ctaatgggcc  780
aagcccaaaa ttccaacaca atcaagtttg cctcgcatat ctcgattctc gaaccaacct  840
ccgagccata tctgattgta gacaagtaaa caaactcgga ggcggaaggg ggaactgacc  900
cgttgaacgc cgtcactgcc ggaaccgacg tcgccgtcac tgaagaagaa ggaagatgct  960
tccgaaccac ccaatacaaa acctcactaa ttcctcgctg acgccagagc agacgccgac  1020
gaaacgggaa aggagtcaaa ataccttatt ccatcgccac cacatcattt gggcgctgct  1080
cgctgatacg ccggcgggag cggtggcagc caggtgtacg cccccgcgga ctgcgcgccg  1140
gctggccggc cggccaccgg ggccggggcc cttcaatctc ttagggcgtc cccaacaagg  1200
ctgattcagc tagctatttg agtgtacaca tcagcatgta tcctacatgg aggaaagaga  1260
gtatgcattg aacattgagc cggctatttg ctcgtcgcct atctagcaca tcacccaagg  1320
cagcgctgtg tctatggcct ggcagaaaat attgtttaaa taacaagtag ccagctttag  1380
tagatagtac tttctcttgc tggctttttt tttttttgat aacagctctt gctggctttt  1440
agcgtgccgg ctccgagcta ctccctctgt cccagaattt gagtcgccgg ccaacagtga  1500
aatgagagag gggcacggag tcccaacgac agtaatattg ggacagggag tagcagctat  1560
ccaggactgc tgtagacgcc cttagtcctc gactcctcgc agcctttcgc cgttgaaaga  1620
atcacaccgc cccctgcagt tacgtgttaa cccaacccgg gccattggtc agtccctaac  1680
ccgggcggtt gaccgctaga aattagaatt aacccttggt taacaccggt caaagcgcac  1740
atatgcggtg caatctaatc gaagtggccg cgtcataatt acacacgccc gctcctatac  1800
gtgtgccccg ttcatacgca tgctcacctc gcgcgttccc atgaggtttc acaccccttg  1860
tgggaatcca aggcgtcaga gatttattga tcccatttcc ctagcctgcc tcgcctctct  1920
atctacttgt gtggagatta gagcacagca gcgagaaagg gcttgcagtc tataaaggcg  1980
acaagagccc acaccctcct ctctctctct cttctctctc tccatttctc ttccctagga  2040
tcagtgctag tgcttgcagc ggccgcgttc cgagatgggt tccaccaaca actggctgcg  2100
cttcgcctcg ttctccggcg gcggcggcgc caaggatgcc gcggccctgc tcccgctgcc  2160
gccctcgccc cgtggcgatg tcgacgaggc cggcgcagag ccgaagctcg aggacttcct  2220
cggcctgcag gagccgagcg ccgccgcggt gggggctggg cggccattcg cggtgggtgg  2280
cggtgcgagc tccatcgggc tgtccatgat caggaactgg ctgcgcagcc agccggcgcc  2340
ggccgggcct gctgcggggg tcgattcgat ggtgctggcg gctgcggcgg cgtcgacgga  2400
ggtggccggc gatggcgcgg agggcggcgg cgccgtggct gacgcggtgc agcagaggaa  2460
ggcggcggcg gtggacactt tcgggcagcg gacctccata taccgcggcg tcacaaagta  2520
ggttcttgat tttattttgg ttttggaaaa attcttcttt gtttttttctg ttttcttccg  2580
actggtatat cttgtgttaa gaactttttc attagatgca tgtcatactg ttgctttttc  2640
ttgttgcttt gaacctttttg gcgtttgcag cttcgtttgg atatacagaa cctatattat  2700
ccccttttagt aaccagtaga ttctttttttt ttcttttttt ttttttgctt tcgatgttgt  2760
```

```
tagtgttctt gcatcacgca tgtttttcct ctgatatttt aatggacgat atcatctcta  2820
gttcaagttt ttgctcttgc tcttgttgta gtggtgctaa gatttttaaa aaaaaaaatt  2880
atgagcagtt cttgtgctgt ttgaaaatgt aagcatctca cagttctaaa atatatatat  2940
atatatatat ataagtctct catgttgatt tgtggatgta ctgaagcccc gcgcgcacac  3000
atgcacacac cgcacgctca cacgccctaa atccccggtg caacaccagg gttgtccccg  3060
atggggatcg aaccctggcg ggtggcctaa ccaccgtcag ctcccaccac cgagctatca  3120
gctcgtttgc ccatatttcg tgtggtacct cgatattttt atatttctag attgctgtat  3180
ctatcttcta gacttatata agtgttgcgc cactcatact ttttaccgcc tgtaatcgag  3240
tagaactgct tcctcttttg attatattgt atcagttaaa tgatcttgtt gttgatgtgt  3300
ttaccacttt accatcacca ttgcatgaaa tcacttcaag acatgtattc atgatttggc  3360
tggctaaatt tgctagtggc acatacatgt ggtaaaaaaa tatttttagt ttgtgcttgc  3420
tattcttttc ggtcatccct tcgtgcctgt ttatccagaa cacccaatct gcttcacata  3480
gtttttgaat gctatcatca tatttctttt ttggagatat tgttactaaa agtttggctt  3540
tgtcctcaat aggcatagat ggacaggaag gtatgaagcc catctttggg acaatagctg  3600
cagaagagaa ggtcaaactc ggaaaggtag acaaggtaat gattataata tagatattta  3660
aatttgtaat tataagctgc atcatattat tatttattag atcggcttta aaatttcact  3720
agctaattta gtgtttttct tttcttcatc gatacctgca atcgcttcat tccattgatt  3780
cagtgtatct tggtaagtaa tacttgttta caattgcaaa atggtatatc tcttgttgtt  3840
tctcatgtca agtatattaa atatgtggtt gatgcattga aggtggatat gataaagaag  3900
aaaaagcagc tagagcttat gatttagctg ctctcaagta ccggggcacc acaactacta  3960
caaattttcc ggtattactt attgttaata tgttggttct ccagaattga tattttactt  4020
ctaatatata actgcgtata tgaatgaatg ttgtaagatt ttgcatttta tgttcagatg  4080
agcaactatg aaaaggagtt agaagagatg aagcatatgt cacgacaaga atatgttgca  4140
tcccttagaa ggtacatgtg ttgtcaaaac tttgtacctt catggaaact gaacttatat  4200
atttcacaaa tggattgaca tagaacatat atttgtgata caggaaaagc agtggttttt  4260
ctcgtggtgc atcaatttac cgaggggtta ccaggtacaa aatattcctt ttccttatta  4320
tctctggttt tagttagcaa gtgcattgtt tctatgggaa tttgtgttgc atgtagatgg  4380
gaatttgtgt tgcatgtaga tcataaatag ttgcaactat taatctcatc gttctattgc  4440
tgaatagttg tggtactcct ttaccacagt tgactatgat attctattat attatttttc  4500
ttgcaaagtt gatatttaat tgcttgtcta gctaactttc aagcaatcat gtaaaacagg  4560
caccatcagc atggaaggtg gcaagcaaga ataggaagtg tggcaggaaa caaggatctt  4620
tatttgggca cattcagtaa gtcacatttt aatattttta atgaagcact gatttttttt  4680
tgtcaagcaa aatggaagca agacagaaaa acataaacct actggagcac ctttttcatt  4740
attttgtctc ttgaatataa tagtatgtgg ctgacctctc cctgtgtagg tacccaggag  4800
gaagctgcag aggcttacga cattgctgcc atcaaattcc gaggcctcaa tgctgtcacg  4860
aactttgaca tgagccggta tgacgtcaag agcatcattg agagcagctc cctgcctgtt  4920
ggcggcactc caaagcgtct caaggaagtg cctgatcaat cagatatggg catcaacata  4980
aacggtgact ctgctggtca tatgactgct atcaaccttc ttactgatgg caatgacagc  5040
tatggagctg agagttatgg ttacagtggt tggtgtccca cagccatgac gccaatcccc  5100
tttcaattca gcaatggcca tgaccattcc aggctgtggt gcaagccaga gcaggacaat  5160
gcggttgttg cagcactgca taacctgcat cacctccagc acttgccagc cccagttggc  5220
acccataatt ttttccagcc atcgcctgtt caggacatga caggtgttgc cgatgcttca  5280
tcgccaccag tagaatctaa ttcattcctg tacaatgggg acgttggtta ccatggtgcc  5340
atgggtggca gctatgccat gccggttgcc acactagttg agggcaactc tgcgggcagt  5400
ggctatggag ttgaggaagg cacagggtct gaaatctttg gtggacggaa cttgtattct  5460
ctctcccaag gttcctcagg cgccaatact ggaaaggcag atgcttatga aagctgggat  5520
ccatctatgc tggtgatatc acagaagtct gccaatgtga ctgtctgcca tggcgcacct  5580
gtattttcag tttggaaatg atggttagat gaaaatatag tagtgatatt aactagttct  5640
tggaggggaa gattaaattc taggtataca aaagtttaat ttattagtgc ttcaagatct  5700
cgtatgaaaa aaagttttgc tgcttaatca gctccagtgg gagtctagga gccatgagaa  5760
atgtcgtttt attattgact aatgctacaa tgctaacatg ctgactcttt tgaatggcac  5820
aagagctctg gtgtttcaat acatcagcca gtttcattat tgtccatttg ctgtgcacat  5880
tttctgcgct ggcacctata ataatatgat tctaaactgt gaattagttc agatgtcaac  5940
tgtaagtaac tttattttag ctttcttata tacatctctt tttctttttg agaaacgggc  6000
tttgcccccca gccttcatag gaggctggtg cagcgtaccg ggtccgaacc tgggctggtg  6060
acgtcctcag catgagcgcc caccaccgag ctacacgctc gtctgctctt atatacatct  6120
cttcagtaag ggtaatatgg tacttcacag ttcacagtcc agtcattcca accatggatg  6180
agcaaaatgt gcttgtgcac atggtgggtc                                    6210
```

```
SEQ ID NO: 4           moltype = AA  length = 545
FEATURE                Location/Qualifiers
source                 1..545
                       mol_type = protein
                       organism = Pennisetum squamulatum
SEQUENCE: 4
MGSTNNWLRF ASFSGGGGAK DAAALLPLPP SPRGDVDEAG AEPKLEDFLG LQEPSAAAVG  60
AGRPFAVGGG ASSIGLSMIR NWLRSQPAPA GPAAGVDSMV LAAAAASTEV AGDGAEGGGA  120
VADAVQQRKA AAVDTFGQRT SIYRGVTKHR WTGRYEAHLW DNSCRREGQT RKGRQVYLGG  180
YDKEEKAARA YDLAALKYRG TTTTTNFPMS NYEKELEEMK HMSRQEYVAS LRRKSSGFSR  240
GASIYRGVTR HHQHGRWQAR IGSVAGNKDL YLGTFSTQEE AAEAYDIAAI KFRGLNAVTN  300
FDMSRYDVKS IIESSSLPVG GTPKRLKEVP DQSDMGININ GDSAGHMTAI NLLTDGNDSY  360
GAESYGYSGW CPTAMTPIPF QFSNGHDHSR LWCKPEQDNA VVAALHNLHH LQHLPAPVGT  420
HNFFQPSPVQ DMTGVADASS PPVESNSFLY NGDVGYHGAM GGSYAMPVAT LVEGNSAGSG  480
YGVEEGTGSE IFGGRNLYSL SQGSSGANTG KADAYESWDP SMLVISQKSA NVTVCHGAPV  540
FSVWK                                                             545
```

```
SEQ ID NO: 5           moltype = DNA  length = 2074
FEATURE                Location/Qualifiers
source                 1..2074
```

```
                         mol_type = genomic DNA
                         organism = Pennisetum squamulatum
SEQUENCE: 5
ggatccagcc atgtctaaac gatcaacaga tgactgccta atataaggtt tttgggttgt  60
tgaataatta ggcaatatcc atattagatt ccgaaagcag taaaacatga caatgatagt  120
aactagtatg cacgcataag acatactaga cgatagtaac aacataacca tgaactcagt  180
aaacatgact aaagattgga tcttagatcc gtacctggcg ctcagagttg caagcactgc  240
ggagggcgtc gatacttcgg ggaagacaag cggcgcagac gaagcgacga cggtgttccg  300
gacggcacgt agcagccgac attgaaggca atgcgccctc tcgtcaggag acttgctagg  360
aagacgagcc acgatgacga cgattgagca gtcacgcgga gcacttccca aaaaccttat  420
tcgccctctc ccggtgcagg atcgcaagga cggacggttc cggagacctg ctctcccaat  480
cacctgtgca cgcaggtgtt cgggatggag tagatggcgg cggcggcggc gcagcagcga  540
gcgagagagg caaagtccta actcagatca gatctatttt agggataccc tttcatgggg  600
cctttccgta gatagtctat tgtgcatctc ttctgtgagg gggtggtcca tttttatatg  660
gagggaaacc tccaacaccc tcgtctatta gcaatatgag actaatagat ggtgtacccc  720
ctcatcacgc taatgggcct ttgagattta ttcaggaatt attggattgg ctaatgggcc  780
aagcccaaaa ttccaacaca atcaagtttg cctcgcatat ctcgattctc gaaccaacct  840
ccgagccata tctgattgta gacaagtaaa caaactcgga ggcggaaggg ggaactgacc  900
cgttgaacgc cgtcactgcc ggaaccgacg tcgccgtcac tgaagaagaa ggaagatgct  960
tccgaaccac ccaatacaaa acctcactaa ttcctcgctg acgccagagc agacgccgac  1020
gaaacgggaa aggagtcaaa ataccttatt ccatcgccac cacatcattt gggcgctgct  1080
cgctgatacg ccggcgggag cggtggcagc caggtgtacg cccccgcgga ctgcgcgccg  1140
gctggccggc cggccaccgg ggccggggcc cttcaatctc ttagggcgtc cccaacaagg  1200
ctgattcagc tagctatttg agtgtacaca tcagcatgta tcctacatgg aggaaagaga  1260
gtatgcattg aacattgagc cggctatttg ctcgtcgcct atctagcaca tcacccaagg  1320
cagcgctgtg tctatggcct ggcagaaaat attgtttaaa taacaagtag ccagctttag  1380
tagatagtac tttctcttgc tggctttttt tttttttgat aacagctctt gctggctttt  1440
agcgtgccgg ctccgagcta ctccctctgt cccagaattt gagtcgccgg ccaacagtga  1500
aatgagagag gggcacggag tcccaacgac agtaatattg ggacagggag tagcagctat  1560
ccaggactgc tgtagacgcc cttagtcctc gactcctcgc agcctttcgc cgttgaaaga  1620
atcacaccgc cccctgcagt tacgtgttaa cccaacccgg gccattggtc agtccctaac  1680
ccgggcggtt gaccgctaga aattagaatt aacccttggt taacaccggt caaagcgcac  1740
atatgcggtg caatctaatc gaagtggccg cgtcataatt acacacgccc gctcctatac  1800
gtgtgccccg ttcatacgca tgctcacctc gcgcgttccc atgaggtttc acaccccttg  1860
tgggaatcca aggcgtcaga gatttattga tcccatttcc ctagcctgcc tcgcctctct  1920
atctacttgt gtggagatta gagcacagca gcgagaaagg gcttgcagtc tataaaggcg  1980
acaagagccc acaccctcct ctctctctct cttctctctc tccatttctc ttccctagga  2040
tcagtgctag tgcttgcagc ggccgcgttc cgag                              2074

SEQ ID NO: 6             moltype = DNA  length = 20
FEATURE                  Location/Qualifiers
source                   1..20
                         mol_type = genomic DNA
                         organism = Pennisetum squamulatum
SEQUENCE: 6
cctcagtgca tcagcgaagg                                              20

SEQ ID NO: 7             moltype = DNA  length = 20
FEATURE                  Location/Qualifiers
source                   1..20
                         mol_type = genomic DNA
                         organism = Pennisetum squamulatum
SEQUENCE: 7
tggaacccat ggcggaacgc                                              20

SEQ ID NO: 8             moltype = DNA  length = 37
FEATURE                  Location/Qualifiers
misc_feature             1..37
                         note = synthetic construct
source                   1..37
                         mol_type = other DNA
                         organism = synthetic construct
SEQUENCE: 8
gtactagtgg cgcgcccctc aatgctgtca cgaactt                           37

SEQ ID NO: 9             moltype = DNA  length = 37
FEATURE                  Location/Qualifiers
misc_feature             1..37
                         note = synthetic construct
source                   1..37
                         mol_type = other DNA
                         organism = synthetic construct
SEQUENCE: 9
gtgcgatcgc cctaggcaac acctgtcatg tcctgaa                           37

SEQ ID NO: 10            moltype = DNA  length = 23
FEATURE                  Location/Qualifiers
source                   1..23
                         mol_type = genomic DNA
```

```
                        organism = Pennisetum squamulatum
SEQUENCE: 10
ttccaccaac aactggctgc gct                                              23

SEQ ID NO: 11           moltype = DNA  length = 24
FEATURE                 Location/Qualifiers
source                  1..24
                        mol_type = genomic DNA
                        organism = Pennisetum squamulatum
SEQUENCE: 11
ttctcatggc tcctagactc ccac                                             24

SEQ ID NO: 12           moltype = DNA  length = 21
FEATURE                 Location/Qualifiers
source                  1..21
                        mol_type = genomic DNA
                        organism = Pennisetum squamulatum
SEQUENCE: 12
ccctaggatc agtgctagtg c                                                21

SEQ ID NO: 13           moltype = DNA  length = 23
FEATURE                 Location/Qualifiers
source                  1..23
                        mol_type = genomic DNA
                        organism = Pennisetum squamulatum
SEQUENCE: 13
gggcttcata ccttcctgtc cat                                              23

SEQ ID NO: 14           moltype = DNA  length = 20
FEATURE                 Location/Qualifiers
source                  1..20
                        mol_type = genomic DNA
                        organism = Pennisetum squamulatum
SEQUENCE: 14
gaaacgggaa aggagtcaaa                                                  20

SEQ ID NO: 15           moltype = DNA  length = 20
FEATURE                 Location/Qualifiers
source                  1..20
                        mol_type = genomic DNA
                        organism = Escherichia coli
SEQUENCE: 15
cgctagtgcc ttgtccagtt                                                  20

SEQ ID NO: 16           moltype = DNA  length = 19
FEATURE                 Location/Qualifiers
misc_feature            1..19
                        note = synthetic construct
source                  1..19
                        mol_type = other DNA
                        organism = synthetic construct
SEQUENCE: 16
gccgcgttcc gccatggta                                                   19

SEQ ID NO: 17           moltype = DNA  length = 21
FEATURE                 Location/Qualifiers
source                  1..21
                        mol_type = genomic DNA
                        organism = Agrobacterium tumefaciens
SEQUENCE: 17
tgacaccgcg cgcgataatt t                                                21

SEQ ID NO: 18           moltype = DNA  length = 21
FEATURE                 Location/Qualifiers
source                  1..21
                        mol_type = genomic DNA
                        organism = Pennisetum squamulatum
SEQUENCE: 18
acgatcaaca gatgactgcc t                                                21

SEQ ID NO: 19           moltype = DNA  length = 20
FEATURE                 Location/Qualifiers
source                  1..20
                        mol_type = genomic DNA
                        organism = Pennisetum squamulatum
SEQUENCE: 19
tgatgtggtg gcgatggaat                                                  20

SEQ ID NO: 20           moltype = DNA  length = 26
```

```
FEATURE                Location/Qualifiers
source                 1..26
                       mol_type = genomic DNA
                       organism = Pennisetum squamulatum
SEQUENCE: 20
tggcaagcaa gaataggaag tgtggc                                             26

SEQ ID NO: 21          moltype = DNA  length = 23
FEATURE                Location/Qualifiers
source                 1..23
                       mol_type = genomic DNA
                       organism = Pennisetum squamulatum
SEQUENCE: 21
ggcacattca gtacccagga gga                                                23

SEQ ID NO: 22          moltype = DNA  length = 23
FEATURE                Location/Qualifiers
source                 1..23
                       mol_type = genomic DNA
                       organism = Pennisetum squamulatum
SEQUENCE: 22
ttccttgaga cgctttggag tgc                                                23

SEQ ID NO: 23          moltype = DNA  length = 23
FEATURE                Location/Qualifiers
source                 1..23
                       mol_type = genomic DNA
                       organism = Pennisetum squamulatum
SEQUENCE: 23
gctcttgacg tcataccggc tca                                                23

SEQ ID NO: 24          moltype = DNA  length = 25
FEATURE                Location/Qualifiers
source                 1..25
                       mol_type = genomic DNA
                       organism = Pennisetum squamulatum
SEQUENCE: 24
aagttcgtga cagcattgag gcctc                                              25

SEQ ID NO: 25          moltype = DNA  length = 21
FEATURE                Location/Qualifiers
source                 1..21
                       mol_type = genomic DNA
                       organism = Streptomyces hygroscopicus
SEQUENCE: 25
ccccaatgtc aagcacttcc g                                                  21

SEQ ID NO: 26          moltype = DNA  length = 20
FEATURE                Location/Qualifiers
source                 1..20
                       mol_type = genomic DNA
                       organism = Streptomyces hygroscopicus
SEQUENCE: 26
ccgcgacgtc tgtcgagaag                                                    20

SEQ ID NO: 27          moltype = DNA  length = 21
FEATURE                Location/Qualifiers
source                 1..21
                       mol_type = genomic DNA
                       organism = Pennisetum squamulatum
SEQUENCE: 27
ttcctcaggc gccaatactg g                                                  21

SEQ ID NO: 28          moltype = DNA  length = 24
FEATURE                Location/Qualifiers
source                 1..24
                       mol_type = genomic DNA
                       organism = Pennisetum squamulatum
SEQUENCE: 28
ttctcatggc tcctagactc ccac                                               24

SEQ ID NO: 29          moltype = DNA  length = 25
FEATURE                Location/Qualifiers
source                 1..25
                       mol_type = genomic DNA
                       organism = Streptomyces hygroscopicus
SEQUENCE: 29
catcgtgaca agcacggtca acttc                                              25
```

```
SEQ ID NO: 30          moltype = DNA  length = 24
FEATURE                Location/Qualifiers
source                 1..24
                       mol_type = genomic DNA
                       organism = Streptomyces hygroscopicus
SEQUENCE: 30
atatccgagc gcctcgtgca tgcg                                    24

SEQ ID NO: 31          moltype = DNA  length = 20
FEATURE                Location/Qualifiers
source                 1..20
                       mol_type = genomic DNA
                       organism = Zea mays
SEQUENCE: 31
gttgagtggc cctgtttctc                                         20

SEQ ID NO: 32          moltype = DNA  length = 22
FEATURE                Location/Qualifiers
source                 1..22
                       mol_type = genomic DNA
                       organism = Oryza sativa
SEQUENCE: 32
cattgatcag cctaaccaaa ca                                      22

SEQ ID NO: 33          moltype = DNA  length = 20
FEATURE                Location/Qualifiers
source                 1..20
                       mol_type = genomic DNA
                       organism = Oryza sativa
SEQUENCE: 33
ggcggtaagg atctgagcta                                         20

SEQ ID NO: 34          moltype = DNA  length = 22
FEATURE                Location/Qualifiers
source                 1..22
                       mol_type = genomic DNA
                       organism = Agrobacterium tumefaciens
SEQUENCE: 34
caaattctaa tccccaatcc aa                                      22

SEQ ID NO: 35          moltype = DNA  length = 20
FEATURE                Location/Qualifiers
source                 1..20
                       mol_type = genomic DNA
                       organism = Pennisetum squamulatum
SEQUENCE: 35
aggctgtcga ctgcagctat                                         20

SEQ ID NO: 36          moltype = DNA  length = 26
FEATURE                Location/Qualifiers
source                 1..26
                       mol_type = genomic DNA
                       organism = Pennisetum squamulatum
SEQUENCE: 36
cagaattgtc atcatgtaag aaccac                                  26

SEQ ID NO: 37          moltype = DNA  length = 21
FEATURE                Location/Qualifiers
misc_feature           1..21
                       note = synthetic construct
source                 1..21
                       mol_type = other DNA
                       organism = synthetic construct
SEQUENCE: 37
agtgggtcta gagtcctgct t                                       21

SEQ ID NO: 38          moltype = DNA  length = 20
FEATURE                Location/Qualifiers
source                 1..20
                       mol_type = genomic DNA
                       organism = Agrobacterium tumefaciens
SEQUENCE: 38
ggcggtaagg atctgagcta                                         20

SEQ ID NO: 39          moltype = DNA  length = 20
FEATURE                Location/Qualifiers
source                 1..20
                       mol_type = genomic DNA
                       organism = Pennisetum glaucum
```

```
SEQUENCE: 39
acgaggattt caccaacagc                                              20

SEQ ID NO: 40          moltype = DNA  length = 18
FEATURE                Location/Qualifiers
source                 1..18
                       mol_type = genomic DNA
                       organism = Pennisetum glaucum
SEQUENCE: 40
aacgcataga cgacgcct                                                18

SEQ ID NO: 41          moltype = AA  length = 660
FEATURE                Location/Qualifiers
source                 1..660
                       mol_type = protein
                       organism = Setaria italica
SEQUENCE: 41
MATVNNWLAF SLSPQDLPPS QTDSTLISAT ATDEVSGDVC FNIPQDWSMR GSELSALVAE  60
PKLEDFLGGI NFSEQHHKAN LNVIPSSSNA CYASSGASTG YHQLYHHQSS ALHFADSVMV  120
ASSAGVHDGG ASMLSAAATV NGGAGAASAN GGSIGLSMIK NWLRSQPAPP LPQPRVVAAA  180
EGAQAAQGLS LSMNMAGAQG AGMPLLAGER GRAPESVSTS AQGGAVAARK EDSGSSGGAG  240
ALLAVSTDTG GSGTVAETAA RKTVDTFGQR TSIYRGVTRH RWTGRYEAHL WDNSCRREGQ  300
TRKGRQGGYD KEEKAARAYD LAALKYWGPT TTTNFPVSNY EKELEEMKHM TRQEFVASLR  360
RKSSGFSRGT QEEAAEAYDI AAIKFRGLNA VTNFDMSRYD VKSILDSSAL PIGSAAKRLK  420
EAEAAASAQH AGVVSYDVGR IASHLGDGGA LAAYGTHYHA AAAAWPTIAF QPSAAAAGLY  480
HPYAQPMRGW CKQEQDHAVI AAAHSLHELN HLNLGAGGGA HDFFSAGQAA MHGLGSIDNA  540
SLEHSTGSNS VVYNGVGDSN GGAVGGGYMM PMSAATATTT AMVSHEQVHA RSHQGEHDEA  600
TKQAAQMGYE SYLVNAEAAY GGGRMPSWTP ASAPAAASSN DNMAGVGHGG AQLFSVWNDT  660

SEQ ID NO: 42          moltype = AA  length = 481
FEATURE                Location/Qualifiers
source                 1..481
                       mol_type = protein
                       organism = Panicum virgatum
SEQUENCE: 42
MGSTNNWLGF ASFSGAAAAD DVLPPLPPAR GDEAGAEPKL EDFLGLHEPA AAVAGRPFAG  60
SGGGASSIGL SMIKNWLRSQ PAPGPAGADS TALAAVEAVS TDGSRKVTDS AESVAAVVDT  120
AQQRKAVAAV DTFGQRTSIY RGVTKHRWTG RYEAHLWDNS CRREGQTRKG RQMYLGGYDK  180
EEKAARAYDL AALKYWGTTT TTNFPMSNYE KELEEMKHMS RQEYVASLRR HNISCGIGKA  240
VDFLVVRRFN YRGVTRHHQH GRWQARIGRV AGNKDLYLGT FSTQEEAAEA YDIAAIKFRG  300
LNAVTNFDMS RYDVKSIMES SALPVGGTTK CLRDVPDQFG KGMNSNGADS ASHMTATKLN  360
FLLMALAAVP MRIMVTVAAL TAQGGTHNFF HPSPSVDPNS FLYNGGVGYH AIGGGYPMPV  420
ATLVDGNYVP SGYGVEEASS DIYSGRNLYY LSQASPSDST GKADAYEQQG VGMKAGFHLC  480
P                                                                  481

SEQ ID NO: 43          moltype = AA  length = 674
FEATURE                Location/Qualifiers
source                 1..674
                       mol_type = protein
                       organism = Setaria italica
SEQUENCE: 43
MASANNWLGF SLSGQDNPQA NQDSSPAAAG IDISGATDFY GLPTQQGSDG HLGVPGLRDD  60
HASYGIMEAF NRSQQETQDW NMRGLDYNGG ASELSMLVGS SGGKRAVEDG EPKLEDFLGG  120
NSFVSEQDQS GGYLFSGVPM ASSTNSNSGS NTMELSMIKT WLRNNQVPQP QPPAPHQAAP  180
QPEEMSTDAS ASSFGCSDSL GRNGTVAAGS SQSLALSMST GPQHLPMVVA GGGGGASGAA  240
ASESTSSENK RASGAMDSPS SGAIEAVPRK SIDTFGQRTS IYRGVTRHRW TGRYEAHLWD  300
NSCRREGQSR KGRQGGYDKE DKAARAYDLA ALKYWGTTTT TNFPISNYEK ELEEMKHMTR  360
QEYIAYLRRN SSGFSRGASK YRGVTRHHQH GRWQARIGRV AGNKDLYLGT FSTEEEAAEA  420
YDIAAIKFRG LNAVTNFDMS RYDVKSILES STLPVGGAAR RLKDAVDHVE AGATIWRADM  480
DAGVISQLAD AGMGAYASYG HHGWPTIAFQ QPSPLTVHYP YGQPSRGWCK PEQDAAVAAA  540
AHSLQDLQQL HLGSAAHNFF QASSSSTVYN GGGASAAGYQ GLGGGGGGSF LMPSSTVVAD  600
QGHSSTANQG STCSYGDDQD GKLIGYDAMA AAGGDPYAAA RSGYQFSQGS GSTVSIARAN  660
GYSNNWSSPF NGMG                                                    674

SEQ ID NO: 44          moltype = AA  length = 658
FEATURE                Location/Qualifiers
source                 1..658
                       mol_type = protein
                       organism = Panicum virgatum
SEQUENCE: 44
MATVNNWLAF SLSQQDLPPS QTDSTLISAA ATDEVSGDVC FNIPQDWSMR GSELSALVAE  60
PKLEDFLGGI NFSEQHHKAN LNVIPSSSST CYASSGASTG YHQLYHHPSS ALHFADSVMV  120
ASSAGVHDGG AMLSAATAHG GAGAAGANGG SIGLSMIKNW LRSQPAPPPQ PRVAVPEGAQ  180
AVQGLSLSMN MAGTQGAGMP FLAGDRGRAP ESVSTSAQGG AVAARKEDSG GSGGAGALVV  240
AVSTDTGGSG SGGASAETAA RKTVDTFGQR TSIYRGVTRH RWTGRYEAHL WDNSCRREGQ  300
TRKGRQGGYD KEEKAARAYD LAALKYWGPT TTTNFPVSNY EKELEEMKHM TRQEFVASLR  360
RKSSGFSRGT QEEAAEAYDI AAIKFRGLNA VTNFDMSRYD VKSILDSSAL PIGSAAKRLK  420
EAEAAASAQH HAGVVSYDVG RIASQLGDGG ALAAYGAHYH AAAAAAWPTI AFQPGAAAGG  480
LYHPYAQPLR GWCKQEQDHA VIAAAHSLQE LNHLNLGAGA HDFFSAGQAA MHGLGSIDNS  540
```

```
SLEHSTGSNS VVYNGVGDSN GGGGYMMPMN AAAATTTAMV NHEQVHARAH GDHDEASKQV  600
MGYESYLVNA EAAYGGGRMP SWTTASASPV AAAAASSNDN MAGVGHGGAQ LFSVWNDT    658

SEQ ID NO: 45          moltype = AA  length = 627
FEATURE                Location/Qualifiers
source                 1..627
                       mol_type = protein
                       organism = Brachypodium distachyon
SEQUENCE: 45
MATVNNWLGF SLSPQELPSS AAAAAGDVSG ADVCFNIPQD WGMRGSELSA LVAEPKLEDF  60
LGGISSYSDH HKAARSNNMN INGAAACYAS SGSSGYQLYH DHPNSLQFAD SVMVASSAGG  120
VHNEHGIMAS TTANGAGTNG GIGLSMIKSW LRSQPAPAQQ EQQRAEGLSL SMNMPLLQAA  180
AAETSLSTHR WTGRYEAHLW DNSCRREGQT RKGRQVYLGG YDKEEKAARA YDLAALKYWG  240
PTTTTNFPVD NYEKELEEMK HMTRQEFVAS LRRKSSGFSR GASIYRGVTR HHQHGRWQAR  300
IGRVAGNKDL YLGTFSTQEE AAEAYDIAAI KFRGLNAVTN FDMSRYDVKS ILDSTAALPV  360
GGTKRLRDAA AADQHYQQRA GGVVSYAAPQ LGGVNETALA YGAPYYHHQT SAAAWPTIAF  420
QAAPQASSGH GHMLYHPYGQ PLMRGWCKQE QEQGQGQQEP DHAVIAAAHS LQDLHHLNLG  480
AGAHDFFSQH AHAMHQQQQQ HGGLGSVDNN GAASLEHSTG SNSVVYNGAA AAGDTNNSYM  540
LPPMSAAAAA GFGLRDQQDE GGKMAYENFL LGAATDGYCG PGRMAATWTP VSVSAAQPVA  600
ATSSGSDMAG AVCHGGAQLF SVWNDDS                                     627

SEQ ID NO: 46          moltype = AA  length = 686
FEATURE                Location/Qualifiers
source                 1..686
                       mol_type = protein
                       organism = Brachypodium distachyon
SEQUENCE: 46
MASANNWLGF SLSGQGNSQA PPAAAAIDVS GAGDFYGLQA QSAPDAHLGM PGLRADANYG  60
VMDAFNGGGQ ETQDWAMRGL DYHGGSSELS MLVGSSSGRM TVDDGGAPKL EDFLGGGNSF  120
SDVQDQTGGY LFSGAGATMG SGADQAAAHS VDGRGGGSTI ELSMIKSWLR NDNQAHAQPD  180
QEMSSTDVAS AASYACPGAL GNGNGVGAGA ASARGGQQAG ALALSMSMGS HHAHSQLSVV  240
AAAAGGGGGA AESTSSDNKR VDSPSAGAAD AGQRKSIDTF GQRTSIYRGV TRHRWTGRYE  300
AHLWDNSCRR EGQTRKGKQG GYDKEDKAAR AYDLAALKYW GTTTTTNIPI STYEKEIEEM  360
KHMTRQEYIA YLRRNSSGFS RGASKYRGVT RHHQQGRWQA RIGRVAGNKD LYLGTFTTEE  420
EAAEAYDIAA IKFRGLNAVT NFEMSRYDVK SILEGSTLPV GGAARRLKEA AELAEAGVWR  480
AEDGSIVSHL THADGGIGIG MGGTPYHGWP TSIAFGGHGQ LMHASPAAQA LAVHYPPYGA  540
GWCKPEQDAV IAAAGHGVHD SSQGQGQELH LGTHNFFHPA ARSSYSNGTG GGWYQGVNGN  600
GYLMPQVGTV VDADNVQGHS GSTATTNEEG RLMAAAGYGD GGGGVDPYAA MRRAYELSQG  660
SSSSVSVAKV ADGYSNNWSS PFNGMG                                      686

SEQ ID NO: 47          moltype = AA  length = 579
FEATURE                Location/Qualifiers
source                 1..579
                       mol_type = protein
                       organism = Brassica napus
SEQUENCE: 47
MNNNWLGFSL SPYEQNHHRK DVYSSTTTTV VDVAGEYCYD PTAASDESSA IQTSFPSPFG  60
VVVDAFTRDN NSHSRDWDIN GCACNNIHND EQDGPKLENF LGRTTTIYNT NENVGDGSGS  120
GCYGGGDGGG GSLGLSMIKT WLRNQPVDNV DNQENGNAAK GLSLSMNSST SCDNNNDSNN  180
NVVAQGKTID DSVEATPKKT IESFGQRTSI YRGVTRHRWT GRYEAHLWDN SCKREGQTRK  240
GRQVYLGGYD KEEKAARAYD LAALKYWGTT TTTNFPMSEY EKEVEEMKHM TRQEYVASLR  300
RKSSGFSRGA SIYRGVTRHH QHGRWQARIG RVAGNKDLYL GTFGTQEEAA EAYDIAAIKF  360
RGLTAVTNFD MNRYNVKAIL ESPSLPIGSA AKRLKEANRP VPSMMMISNN VSESENSASG  420
WQNAAVQHHQ GVDLSLLHQH QERYNGYYYN GGNLSSESAR ACFKQEDDQH HFLSNTQSLM  480
TNIDHQSSVS DDSVTVCGNV VGYGGYQGFA APVNCDAYAA SEFDYNARNH YYFAQQQQTQ  540
QSPGGDFPAA MTNNVGSNMY YHGEGGGEVA PTFTVWNDN                        579

SEQ ID NO: 48          moltype = AA  length = 545
FEATURE                Location/Qualifiers
source                 1..545
                       mol_type = protein
                       organism = Cenchrus ciliaris
SEQUENCE: 48
MGSTNNWLRF VSFSGGGGAK DAAALLPLPP SPRGDVDEAG AEPKLEDFLG LQEPSAAAVG  60
AGRPFAVGGG ASSIGLSMIK NWLRSQPAPA GPAAGVDSMV LAAAAASTEV AGDGAEGGGA  120
VADAVQQRKA AAVDTFGQRT SIYRGVTKHR WTGRYEAHLW DNSCRREGQT RKGRQVYLGG  180
YDKEEKAARA YDLAALKYRG TTTTTNFPMS NYEKELEEMK HMSRQEYVAS LRRKSSGFSR  240
GASIYRGVTR HHQHGRWQAR IGSVAGNKDL YLGTFSTQEE AAEAYDIAAI KFRGLNAVTN  300
FDMSRYDVKS IIESSSLPVG GAPKRLKEVP DQSDMGININ GDSAGHMTAI NLLTDGNDSY  360
GAESYGYSGW CPTAMTPIPF QFSIGHDHSR LWCKPEQDNA VVAALHNLHH LQHLPAPVGT  420
HNFFQPSPVQ DMTGVADASS PPVESNSFLY NGDVGYHGAM GGSYAMPVAT LVEGNSAGSG  480
YGVEEGTGSE IFGGRNLYSL SQGSSGANTG KADAYESWDP SMLVISQKSA NVTVCHGAPV  540
FSVWK                                                             545

SEQ ID NO: 49          moltype = AA  length = 584
FEATURE                Location/Qualifiers
source                 1..584
                       mol_type = protein
                       organism = Arabidopsis thaliana
```

```
SEQUENCE: 49
MNSMNNWLGF SLSPHDQNHH RTDVDSSTTR TAVDVAGGYC FDLAAPSDES SAVQTSFLSP  60
FGVTLEAFTR DNNSHSRDWD INGGACNNIN NNEQNGPKLE NFLGRTTTIY NTNETVVDGN 120
GDCGGGDGGG GGSLGLSMIK TWLSNHSVAN ANHQDNGNGA RGLSLSMNSS TSDSNNYNNN 180
DDVVQEKTIV DVVETTPKKT IESFGQRTSI YRGVTRHRWT GRYEAHLWDN SCKREGQTRK 240
GRQVYLGGYD KEEKAARAYD LAALKYWGTT TTTNFPLSEY EKEVEEMKHM TRQEYVASLR 300
RKSSGFSRGA SIYRGVTRHH QHGRWQARIG RVAGNKDLYL GTFGTQEEAA EAYDIAAIKF 360
RGLSAVTNFD MNRYNVKAIL ESPSLPIGSS AKRLKDVNNP VPAMMISNNV SESANNVSGW 420
QNTAFQHHQG MDLSLLQQQQ ERYVGYYNGG NLSTESTRVC FKQEEEQQHF LRNSPSHMTN 480
VDHHSSTSDD SVTVCGNVVS YGGYQGFAIP VGTSVNYDPF TAAEIAYNAR NHYYYAQHQQ 540
QQQIQQSPGG DFPVAISNNH SSNMYFHGEG GGEGAPTFSV WNDT                 584

SEQ ID NO: 50          moltype = AA  length = 527
FEATURE                Location/Qualifiers
source                 1..527
                       mol_type = protein
                       organism = Setaria italica
SEQUENCE: 50
MGSTNNWLGF ASFSGAADDA AILPPLPPSP RGDGAGAEPK LEDFLGLQEP AATVAAGRPF  60
VGTGGASSIG LSMIKNWLRS QPAPEPAVAA DSMALAAVAV VSPEGSGKVT DDGAESGGGA 120
VVVAAQQRKA AAVDTFGQRT SIYRGVTKHR WTGRYEAHLW DNSCRREGQT RKGRQVYLGG 180
YDKEEKAARA YDLAALKYWG TTTTTNFQIS NYEKELEEMK HMSRQEYVAS LRRHVKSSGF 240
SRGASIYRGV TRHHQHGRWQ ARIGRVAGNK DLYLGTFSTQ EEAAEAYDIA AIKFRGLNAV 300
TNFDMSRYDV KSIIESSSLP VGGTTKRLKD VPDQSDMGRN GHSADSVGHM TATNLLTDGI 360
GSYGPENYGY SGWSPAAMTS IPLQFSNGHD QSRLWCKPEQ DSAVVAAAHN LHHLQHFPAP 420
GGTHNFFQPS PIQDMTGVAD VSSPSVDSNS FSYNGSVGYH GAMGGGYAMP VTTLVEGNPA 480
ASGYGVEEGT TDVYDCRNIY YLSQGSPGAN TGKPEAYDQQ GAGYESW              527

SEQ ID NO: 51          moltype = AA  length = 689
FEATURE                Location/Qualifiers
source                 1..689
                       mol_type = protein
                       organism = Medicago truncatula
SEQUENCE: 51
MASMNLLGFS LSPQEQHPST QDQTVASRFG FNPNEISGSD VQGDHCYDLS SHTTPHHSLN  60
LSHPFSIYEA FHTNNNIHTT QDWKENYNNQ NLLLGTSCMN QNVNNNNQQA QPKLENFLGG 120
HSFTDHQEYG GSNSYSSLHL PPHQPEASCG GGDGSTSNNN SIGLSMIKTW LRNQPPPPEN 180
NNNNNNESGA RVQTLSLSMS TGSQSSSSVP LLNANVMSGE ISSSENKQPP TTAVVLDSNQ 240
TSVVESAVPR KSVDTFGQRT SIYRGVTRHR WTGRYEAHLW DNSCRREGQT RKGRQVYLGG 300
YDKEEKAARA YDLAALKYWG TTTTTNFPIS HYEKEVEEMK HMTRQEYVAS LRRKSSGFSR 360
GASIYRGVTR HHQHGRWQAR IGRVAGNKDL YLGTFSTQEE AAEAYDVAAI KFRGLSAVTN 420
FDMSRYDVKT ILESSTLPIG GAAKRLKDME QVELNHVNVD ISHRTEQDHS IINNTSHLTE 480
QAIYAATNAS NWHALSFQHQ QPHHHYNANN MQLQNYPYGT QTQKLWCKQE QDSDDHSTYT 540
TATDIHQLQL GNNNNNTHNF FGLQNIMSMD SASMDNSSGS NSVVYGGGDH GGYGGNGGYM 600
IPMAIANDGN QNPRSNNNFG ESEIKGFGYE NVFGTTTDPY HAQAARNLYY QPQQLSVDQG 660
SNWVPTAIPT LAPRTTNVSL CPPFTLLHE                                  689

SEQ ID NO: 52          moltype = AA  length = 700
FEATURE                Location/Qualifiers
source                 1..700
                       mol_type = protein
                       organism = Sorghum bicolor
SEQUENCE: 52
MATVNNWLAF SLSPQELPPT QTDSTLISAA TTDDVSGDVC FNIPQDWSMR GSELSALVAE  60
PKLEDFLGGI SFSEQHHKAN CNMIPSTSST ACYASSGATA GYHHQLYHQP TSSALHFADS 120
VMVASSAGGV HDGGAMLSAA SANGSAGAGA ASANGSGSIG LSMIKNWLRS QPAPMQPRVA 180
AAESVQGLSL SMNMAGATQG AAGMPLLAGE RGRAPESVST SAQGGAVVTA PKEDSGGSGV 240
AATGALVAVS TDTGGSGASA DNTARKTVDT FGQRTSIYRG VTRHRWTGRY EAHLWDNSCR 300
REGQTRKGRQ GGYDKEEKAA RAYDLAALKY WGPTTTTNFP VNNYEKELED MKHMTRQEFV 360
ASLRRKSSGF SRGASIYRGV TRHHQHGRWQ ARIGRVAGNK DLYLGTFSTQ EEAAEAYDIA 420
AIKFRGLNAV TNFDMSRYDV KSILDSSALP IGSAAKRLKE AEAAASAQHH AGVVSYDVGR 480
IASQLGDGGA LAAAYGAHYH GAWPTIAFQP SAATGLYHPY AQPMRGWCKQ EQDHAVIAAA 540
HSLQELHHLN LGAAAGAHDF FSAGQQAAMH GLGSMDNASL EHSTGSNSVV YNGVGDSNGS 600
TVVGSGGYMM PMSAATATAT TAMVSHEQVH ARAQGDHHDE AKQAAQMGYE SYLVNAENYG 660
GGRMSAAWAT VSAPPAASSN DNMADVGHGG AQLFSVWNDT                      700

SEQ ID NO: 53          moltype = AA  length = 559
FEATURE                Location/Qualifiers
source                 1..559
                       mol_type = protein
                       organism = Oryza sativa
SEQUENCE: 53
MASITNWLGF SSSSFSGAGA DPVLPHPPLQ EWGSAYEGGG TVAAAGGEET AAPKLEDFLG  60
MQVQQETAAA AAGHGRGGSS SVVGLSMIKN WLRSQPPPAV VGGEDAMMAL AVSTSASPPV 120
DATVPACISP DGMGSKAADG GGAAEAAAAA AAQRMKAAMD TFGQRTSIYR GVTKHRWTGR 180
YEAHLWDNSC RREGQTRKGR QVNAGGYDKE EKAARAYDLA ALKYWGTTTT TNFPVSNYEK 240
ELDEMKHMNR QEFVASLRRK SSGFSRGASI YRGVTRHHQH GRWQARIGRV AGNKDLYLGT 300
FGTQEEAAEA YDIAAIKFRG LNAVTNFDMS RYDVKSIIES SNLPIGTGTT RRLKDSSDHT 360
DNVMDINVNT EPNNVVSSHF TNGVGNYGSQ HYGYNGWSPI SMQPIPSQYA NGQPRAWLKQ 420
```

```
EQDSSVVTAA QNLHNLHHFS SLGYTHNFFQ QSDVPDVTGF VDAPSRSSDS YSFRYNGTNG  480
FHGLPGGISY AMPVATAVDQ GQGIHGYGED GVAGIDTTHD LYGSRNVYYL SEGSLLADVE  540
KEGDYGQSVG GNSWVLPTP                                              559

SEQ ID NO: 54          moltype = AA  length = 545
FEATURE                Location/Qualifiers
source                 1..545
                       mol_type = protein
                       organism = Pennisetum squamulatum
SEQUENCE: 54
MGSTNNWLRF ASFSGGGGAK DAAALLPLPP SPRGDVDEAG AEPKLEDFLG LQEPSAAAVG  60
AGRPFAVGGG ASSIGLSMIR NWLRSQPAPA GPAAGVDSMV LAAAAASTEV AGDGAEGGGA  120
VADAVQQRKA AAVDTFGQRT SIYRGVTKHR WTGRYEAHLW DNSCRREGQT RKGRQVYLGG  180
YDKEEKAARA YDLAALKYRG TTTTTNFPMS NYEKELEEMK HMSRQEYVAS LRRKSSGFSR  240
GASIYRGVTR HHQHGRWQAR IGSVAGNKDL YLGTFSTQEE AAEAYDIAAI KFRGLNAVTN  300
FDMSRYDVKS IIESSSLPVG GTPKRLKEVP DQSDMGININ GDSAGHMTAI NLLTDGNDSY  360
GAESYGYSGW CPTAMTPIPF QFSNGHDHSR LWCKPEQDNA VVAALHNLHH LQHLPAPVGT  420
HNFFQPSPVQ DMTGVADASS PPVESNSFLY NGDVGYHGAM GGSYAMPVAT LVEGNSAGSG  480
YGVEEGTGSE IFGGRNLYSL SQGSSGANTG KADAYESWDP SMLVISQKSA NVTVCHGAPV  540
FSVWK                                                             545

SEQ ID NO: 55          moltype = AA  length = 686
FEATURE                Location/Qualifiers
source                 1..686
                       mol_type = protein
                       organism = Medicago truncatula
SEQUENCE: 55
MNLLGFSLSP QEQHPSTQDQ TVASRFGFNP NEISGSDVQG DHCYDLSSHT TPHHSLNLSH  60
PFSIYEAFHT NNNIHTTQDW KENYNNQNLL LGTSCMNQNV NNNNQQAQPK LENFLGGHSF  120
TDHQEYGGSN SYSSLHLPPH QPEASCGGGD GSTSNNNSIG LSMIKTWLRN QPPPPENNNN  180
NNNESGARVQ TLSLSMSTGS QSSSSVPLLN ANVMSGEISS SENKQPPTTA VVLDSNQTSV  240
VESAVPRKSV DTFGQRTSIY RGVTRHRWTG RYEAHLWDNS CRREGQTRKG RQVYLGGYDK  300
EEKAARAYDL AALKYWGTTT TTNFPISHYE KEVEEMKHMT RQEYVASLRR KSSGFSRGAS  360
IYRGVTRHHQ HGRWQARIGR VAGNKDLYLG TFSTQEEAAE AYDVAAIKFR GLSAVTNFDM  420
SRYDVKTILE SSTLPIGGAA KRLKDMEQVE LNHVNVDISH RTEQDHSIIN NTSHLTEQAI  480
YAATNASNWH ALSFQHQQPH HHYNANNMQL QNYPYGTQTQ KLWCKQEQDS DDHSTYTTAT  540
DIHQLQLGNN NNNTHNFFGL QNIMSMDSAS MDNSSGSNSV VYGGGDHGGY GGNGGYMIPM  600
AIANDGNQNP RSNNNFGESE IKGFGYENVF GTTTDPYHAQ AARNLYYQPQ QLSVDQGSNW  660
VPTAIPTLAP RTTNVSLCPP FTLLHE                                      686

SEQ ID NO: 56          moltype = AA  length = 689
FEATURE                Location/Qualifiers
source                 1..689
                       mol_type = protein
                       organism = Brachypodium distachyon
SEQUENCE: 56
MASGNNWLEF SLSGQENPQP HRDSSPVAAI DISGSGDFYG LPTQPVPDTQ LGMPGHHASY  60
GVMEAFNRGT HETHDWSNMR GLDYNGGGSE LSMLVGSSAV GGKIRGAVEE ITEPKLEDFL  120
GGNSFVDSEQ DQAGAGGFLF SGVPMAPMAG SNSGSNTMEL SMIKTWLRNN QNHVSQPHPQ  180
QHQPQPHEEM SMSTDASASS FGDALGRNGV VPAAGSSQSQ SLALSMSTGS GSSHLPMVVA  240
GGSAAVVGAA DQPESSSSEN KRASGAMDSP GGAVEAVARK SIDTFGQRTS IYRGVTRHRW  300
TGRYEAHLWD NSCRREGQSR KGRQGGYDKE DKAARAYDLA ALKYWGTTTT TNFPINTYEK  360
EVDEMKHMTR QEYIAYLRRN SSGFSRGASK YRGVTRHHQH GRWQARIGRV AGNKDLYLGT  420
FSTEEEAAEA YDIAAIKFRG LNAVTNFDMN RYDVKSILES STLPVGGAAR RLKDAPEATI  480
WRAGDMDAGG SSISHQLTNN VGMGGMGPYA GSYHQGHGWP STIVFQHQPS PLSVHYPYAL  540
HQPPRGWCKP EQDVVAAASH SLQELQQLHL GTAHNFFQQA SAGSTVYNGG INGAGFLMPA  600
PASTVVAEQG HSSTATNQGS ICSYGDDEEG KLIGIGYDAM TMASTGDPYA AARAAGGYGQ  660
LPQGSASTVS IARANGCSNN WTSPFNGMG                                   689

SEQ ID NO: 57          moltype = AA  length = 675
FEATURE                Location/Qualifiers
source                 1..675
                       mol_type = protein
                       organism = Panicum virgatum
SEQUENCE: 57
MASANNWLGF SLSGQENPQP NQDSSPAAGI DISGASDFYG LTTQQGSDGH LGVPGLRDDH  60
ASYGIMEAFN RGKQETQDWN MRGLDYNGGA SELSMLVGSS GGGSGKRAVG DSEPKLEDFL  120
GGNSFVSEQD QSGGYLFSGV PMASSTNSNS GSNTMEISMI KTWLRNNNQL PQPQPPATTH  180
QPQPEEISTD ASASSFGCAN GTVAGGSSQS LALSISTGSH LPMVVAGGGG ASGAAASDST  240
SSENKRANGA MDSPSSAIEA VPRKSIDTFG QRTSIYRGVT RHRWTGRYEA HLWDNSCRRE  300
GQSRKGRQGG YDKEDKAARA YDLAALKYWG TTTTTNFPIS NYEKELEEMK HMTRQEYIAY  360
LRRNSSGFSR GASKYRGVTR HHQHGRWQAR IGRVAGNKDL YLGTFSTEEE AAEAYDIAAI  420
KFRGLNAVTN FDMSRYDVKS ILESSTLPVG GAARRLKDAV DHVEAGGATI WRADMDGAVI  480
SQLADAGIGA YASYGAHHAW PTIAFQQPSP LTVHYPYGHA PPRGWCKPEQ DAAAAAAAAH  540
SLQDLQQLHL GSAAHHNFFQ ASSSSTVYNG GAAGYHQAGL GGGGGGSFLM PSSTVVADQG  600
HSSTANQGST CSYGDDQEGK LVGYDAMVAT TTAGGDPYAA ARSGYQFSQG SGSTVSIARA  660
NGYSNNWSSP FNGMG                                                  675

SEQ ID NO: 58          moltype = AA  length = 679
```

```
FEATURE                Location/Qualifiers
source                 1..679
                       mol_type = protein
                       organism = Zea mays
SEQUENCE: 58
MASANNWLGF SLSGQDNPQP NQDSSPAAGI DISGASDFYG LPTQQGSDGH LGVPGLRDDH  60
ASYGIMEAYN RVPQETQDWN MRGLDYNGGG SELSMLVGSS GGGGGNGKRA VEDSEPKLED  120
FLGGNSFVSD QDQSGGYLFS GVPIASSANS NSGSNTMELS MIKTWLRNNQ VAQPQPPAPH  180
QPQPEEMSTD ASGSSFGCSD SMGRNSMVAA GGSSQSLALS MSTGSHLPMV VPSGAASGAA  240
SESTSSENKR ASGAMDSPGS AVEAVPRKSI DTFGQRTSIY RGVTRHRWTG RYEAHLWDNS  300
CRREGQSRKG RQVYLGGYDK EDKAARAYDL AALKYWGTTT TTNFPISNYE KELEEMKHMT  360
RQEYIAYLRR NSSGFSRGAS KYRGVTRHHQ HGRWQARIGR VAGNKDLYLG TFSTEEEAAE  420
AYDIAAIKFR GLNAVTNFDM SRYDVKSILE SSTLPVGGAA RRLKDAVDHV EAGATIWRAD  480
MDGAVISQLA EAGMGGYASY GHHGWPTIAF QQPSPLSVHY PYGQPSRGWC KPEQDAAAAA  540
AHSLQDLQQL HLGSAAHNFF QASSSSTVYN GGAGASGGYQ GLGGGSSFLM PSSTVVAAAD  600
QGHSSTANQG STCSYGDDHQ EGKLIGYDAA MVATAAGGDP YAAARNGYQF SQGSGSTVSI  660
ARANGYANNW SSPFNNGMG                                               679

SEQ ID NO: 59          moltype = AA  length = 693
FEATURE                Location/Qualifiers
source                 1..693
                       mol_type = protein
                       organism = Sorghum bicolor
SEQUENCE: 59
MASTNNHWLG FSLSGQDNPQ PNHQDSSPAA AGIDISGASD FYGLPTQQGS DGNLGVPGLR  60
DDHASYGIME AFNRVPQETQ DWNMRGLDYN GGGSELSMLV GSSGGGGGGG KRAVEDSEPK  120
LEDFLGGNSF VSEHDQSGGY LFSGVPMASS TNSNSGSNTM ELSMIKTWLR NNQVPQPQPP  180
AAPHQAPQTE EMSTDANASA SSFGCSDSMG RNGTVAAAGS SQSLALSMST GSHLPMVVAG  240
GGASGAASES TSSENKRASG AMDSPGSAVE AVPRKSIDTF GQRTSIYRGV TRHRWTGRYE  300
AHLWDNSCRR EGQSRKGRQV YLGGYDKEDK AARAYDLAAL KYWGTTTTTN FPISNYEKEL  360
EEMKHMTRQE YIAYLRRNSS GFSRGASKYR GVTRHHQHGR WQARIGRVAG NKDLYLGTFS  420
TEEEAAEAYD IAAIKFRGLN AVTNFDMSRY DVKSILESST LPVGGAARRL KDAVDHVEAG  480
ATIWRADMDG GVISQLAEAG MGGYASYGHH AWPTIAFQQP SPLSVHYPYG QPPSRGWCKP  540
EQDAAVAAAA HSLQDLQQLH LGSAAHNFFQ ASSSSAVYNS GGGGASGGYH QGLGGGSSSF  600
LMPSSTVVAG ADQGHSSSTA NQGSTCSYGD DHQEGKLIGY DAMVAATAAG GDPYAAARSG  660
YQFSSQGSGS TVSIARANGY SNNWSSPFNG GMG                               693

SEQ ID NO: 60          moltype = AA  length = 700
FEATURE                Location/Qualifiers
source                 1..700
                       mol_type = protein
                       organism = Oryza sativa
SEQUENCE: 60
MASANNWLGF SLSGQENPQP HQDSSPPAAI DVSGAGDFYG LPTSQPTAAD AHLGVAGHHH  60
NASYGIMEAF NRGAQEAQDW NMRGLDYNGG ASELSMLVGS SGGKRAAAVE ETEPKLEDFL  120
GGNSFVSEQD HHAAGGFLFS GVPMASSTNS NSGSNTMELS MIKTWLRNNG QVPAGHQPQQ  180
QQPAAAAAAA QQQAHEAAEM STDASASSFG CSSDAMGRSN NGGAVSAAAG GTSSQSLALS  240
MSTGSHSHLP IVVAGGGNAS GGAAESTSSE NKRASGAMDS PGGGAIEAVP RKSIDTFGQR  300
TSIYRGVTRH RWTGRYEAHL WDNSCRREGQ SRKGRQGGYD KEDKAARAYD LAALKYWGTT  360
TTTNFPISNY EKELDEMKHM TRQEYIAYLR RNSSGFSRGA SKYRGVTRHH QHGRWQARIG  420
RVAGNKDLYL GTFSTEEEAA EAYDIAAIKF RGLNAVTNFD MSRYDVKSIL ESSTLPVGGA  480
ARRLKEAADH AEAAGATIWR AADMDGAGVI SGLADVGMGA YAASYHHHHH HGWPTIAFQQ  540
PPPLAVHYPY GQAPAAPSRG WCKPEQDAAV AAAAHSLQDL QQLHLGSAAA HNFFQASSSS  600
TVYNGGGGGY QGLGGNAFLM PASTVVADQG HSSTATNHGN TCSYGNEEQG KLIGYDAMAM  660
ASGAAGGGYQ LSQGSASTVS IARANGYSAN WSSPFNGAMG                        700

SEQ ID NO: 61          moltype = AA  length = 707
FEATURE                Location/Qualifiers
source                 1..707
                       mol_type = protein
                       organism = Glycine max
SEQUENCE: 61
MGSMNLLGFS LSPHEEHPSS QDHSQTTPSR FSFNPDGSIS STDVAGGCFD LTSDSTPHLL  60
NLPSYGIYEA FHRNNSINTT QDWKENYNSQ NLLLGTSCNK QNMNQNQQQQ PKLENFLGGH  120
SFGEHEQTYG GNSASTDYMF PAQPVSAGGG GSGGGSNNNN NSNSIGLSMI KTWLRNQPPN  180
SENINNNNES GGNIRSSVQQ TLSLSMSTGS QSSTSLPLLT ASVDNGESPS DNKQPNTSAA  240
LDSTQTGAIE TAPRKSIDTF GQRTSIYRGV TRHRWTGRYE AHLWDNSCRR EGQTRKGRQV  300
YLGGYDKEEK AARAYDLAAL KYWGTTTTTN FPISHYEKEL EEMKHMTRQE YVASLRRKSS  360
GFSRGASIYR GVTRHHQHGR WQARIGRVAG NKDLYLGTFS TQEEAAEAYD VAAIKFRGLS  420
AVTNFDMSRY DVKSILESTT LPIGGAAKRL KDMEQVELSV DNGHRADQVD HSIIMSSHLT  480
QGINNNYAGG GTATHHNWHN AHAFHQPQPC TTMHYPYGQR INWCKQEQQD NSDAPHSLSY  540
SDIHQLQLGN NGTHNFFHTN SGLHPMLSMD SASIDNSSSS NSVVYDGYGG GGGYNVMPMG  600
TTTAVVASDG DQNPRSNHGF GDNEIKALGY ESVYGSATDS YHAHARNLYY LTQQQSSSVD  660
TVKASAYDQG SACNTWVPTA IPTHAPRSTT SMALCHGATT PFSLLHE                707

SEQ ID NO: 62          moltype = AA  length = 695
FEATURE                Location/Qualifiers
source                 1..695
                       mol_type = protein
```

-continued

```
                        organism = Oryza sativa
SEQUENCE: 62
MATMNNWLAF SLSPQDQLPP SQTNSTLISA AATTTTAGDS STGDVCFNIP QDWSMRGSEL  60
SALVAEPKLE DFLGGISFSE QQHHHGGKGG VIPSSAAACY ASSGSSVGYL YPPPSSSSLQ  120
FADSVMVATS SPVVAHDGVS GGGMVSAAAA AAASGNGGIG LSMIKNWLRS QPAPQPAQAL  180
SLSMNMAGTT TAQGGGAMAL LAGAGERGRT TPASESLSTS AHGATTATMA GGRKEINEEG  240
SGSAGAVVAV GSESGGSGAV VEAGAAAAAA RKSVDTFGQR TSIYRGVTRH RWTGRYEAHL  300
WDNSCRREGQ TRKGRQVLIG GYDKEEKAAR AYDLAALKYW GPTTTTNFPV NNYEKELEEM  360
KHMTRQEFVA SLRRKSSGFS RGASIYRGVT RHHQHGRWQA RIGRVAGNKD LYLGTFSTQE  420
EAAEAYDIAA IKFRGLNAVT NFDMSRYDVK SILDSAALPV GTAAKRLKDA EAAAAYDVGR  480
IASHLGGDGA YAAHYGHHHH SAAAAWPTIA FQAAAAPPPH AAGLYHPYAQ PLRGWCKQEQ  540
DHAVIAAAHS LQDLHHLNLG AAAAAHDFFS QAMQQQHGLG SIDNASLEHS TGSNSVVYNG  600
DNGGGGGGYI MAPMSAVSAT ATAVASSHDH GGDGGKQVQM GYDSYLVGAD AYGGGGAGRM  660
PSWAMTPASA PAATSSSDMT GVCHGAQLFS VWNDT                           695

SEQ ID NO: 63           moltype = AA  length = 658
FEATURE                 Location/Qualifiers
source                  1..658
                        mol_type = protein
                        organism = Oryza sativa
SEQUENCE: 63
MASADNWLGF SLSGQGNPQH HQNGSPSAAG DAAIDISGSG DFYGLPTPDA HHIGMAGEDA  60
PYGVMDAFNR GTHETQDWAM RGLDYGGGSS DLSMLVGSSG GGRRTVAGDG VGEAPKLENF  120
LDGNSFSDVH GQAAGGYLYS GSAVGGAGGY SNGGCGGGTI ELSMIKTWLR SNQSQQQPSP  180
PQHADQGMST DASASSYACS DVLVGSCGGG GAGGTASSHG QGLALSMSTG SVAAAGGGGA  240
VVAAESSSSE NKRVDSPGGA VDGAVPRKSI DTFGQRTSIY RGVTRHRWTG RYEAHLWDNS  300
CRREGQSRKG RQVCVGGYDK EDKAARAYDL AALKYWGTTT TTNFPMSNYE KELEEMKHMT  360
RQEYIAHLRR NSSGFSRGAS KYRGVTRHHQ HGRWQARIGR VAGNKDIYLG TFSTEEEAAE  420
AYDIAAIKFR GLNAVTNFDM SRYDVKSILD SSTLPVGGAA RRLKEAEVAA AAAGGGVIVS  480
HLADGGVGGY YYGCGPTIAF GGGGQQPAPL AVHYPSYGQA SGWCKPEQDA VIAAGHCATD  540
LQHLHLGSGG AAATHNFFQQ PASSSAVYGN GGGGGGNAFM MPMGAVVAAA DHGGQSSAYG  600
GGDESGRLVV GYDGVVDPYA AMRSAYELSQ GSSSSSVSVA KAANGYPDNW SSPFNGMG    658

SEQ ID NO: 64           moltype = AA  length = 550
FEATURE                 Location/Qualifiers
source                  1..550
                        mol_type = protein
                        organism = Panicum virgatum
SEQUENCE: 64
MGSTNNWLGF ASFSGAAAAD DILPPLPPPR GDEAAAEPKL EDFLGLQEPA AGVAGRAPFA  60
GSGGGASSIG LSMIKNWLRS QPAPGPAGAD SMALAVVEEA STDEVRKVTD DRGAESVAAV  120
VDAAQQRKAV AAVDTFGQRT SIYRGVTKHR WTGRYEAHLW DNSCRREGQT RKGRQGGYDK  180
EEKAARAYDL AALKYWGTTT TTNFPMSNYE KELEEMKHMS RQEYVASLRR KSSGFSRGAS  240
IYRGVTRHHQ HGRWQARIGR VAGNKDLYLG TFSTQEEAAE AYDIAAIKFR GLNAVTNFDM  300
SRYDVKSIME SSALPVGGTT KCLKDVHDQS DMGMNSSGAD SASHMTATTK LLTDGIGSYG  360
NENYGYSGWS PSAMMRIPLQ FSNGQEHSRL WCKPEQDSAV VAAAHNLQHL QHFPSPGGTH  420
DFFHPSHVQD VTGVADVSSP SVDPNSFLYN GVVGYHGSMG GGYAMPVATL VDSNHATSSY  480
GVEEGTSELY SGQNLYYLSQ ASPGANTGKA DAYEQQGVGY ESWVPSVPVI SQKDPNVTVC  540
HGTPLFSVWK                                                       550

SEQ ID NO: 65           moltype = AA  length = 706
FEATURE                 Location/Qualifiers
source                  1..706
                        mol_type = protein
                        organism = Zea mays
SEQUENCE: 65
MATVNNWLAF SLSPQELPPS QTTDSTLISA ATADHVSGDV CFNIPQDWSM RGSELSALVA  60
EPKLEDFLGG ISFSEQHHKS NCNLIPSTSS TVCYASSAAS TGYHHQLYQP TSSALHFADS  120
VMVASSAGVH DGGSMLSAAA ANGVAGAASA NGGGIGLSMI KNWLRSQPAP MQPRAAAAEG  180
AQGLSLSMNM AGTTQGAAGM PLLAGERARA PESVSTSAQG GAVVVTAPKE DSGGSGVAGA  240
LVAVSTDTGG SGGASADNTA RKTVDTFGQR TSIYRGVTRH RWTGRYEAHL WDNSCRREGQ  300
TRKGRQGGYD KEEKAARAYD LAALKYWGAT TTTNFPVSNY EKELEDMKHM TRQEFVASLR  360
RKSSGFSRGA SIYRGVTRHH QHGRWQARIG RVAGNKDLYL GTFSTQEEAA EAYDIAAIKF  420
RGLNAVTNFD MSRYDVKSIL DSSALPIGSA AKRLKEAEAA ASAQHHHAGV VSYDVGRIAS  480
QLGDGGALAA AYGAHYHGAA WPTIAFQPGA ATTGLYHPYA QQPMRGGGWC KQEQDHAVIA  540
AAHSLQDLHH LNLGAAGAHD FFSAGQQAAA AAAMHGLASI DSASLEHSTG SNSVVYNGGV  600
GDSNGASAVG SGGGYMMPMS AAGATTTSAM VSHEQMHARA YDEAKQAAQM GYESYLVNAE  660
NNGGGRMSAW GTVVSAAAAA AASSNDNIAA DVGHGGAQLF SVWNDT                706

SEQ ID NO: 66           moltype = AA  length = 579
FEATURE                 Location/Qualifiers
source                  1..579
                        mol_type = protein
                        organism = Brassica napus
SEQUENCE: 66
MNNNWLGFSL SPYEQNHHRK DVCSSTTTTA VDVAGEYCYD PTAASDESSA IQTSFPSPFG  60
VVLDAFTRDN NSHSRDWDIN GSACNNIHND EQDGPKLENF LGRTTTIYNT NENVGDIDGS  120
GCYGGGDGGG GSLGLSMIKT WLRNQPVDNV DNQENGNGAK GLSLSMNSST SCDNNNYSSN  180
NLVAQGKTID DSVEATPKKT IESFGQRTSI YRGVTRHRWT GRYEAHLWDN SCKREGQTRK  240
```

```
GRQVYLGGYD KEEKAARAYD LAALKYWGTT TTTNFPMSEY EKEIEEMKHM TRQEYVASLR  300
RKSSGFSRGA SIYRGVTRHH QHGRWQARIG RVAGNKDLYL GTFGTQEEAA EAYDIAAIKF  360
RGLTAVTNFD MNRYNVKAIL ESPSLPIGSA AKRLKEANRP VPSMMMISNN VSESENNASG  420
WQNAAVQHHQ GVDLSLLQQH QERYNGYYYN GGNLSSESAR ACFKQEDDQH HFLSNTQSLM  480
TNIDHQSSVS DDSVTVCGNV VGYGGYQGFA APVNCDAYAA SEFDYNARNH YYFAQQQQTQ  540
HSPGGDFPAA MTNNVGSNMY YHGEGGGEVA PTFTVWNDN                         579

SEQ ID NO: 67          moltype = DNA  length = 3527
FEATURE                Location/Qualifiers
source                 1..3527
                       mol_type = genomic DNA
                       organism = Pennisetum squamulatum
SEQUENCE: 67
atgggttcca ccaacaactg gctgcgcttc gcctcgttct ccggcggcgg cggcgccaag  60
gatgccgcgg ccctgctccc gctgccgccc tcgccccgtg gcgatgtcga cgaggccggc  120
gcagagccga agctcgagga cttcctcggc ctgcaggagc cgagcgccgc cgcggtgggg  180
gctgggcggc cattcgcggt gggtggcggt gcgagctcca tcgggctgtc catgatcagg  240
aactggctgc gcagccagcc ggcgccggcc gggcctgctg cgggggtcga ttcgatggtg  300
ctggcggctg cggcggcgtc gacggaggtg gccggcgatg gcgcggaggg cggcggcgcc  360
gtggctgacg cggtgcagca gaggaaggcg gcggcggtgg acactttcgg gcagcggacc  420
tccatatacc gcggcgtcac aaagtaggtt cttgatttta ttttggtttt ggaaaaattc  480
ttctttgttt tttctgtttt cttccgactg gtatatcttg tgttaagaac tttttcatta  540
gatgcatgtc atactgttgc tttttcttgt tgctttgaac cttttggcgt ttgcagcttc  600
gtttggatat acagaaccta tattatcccc tttagtaacc agtagattct tttttttct  660
ttttttttt ttgctttcga tgttgttagt gttcttgcat cacgcatgtt tttcctctga  720
tattttaatg gacgatatca tctctagttc aagtttttgc tcttgctctt gttgtagtgg  780
tgctaagatt tttaaaaaaa aaaattatga gcagttcttg tgctgtttga aaatgtaagc  840
atctcacagt tctaaaatat atatatatat atatatataa gtctctcatg ttgatttgtg  900
gatgtactga agccccgcgc gcacacatgc acacaccgca cgctcacacg ccctaaatcc  960
ccggtgcaac accagggttg tccccgatgg ggatcgaacc ctggcgggtg gcctaaccac  1020
cgtcagctcc caccaccgag ctatcagctc gtttgcccat atttcgtgtg gtacctcgat  1080
atttttatat ttctagattg ctgtatctat cttctagact tatataagtg ttgcgccact  1140
catacttttt accgcctgta atcgagtaga actgcttcct cttttgatta tattgtatca  1200
gttaaatgat cttgttgttg atgtgtttac cactttacca tcaccattgc atgaaatcac  1260
ttcaagacat gtattcatga tttggctggc taaatttgct agtggcacat acatgtggta  1320
aaaaaatatt tttagtttgt gcttgctatt cttttcggtc atcccttcgt gcctgtttat  1380
ccagaacacc caatctgctt cacatagttt ttgaatgcta tcatcatatt tcttttttgg  1440
agatattgtt actaaaagtt tggctttgtc ctcaataggc atagatggac aggaaggtat  1500
gaagcccatc tttgggacaa tagctgcaga agagaaggtc aaactcggaa aggtagacaa  1560
ggtaatgatt ataatataga tatttaaatt tgtaattata agctgcatca tattattatt  1620
tattagatcg gctttaaaat ttcactagct aatttagtgt ttttcttttc ttcatcgata  1680
cctgcaatcg cttcattcca ttgattcagt gtatcttggt aagtaatact tgtttacaat  1740
tgcaaaatgg tatatctctt gttgtttctc atgtcaagta tattaaatat gtggttgatg  1800
cattgaaggt ggatatgata aagaagaaaa agcagctaga gcttatgatt tagctgctct  1860
caagtaccgg ggcaccacaa ctactacaaa ttttccggta ttacttattg ttaatatgtt  1920
ggttctccag aattgatatt ttacttctaa tatataactg cgtatatgaa tgaatgttgt  1980
aagatttgc attttatgtt cagatgagca actatgaaaa ggagttagaa gagatgaagc  2040
atatgtcacg acaagaatat gttgcatccc ttagaaggta catgtgttgt caaaactttg  2100
taccttcatg gaaactgaac ttatatattt cacaaatgga ttgacataga acatatattt  2160
gtgatacagg aaaagcagtg gtttttctcg tggtgcatca atttaccgag gggttaccag  2220
gtacaaaata ttcctttttcc ttattatctc tggttttagt tagcaagtgc attgtttcta  2280
tgggaatttg tgttgcatgt agatgggaat ttgtgttgca tgtagatcat aaatagttgc  2340
aactattaat ctcatcgttc tattgctgaa tagttgtggt actcctttac cacagttgac  2400
tatgatattc tattatatta tttttcttgc aaagttgata tttaattgct tgtctagcta  2460
actttcaagc aatcatgtaa aacaggcacc atcagcatgg aaggtggcaa gcaagaatag  2520
gaagtgtggc aggaaacaag gatctttatt tgggcacatt cagtaagtca cattttaata  2580
tttttaatga agcactgatt ttttttgtc aagcaaaatg gaagcaagac agaaaaacat  2640
aaacctactg gagcaccttt ttcattattt tgtctcttga atataatagt atgtggctga  2700
cctctccctg tgtaggtacc caggaggaag ctgcagaggc ttacgacatt gctgccatca  2760
aattccgagg cctcaatgct gtcacgaact ttgacatgag ccggtatgac gtcaagagca  2820
tcattgagag cagctccctg cctgttggcg gcactccaaa gcgtctcaag gaagtgcctg  2880
atcaatcaga tatgggcatc aacataaacg gtgactctgc tggtcatatg actgctatca  2940
accttcttac tgatggcaat gacagctatg gagctgagag ttatggttac agtggttggt  3000
gtcccacagc catgacgcca atccccttttc aattcagcaa tggccatgac cattccaggc  3060
tgtggtgcaa gccagagcag gacaatgcgg ttgttgcagc actgcataac ctgcatcacc  3120
tccagcactt gccagcccca gttggcaccc ataatttttt ccagccatcg cctgttcagg  3180
acatgacagg tgttgccgat gcttcatcgc caccagtaga atctaattca ttcctgtaca  3240
atggggacgt tggttaccat ggtgccatgg gtggcagcta tgccatgccg gttgccacac  3300
tagttgaggg caactctgcg ggcagtggct atggagttga ggaaggcaca gggtctgaaa  3360
tctttggtgg acggaacttg tattctctct cccaaggttc ctcaggcgcc aatactggaa  3420
aggcagatgc ttatgaaagc tgggatccat ctatgctggt gatatcacag aagtctgcca  3480
atgtgactgt ctgccatggc gcacctgtat tttcagtttg gaaatga                3527

SEQ ID NO: 68          moltype = DNA  length = 1638
FEATURE                Location/Qualifiers
source                 1..1638
                       mol_type = genomic DNA
                       organism = Pennisetum squamulatum
SEQUENCE: 68
```

```
atgggttcca ccaacaactg gctgcgcttc gcctcgttct ccggcggcgg cggcgccaag  60
gatgccgcgg ccctgctccc gctgccgccc tcgccccgtg gcgatgtcga cgaggccggc  120
gcagagccga agctcgagga cttcctcggc ctgcaggagc cgagcgccgc cgcggtgggg  180
gctgggcggc cattcgcggt gggtggcggt gcgagctcca tcgggctgtc catgatcagg  240
aactggctgc gcagccagcc ggcgccggcc gggcctgctg cgggggtcga ttcgatggtg  300
ctggcggctg cggcggcgtc gacggaggtg gccggcgatg gcgcggaggg cggcggcgcc  360
gtggctgacg cggtgcagca gaggaaggcg gcggcggtgg acactttcgg gcagcggacc  420
tccatatacc gcggcgtcac aaagcataga tggacaggaa ggtatgaagc ccatctttgg  480
gacaatagct gcagaagaga aggtcaaact cggaaaggta gacaagtgta tcttggtgga  540
tatgataaag aagaaaaagc agctagagct tatgatttag ctgctctcaa gtaccggggc  600
accacaacta ctacaaattt tccgatgagc aactatgaaa aggagttaga agagatgaag  660
catatgtcac gacaagaata tgttgcatcc cttagaagga aaagcagtgg tttttctcgt  720
ggtgcatcaa tttaccgagg ggttaccagg caccatcagc atggaaggtg gcaagcaaga  780
ataggaagtg tggcaggaaa caaggatctt tatttgggca cattcagtac ccaggaggaa  840
gctgcagagg cttacgacat tgctgccatc aaattccgag gcctcaatgc tgtcacgaac  900
tttgacatga gccggtatga cgtcaagagc atcattgaga gcagctccct gcctgttggc  960
ggcactccaa agcgtctcaa ggaagtgcct gatcaatcag atatgggcat caacataaac  1020
ggtgactctg ctggtcatat gactgctatc aaccttctta ctgatggcaa tgacagctat  1080
ggagctgaga gttatggtta cagtggttgg tgtcccacag ccatgacgcc aatccccttt  1140
caattcagca atggccatga ccattccagg ctgtggtgca agccagagca ggacaatgcg  1200
gttgttgcag cactgcataa cctgcatcac ctccagcact tgccagcccc agttggcacc  1260
cataattttt tccagccatc gcctgttcag gacatgacag gtgttgccga tgcttcatcg  1320
ccaccagtag aatctaattc attcctgtac aatggggacg ttggttacca tggtgccatg  1380
ggtggcagct atgccatgcc ggttgccaca ctagttgagg gcaactctgc gggcagtggc  1440
tatggagttg aggaaggcac agggtctgaa atctttggtg gacggaactt gtattctctc  1500
tcccaaggtt cctcaggcgc caatactgga aaggcagatg cttatgaaag ctgggatcca  1560
tctatgctgg tgatatcaca gaagtctgcc aatgtgactg tctgccatgg cgcacctgta  1620
ttttcagttt ggaaatga                                                1638
```

```
SEQ ID NO: 69          moltype = AA  length = 554
FEATURE                Location/Qualifiers
REGION                 1..554
                       note = Consensus Sequence
VARIANT                4
                       note = misc_feature - X can be any naturally occurring
                        amino acid
VARIANT                19
                       note = misc_feature - X can be any naturally occurring
                        amino acid
VARIANT                24
                       note = misc_feature - X can be any naturally occurring
                        amino acid
VARIANT                28
                       note = misc_feature - X can be any naturally occurring
                        amino acid
VARIANT                41
                       note = misc_feature - X can be any naturally occurring
                        amino acid
VARIANT                59
                       note = misc_feature - X can be any naturally occurring
                        amino acid
VARIANT                61
                       note = misc_feature - X can be any naturally occurring
                        amino acid
VARIANT                78
                       note = misc_feature - X can be any naturally occurring
                        amino acid
REGION                 91..92
                       note = misc_feature - X can be any naturally occurring
                        amino acid
VARIANT                113
                       note = misc_feature - X can be any naturally occurring
                        amino acid
VARIANT                118
                       note = misc_feature - X can be any naturally occurring
                        amino acid
VARIANT                121
                       note = misc_feature - X can be any naturally occurring
                        amino acid
VARIANT                123
                       note = misc_feature - X can be any naturally occurring
                        amino acid
VARIANT                125
                       note = misc_feature - X can be any naturally occurring
                        amino acid
VARIANT                130
                       note = misc_feature - X can be any naturally occurring
                        amino acid
VARIANT                152
```

```
                      note = misc_feature - X can be any naturally occurring
                       amino acid
VARIANT               158
                      note = misc_feature - X can be any naturally occurring
                       amino acid
VARIANT               167
                      note = misc_feature - X can be any naturally occurring
                       amino acid
VARIANT               369
                      note = misc_feature - X can be any naturally occurring
                       amino acid
VARIANT               372
                      note = misc_feature - X can be any naturally occurring
                       amino acid
VARIANT               379
                      note = misc_feature - X can be any naturally occurring
                       amino acid
VARIANT               382
                      note = misc_feature - X can be any naturally occurring
                       amino acid
VARIANT               386
                      note = misc_feature - X can be any naturally occurring
                       amino acid
VARIANT               388
                      note = misc_feature - X can be any naturally occurring
                       amino acid
VARIANT               392
                      note = misc_feature - X can be any naturally occurring
                       amino acid
REGION                413..414
                      note = misc_feature - X can be any naturally occurring
                       amino acid
VARIANT               451
                      note = misc_feature - X can be any naturally occurring
                       amino acid
VARIANT               453
                      note = misc_feature - X can be any naturally occurring
                       amino acid
REGION                462..464
                      note = misc_feature - X can be any naturally occurring
                       amino acid
VARIANT               480
                      note = misc_feature - X can be any naturally occurring
                       amino acid
VARIANT               487
                      note = misc_feature - X can be any naturally occurring
                       amino acid
VARIANT               490
                      note = misc_feature - X can be any naturally occurring
                       amino acid
VARIANT               493
                      note = misc_feature - X can be any naturally occurring
                       amino acid
REGION                496..497
                      note = misc_feature - X can be any naturally occurring
                       amino acid
REGION                499..500
                      note = misc_feature - X can be any naturally occurring
                       amino acid
VARIANT               505
                      note = misc_feature - X can be any naturally occurring
                       amino acid
VARIANT               508
                      note = misc_feature - X can be any naturally occurring
                       amino acid
VARIANT               514
                      note = misc_feature - X can be any naturally occurring
                       amino acid
VARIANT               535
                      note = misc_feature - X can be any naturally occurring
                       amino acid
VARIANT               543
                      note = misc_feature - X can be any naturally occurring
                       amino acid
REGION                545..546
                      note = misc_feature - X can be any naturally occurring
                       amino acid
source                1..554
                      mol_type = protein
```

-continued

```
                        organism = synthetic construct
SEQUENCE: 69
MASXNNWLGF SLSGQENPXS QDSXPAAXID VSGDDCYGLP XAFETQDWSM RGSELSMLXE  60
XAEPKLEDFL GGNSFSEXQD QGGYLASGVP XXAGSGGGSG SIGLSMIKTW LRXQPAPXPQ  120
XAXGXAQSLX LSMSTGSSLP LVAGESSENK RXDSGGAXVE AVPRKSXDET FGQRTSIYRG  180
VTRHRWTGRY EAHLWDNSCR REGQTRKGRQ VYLGGYDKEE KAARAYDLAA LKYWGTTTTT  240
NFPISNYEKE LEEMKHMTRQ EYVASLRRKS SGFSRGASTY RGVTRHHQHG RWQARIGRVA  300
GNKDLYLGTF STQEEAAEAY DIAAIKFRGL NAVTNFDMSR YDVKSILESS TLPVGGAAKR  360
LKDAEDAAXA GXNINRADXD GXIASXLXDG GXGAYGYGAS GWPTIAFQPQ PLXXHYPYGQ  420
PSRGWCKQEQ DAAVAAAAHS LQDLQHLHLG XGXHNFFQAS GXXXSGSNSV VYNGGVGYGX  480
GGGGGYXMPX STXVAXXGXX SYGDXEGXGY DAGXDPYAAR NGYYLSQGSS SAVSXAKANG  540
YSXNXXGASP FSDG                                                  554
```